(12) United States Patent
Kobayashi

(10) Patent No.: US 8,537,410 B2
(45) Date of Patent: Sep. 17, 2013

(54) TINT BLOCK IMAGE GENERATION PROGRAM AND TINT BLOCK IMAGE GENERATION DEVICE USING MULTI-GRAYSCALE CAMOUFLAGE PATTERN DATA

(75) Inventor: Makoto Kobayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 852 days.

(21) Appl. No.: 12/350,829

(22) Filed: Jan. 8, 2009

(65) Prior Publication Data

US 2009/0185226 A1  Jul. 23, 2009

(30) Foreign Application Priority Data

Jan. 17, 2008  (JP) ................................. 2008-007841
Jan. 17, 2008  (JP) ................................. 2008-007842

(51) Int. Cl.
*G06K 15/02*  (2006.01)
(52) U.S. Cl.
USPC ...................... 358/1.18; 358/3.28; 358/1.14
(58) Field of Classification Search
None
See application file for complete search history.

(56) References Cited

U.S. PATENT DOCUMENTS

| 5,233,436 A * | 8/1993 | Oksman et al. ............... 386/252 |
| 8,055,180 B2 * | 11/2011 | Murakami ..................... 399/366 |
| 2006/0066907 A1 * | 3/2006 | Nakata et al. .................. 358/3.1 |
| 2007/0091352 A1 * | 4/2007 | Nakata et al. ................. 358/1.14 |

FOREIGN PATENT DOCUMENTS

| JP | 04-170569 | 6/1992 |
| JP | 05-153368 A | 6/1993 |
| JP | 2001-197297 | 7/2001 |
| JP | 2005-151456 | 6/2005 |
| JP | 2006-094208 A | 4/2006 |
| JP | 2007-336354 A | 12/2007 |

* cited by examiner

*Primary Examiner* — Twyler Haskins
*Assistant Examiner* — Christopher D Wait
(74) *Attorney, Agent, or Firm* — DLA Piper LLP (US)

(57) ABSTRACT

A computer-readable tint block image generation program that causes a computer to execute a tint block image generation step of generating tint block image data including a latent image portion and a background portion which have different output densities to be reproduced during copying has: a camouflage pattern registration step of inputting and storing in a memory multi-grayscale camouflage pattern data; and a tint block image data generation step of generating a latent image portion image data based on a latent image portion screen for an area corresponding to the latent image portion, and generating a background portion image data based on a background portion screen for an area corresponding to the background portion, for grayscale values of the multi-grayscale camouflage pattern data.

17 Claims, 43 Drawing Sheets

(a) Original     (b) Copy (a) Background Portion Basic Dither Matrix (212lpi)

(b) Latent Image Portion Basic Dither Matrix (53lpi)

FIG.9
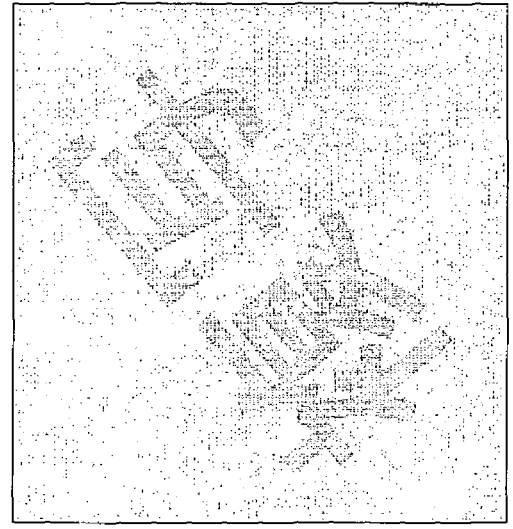
(c) Latent Image Portion Grayscale Value = 13
(b) Latent Image Portion Grayscale Value = 12
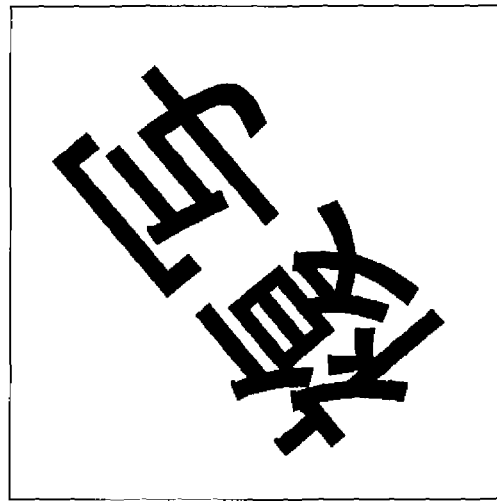
(a) Latent Image Mask Pattern

FIG.15
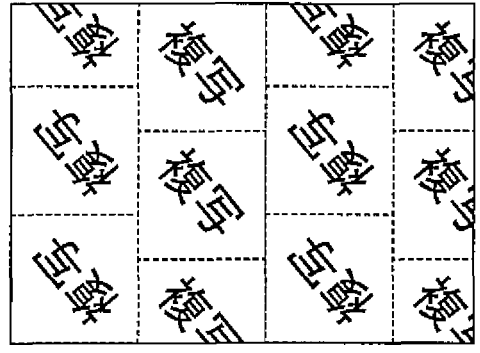
(a) Squared Arrangement
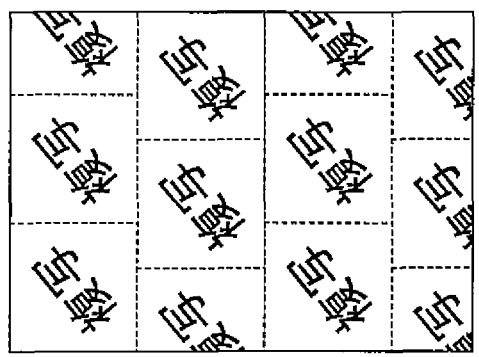
(b) Oblique Arrangement
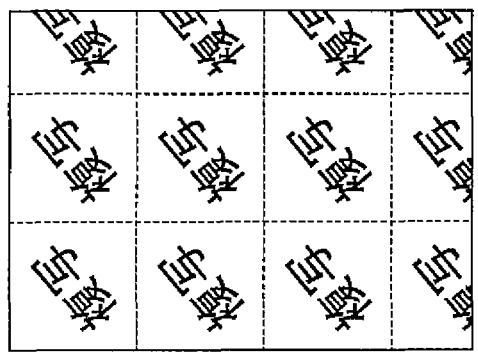
(c) Inverted Arrangement FIG.17
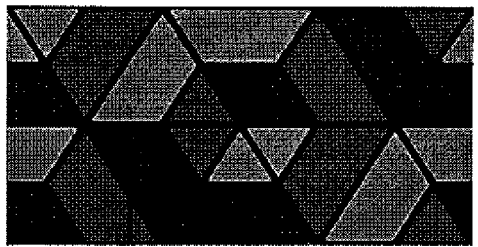
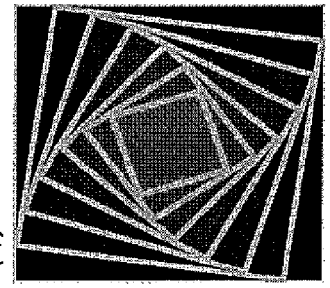
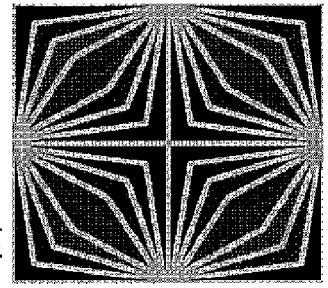
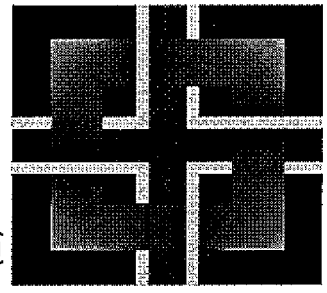
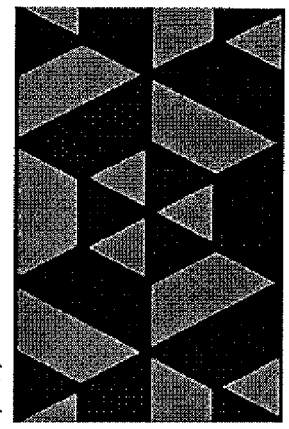
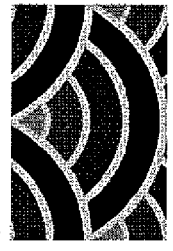
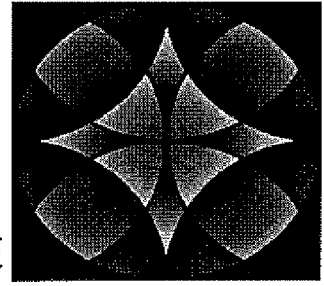
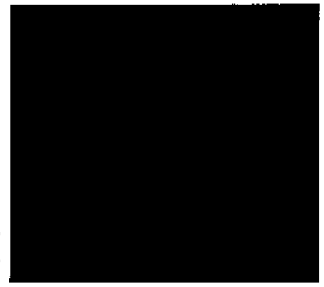
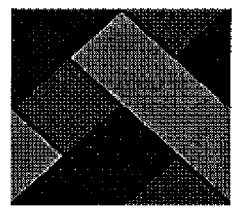
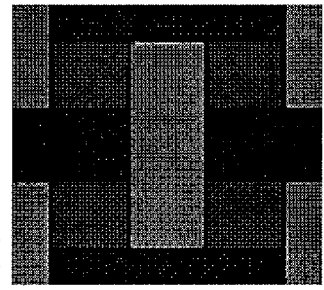

FIG.19

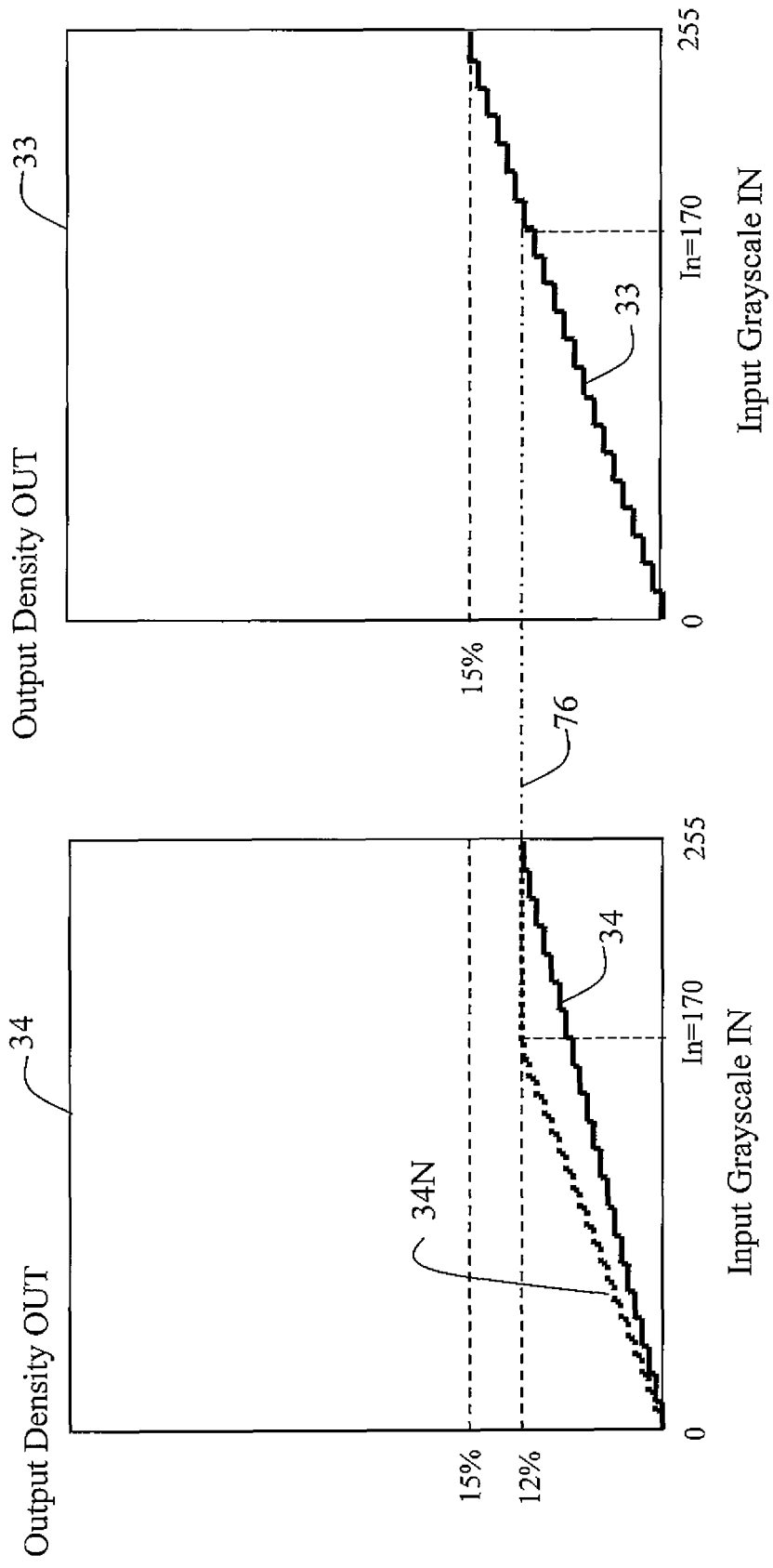

FIG.30 (a) Original (b) Copy

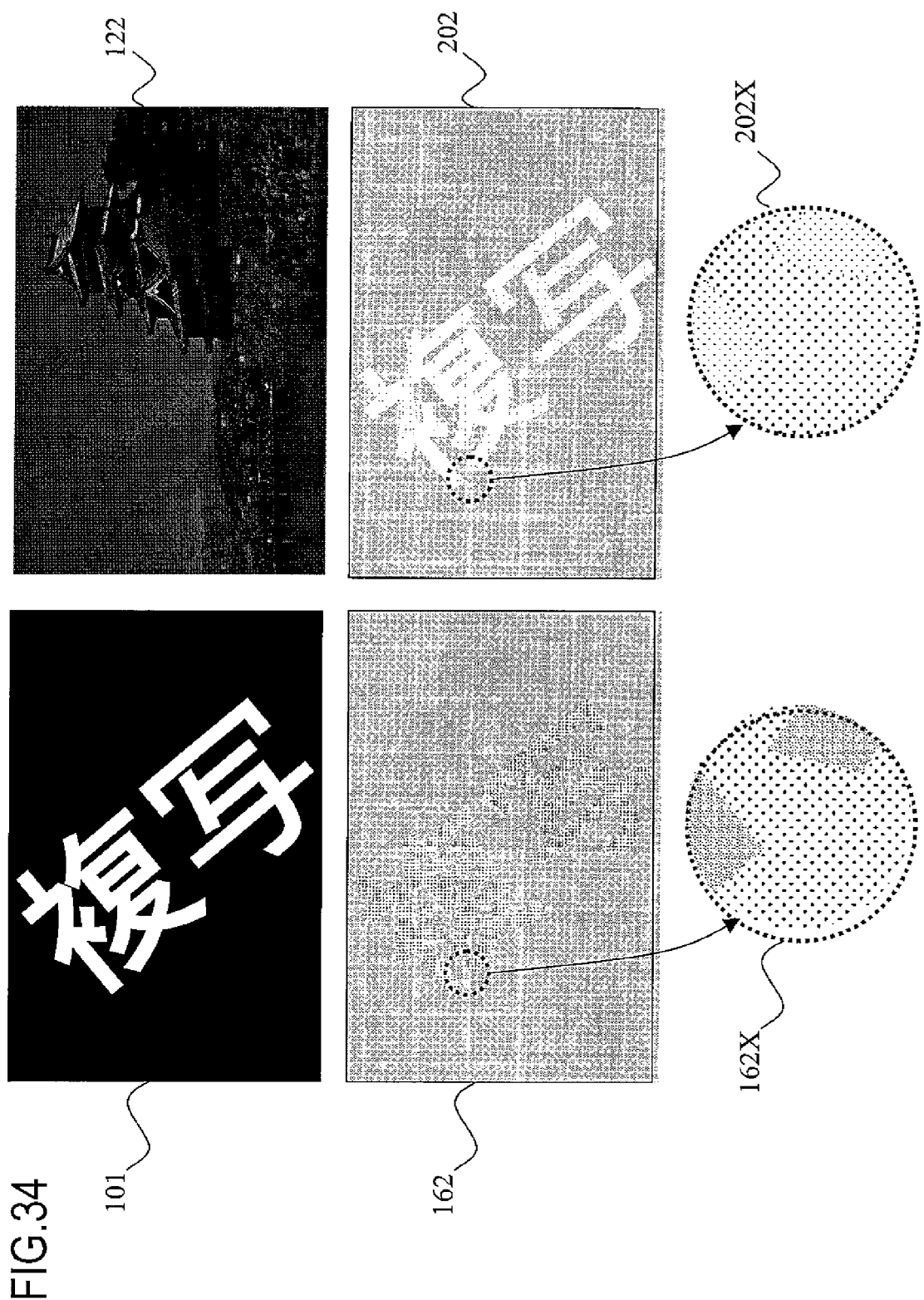

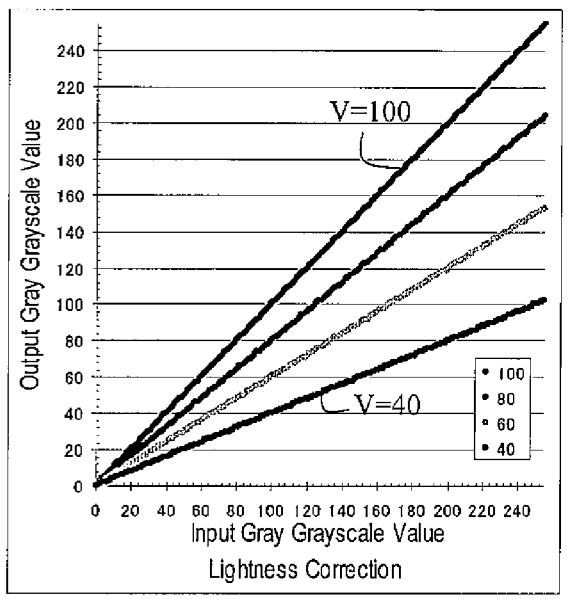
FIG.35A Lightness Correction
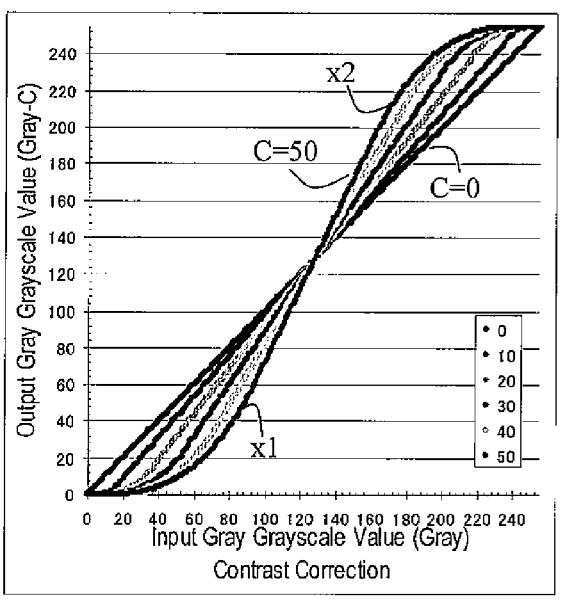
FIG.35B Contrast Correction
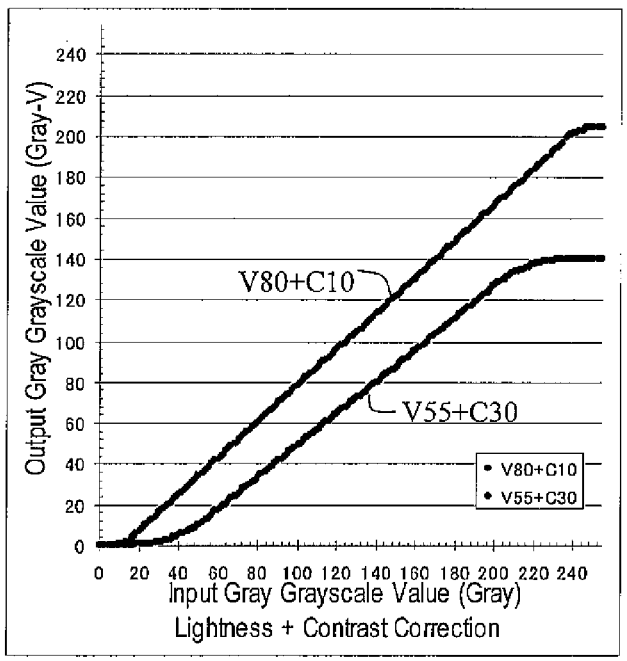
FIG.35C Lightness + Contrast Correction FIG.36
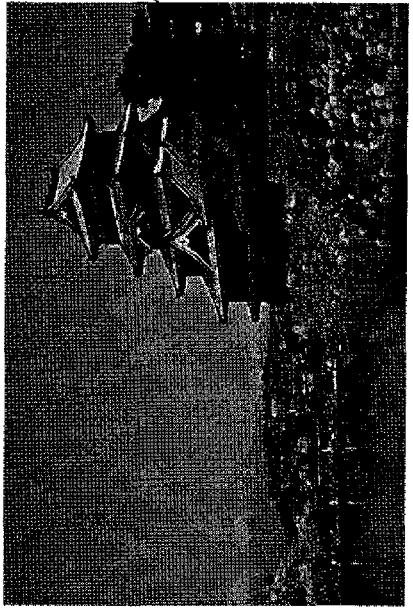
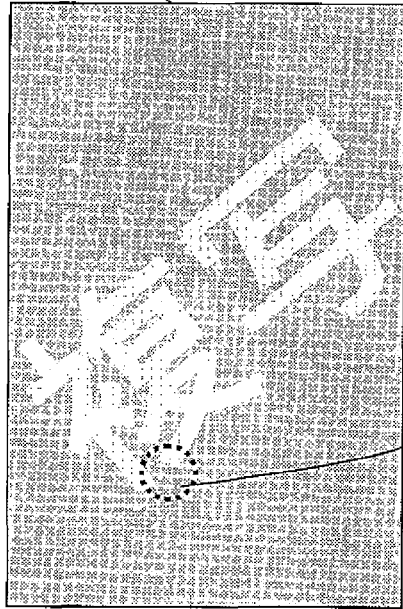
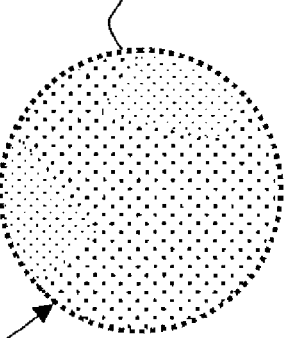
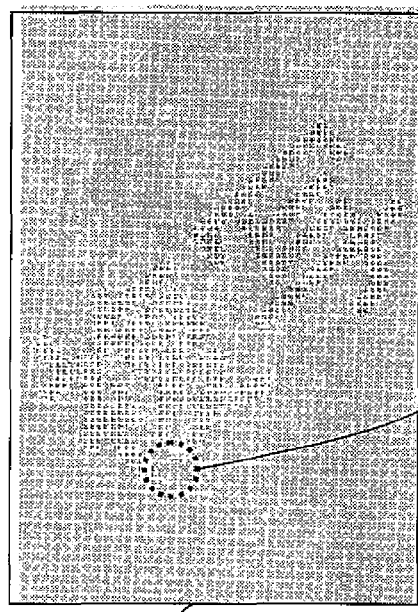
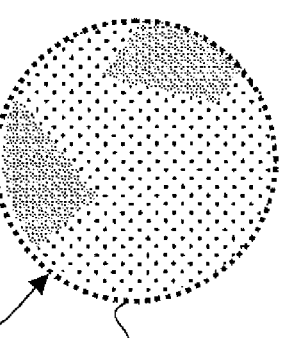

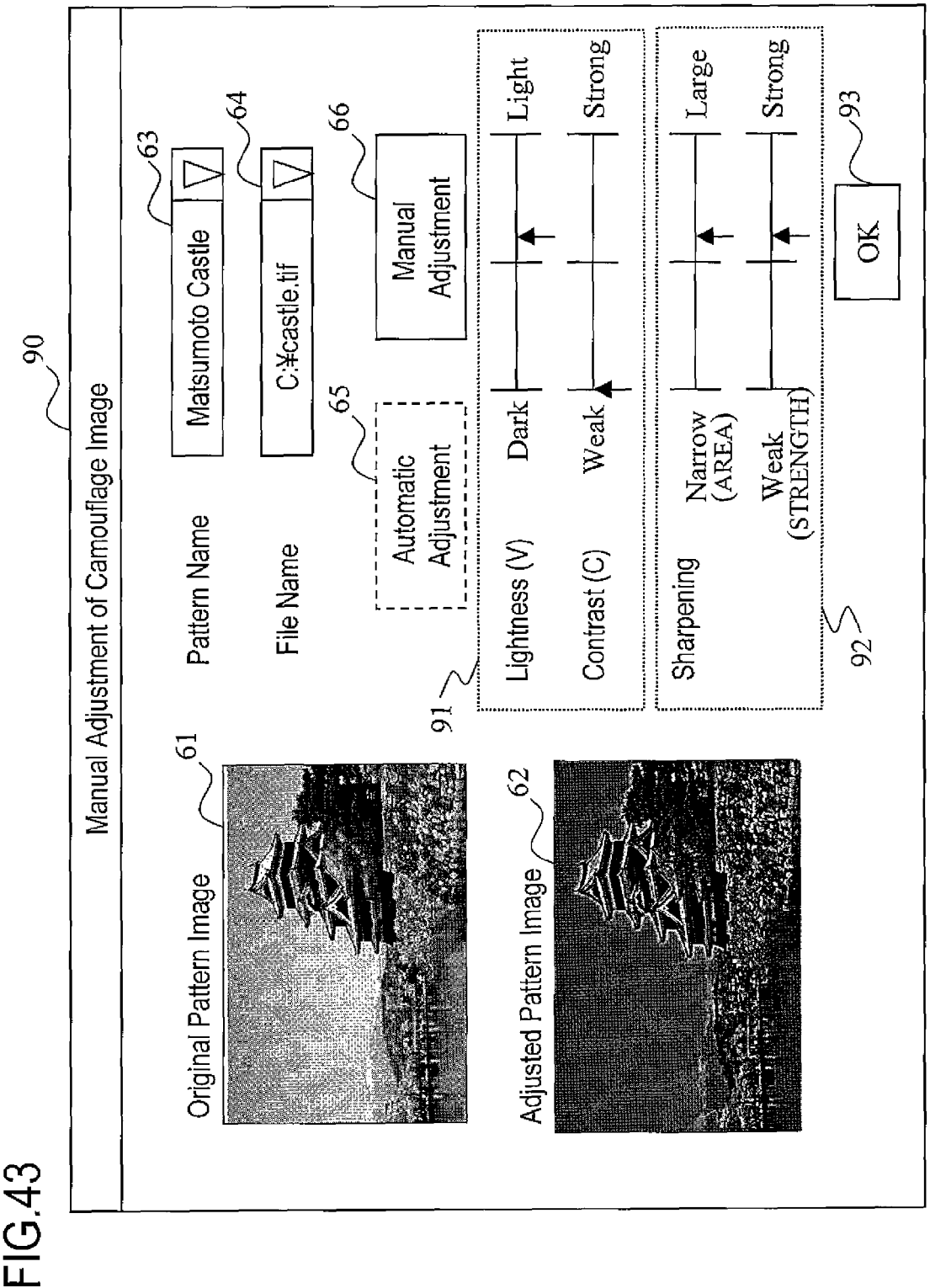

TINT BLOCK IMAGE GENERATION PROGRAM AND TINT BLOCK IMAGE GENERATION DEVICE USING MULTI-GRAYSCALE CAMOUFLAGE PATTERN DATA

CROSS-REFERENCE TO RELATED APPLICATIONS

This application is based upon and claims the benefit of priority from the prior Japanese Patent Applications No. 2008-7841, filed on Jan. 17, 2008, and No. 2008-7842, filed on Jan. 17, 2008, the entire contents of which are incorporated herein by reference.

BACKGROUND OF THE INVENTION

1. Field of the Invention

The present invention relates to a tint block image generation program and a tint block image generation device, and more particularly to a program and device for generating tint block image data to be printed on a print medium, which has an effect to inhibit forgery by copying an original print medium on which a tint block image is printed based on the tint block data.

2. Description of the Related Art

The tint block is combined with the original image as background, and allows distinguishing whether the print document is the original or the copy. Characters or images in the tint block can hardly be identified in the original, but if copied, the characters or images in the tint block emerge. Using this, the original and the copy can easily be distinguished. Also the characters or images in the tint block emerge in copying, so if an original is generated combining with the tint block, an attempt to copy the original is psychologically discouraged.

The tint block is disclosed in Japanese Patent Application Laid-Open No. 2005-151456, and details follow according to this description.

Generally a tint block is comprised of two areas: a "latent image portion" where dots printed in the original remain or decrease little by copying, and a "background portion" where dots printed in the original are lost or greatly decreased by copying. In other words, in the latent image portion, density changes little by copying, and the original image is reproduced as is, and in the background portion, density changes considerably by copying, and the original image disappears. The characters or images of the tint block are generated by these two areas, and the characters and images of the tint block are called the "latent image".

The densities of the latent image portion and the background portion are roughly the same, and in the original state, it is visually difficult to find such characters or images as "COPIED" of Japanese character are concealed in the tint block, but at the micro level, the background portion and latent image portion have different characteristics. When the tint block is copied, a density difference is generated between the latent image portion and the background portion, because of the difference of the respective change of density, which makes it easier to discern the characters or images of the tint block created by these two areas.

The latent image portion is comprised of clustered dots so that dots can be easily read when copying (scanning by copying), whereas the background portion is comprised of dispersed dots so that dots cannot be easily read when copying. By this, dots tend to remain in the latent image after copying, and dots tend to disappear in the background portion more easily than the latent image portion. Clustered dots or dispersed dots can be implemented by half tone processing using a different number of lines of half tone dots. In other words, half tone dots of which screen ruling is low are used to obtain a clustered dot arrangement, and half tone dots of which screen ruling is high are used to obtain a dispersed dot arrangement.

Generally a copier has a limitation in image reproducing capability, which depends on the input resolution in a step of reading the micro dots of a copy target original by a scanner, and the output resolution in a step of reproducing micro dots, read by the scanner, using a print engine. Therefore if isolated micro dots exist in the original, exceeding the limitation of the image reproducing capability of the copier, the micro dots cannot be perfectly reproduced in a copy, and the portions of the isolated micro dots disappear. In other words, if the background portion of the tint block is created so as to exceed the limitation of the dots that the copier can reproduce, then large dots (clustered dots) in the tint block can be reproduced by copying, but small dots (dispersed dots) cannot be reproduced by copying, and a concealed latent image appears in the copy. Even if the dispersed dots in the background portion do not disappear completely by copying, a density difference is generated between the background portion and the latent image portion after copying if the degree of loss of dots is high, compared with the clustered dots in the latent image portion, then a concealed latent image appears in the copy.

In the tint block, a technology called "camouflage" is used to make it more difficult to discern characters or images concealed as a latent image. This camouflage technology is a method for arranging patterns, of which density is different from the latent image portion and the background portion, in the entire tint block image, and in a macro view, the camouflage patterns, of which density is different from the latent image portion and the background portion, standout, making the latent image even more obscure. In other words, the contrast of the camouflage patterns is high, and the contrast of the latent image portion and the background portion is smaller than this, so the latent image is more effectively concealed because of optical illusion. Also the camouflage pattern can give a decorative impression on printed matter, and allows creating an artistically designed tint block. Generally a camouflage pattern is created in binary, and the camouflage pattern is formed by not generating dots of the tint block in an area corresponding to the camouflage pattern. The camouflage pattern with two grayscales is disclosed in Japanese Patent Application Laid-Open No. H04-170569. The above is an overview of the tint block.

FIG. 1 shows an example of a latent image of a tint block and a camouflage pattern. In a latent image mask pattern 10 of the Japanese character "COPY", the black portion corresponds to the latent image portion LI of the tint block, and the white portion corresponds to the background portion BI of the tint block, for example, as the enlarged view 10X shows. In the camouflage pattern 12, on the other hand, the black portion CAM becomes an area where the dots of the tint block are not formed, and the white portion becomes an area where dots of the tint block are formed, for example, as the enlarged view 12X shows.

FIG. 2 is a diagram depicting an example of an original in which a tint block is printed. In the tint block 14, a latent image portion LI and a background portion BI are formed based on the latent image mask pattern 10 in FIG. 1. The latent image portion LI is formed by dots with low screen ruling (53 lpi) based on a clustered dot dither method, and the background portion BI is formed of dots with high screen ruling (212 lpi) based on the dispersed dot dither method. As the enlarged tint block 14X shows, the entire tint block has a predetermined output density, but the dots in the latent image portion LI are large dots formed by a screen with low screen ruling, and the dots in the background portion BI are small dots formed by a screen with high screen ruling.

In the tint block 16, the latent image portion LI and the background portion BI are formed, excluding a black area CAM of the camouflage pattern, based on the latent image mask pattern 10 and the camouflage pattern 12 in FIG. 1. As the enlarged tint block 16X shows, the entire tint block has a predetermined output density, where dots are not formed in the area CAM of the camouflage pattern, and in another area, the latent image portion LI formed by large dots and the background portion BI formed by micro dots are formed just like FIG. 1. Since the contrast of the camouflage pattern is high, the latent image (the Japanese character "COPY"), comprised of the latent image portion LI and the background portion BI, of which contrast is low, does not stand out.

In the original of the forgery inhibited tint block in FIG. 2, the output density of the latent image portion LI and the background portion BI are the same, whereby the latent image of the Japanese character "COPY" formed by these portions is concealed. This is referred to as the "concealment capability for a latent image in the original is high".

FIG. 3 is a diagram depicting an example of a copy of the tint block. The copy 18 is created via a scanning step and dot generation step (step of printing the print media based on the scan data generated in the scanning step) by copying, and as the enlarged view 18X shows, large dots in the latent image portion LI are hardly lost, but many micro dots in the background portion BI are lost. As a result, in the copy 18, the output density of the latent image LI hardly drop, but the output density of the background portion BI drop considerably, and the latent image of the Japanese character "COPY" emerges. In other words, the latent image of the copy is more easily identified.

The copy 20 is the same as the copy 18, except for the area CAM of the camouflage pattern. The contrast of the camouflage pattern drops because of the drop in the output density of the background portion BI, and the latent image COPY emerges.

FIG. 4 are diagrams further enlarging the enlarged view of the original in FIG. 2 and the enlarged view in the copy in FIG. 3. In the original shown in (a), the latent image portion LI is formed by dots (halftones), with low screen ruling and a large area, and the background portion BI is formed by micro dots with high screen ruling. No dots are formed in a black portion CAM of the camouflage pattern. In the copy (b), on the other hand, the size of the large dots (halftones) in the latent image portion LI do not change much, but a considerable number of micro dots in the background portion BI are lost. As a result, in the copy, the output density of the latent image portion LI hardly drops, while the output density of the background portion BI drops considerably where the latent image "COPY" of the tint block emerges clearly.

SUMMARY OF THE INVENTION

As mentioned above, implementing both high concealment capability for the latent image in the original and high identification capability for a latent image in the copy is demanded for tint blocks. Adding a camouflage pattern can improve the concealment capability in the original, and provide a decorative image to the printed matter, making the tint block design artistic.

However a first problem is that a camouflage pattern formed by binary information, whether dots are generated or not, on the tint block is poor in the artistic expression of a pattern. A second problem is that in the case of the tint block with camouflage pattern 16 in FIG. 2, the contrast of the camouflage pattern is high, and it is difficult to discern the latent image, which is good for improving the concealing capability in the original, but contrast is so strong that the camouflage pattern stands out too much when the original image (printed document image) is combined. A third problem is that identification capability for the latent image is lower in the copy 20, which has a camouflage pattern in FIG. 3, than in the copy 18 which does not have a camouflage pattern, since dots are not formed in areas CAM which correspond to the camouflage pattern in the latent image "COPY" in the copy 20. In other words, the presence of the camouflage pattern drops the identification capability for the latent image in the copy.

As mentioned above, it is demanded to prevent a drop in document discerning capability in the original, and to prevent a drop in latent image identification capability in the copy when a camouflage pattern formed by binary information is used. It is also demanded to improve the capability of artistic expression of camouflage patterns. Further, it is demanded that a color image created or obtained by a user can be used as a camouflage pattern.

With the foregoing in view, it is an object of the present invention to provide a program and a device for generating a tint block with which design flexibility of a camouflage pattern is increased.

It is another object of the present invention to provide a program and device for generating a tint block with a camouflage pattern, which can prevent a drop in discerning capability for an original print document while maintaining the concealing capability for a latent image in an original.

It is still another object of the present invention to provide a program and a device for generating a tint block with a camouflage pattern which can prevent a drop in identification capability for a latent image in the copy.

To achieve the above object, a first aspect of present invention provides a computer-readable storage medium for recording a tint block image generation program that causes a computer to execute a tint block image generation step of generating tint block image data including a latent image portion and a background portion which have different output densities to be reproduced by copying, the tint block image generation step comprising:

a camouflage pattern registration step of accepting an input of multi-grayscale camouflage pattern data and storing in a memory the multi-grayscale camouflage pattern data, which has been input; and a tint block image data generation step of generating a latent image portion image data based on a latent image portion screen for an area corresponding to the latent image portion, and generating a background portion image data based on a background portion screen for an area corresponding to the background portion, for grayscale values of the multi-grayscale camouflage pattern data.

In the first aspect, it is preferable that the tint block image generation step further comprises a correcting step of correcting grayscale values of the multi-grayscale camouflage pattern data based on input grayscale values of the latent image portion and background portion so as to generate corrected camouflage pattern data, wherein in the tint block image data generation step, the corrected camouflage pattern data is used as the multi-grayscale camouflage pattern data.

In the first aspect, it is preferable that the tint block image generation step further comprises an adjustment step of adjusting the grayscale values of the stored multi-grayscale camouflage pattern data to be a lower lightness, so as to generate adjusted multi-grayscale camouflage data, wherein in the tint block image data generation step, the adjusted multi-grayscale camouflage pattern data is used as the multi-grayscale camouflage pattern data.

In the first aspect, it is preferable that in the adjustment step, a contrast enhancement processing to enhance lightness contrast of the grayscale values is performed for the grayscale values of the stored multi-grayscale camouflage pattern data.

In the first aspect, it is preferable that in the adjustment step, a sharpening processing to enhance light contrast of grayscale values for an edge portion of the camouflage pattern is performed for the grayscale values of the stored multi-grayscale pattern data.

In the first aspect, it is preferable that the tint block image generation step further comprises a gray grayscale value generation step of converting grayscale values of a plurality of colors included in color camouflage pattern data into gray grayscale values when the multi-grayscale camouflage pattern data which has been input is color camouflage pattern data, wherein
in the tint block image data generation step, the converted gray grayscale values are used as the multi-grayscale camouflage pattern data.

To achieve the above object, a second aspect of present invention provides a computer-readable storage medium for recording a tint block image generation program that causes the computer to execute a tint block image generation step of generating tint block image data including a latent image portion and a background portion which have different output densities to be reproduced by copying,
the tint block image generation step comprising:
a camouflage pattern registration step of accepting an input of multi-grayscale camouflage pattern data and storing in a memory the multi-grayscale camouflage pattern data, which has been input;
an adjustment step of adjusting grayscale values of the stored multi-grayscale camouflage pattern data to a lower lightness so as to generate adjusted multi-grayscale camouflage pattern data;
a correcting step of correcting the grayscale values of the adjusted multi-grayscale camouflage pattern data based on input grayscale values of the latent image portion and background portion so as to generate corrected camouflage pattern data; and
a tint block image data generation step of generating latent image portion image data based on a latent image portion screen for an area corresponding to the latent image portion, and generating a background portion image data based on a background portion screen for an area corresponding to the background portion, for the grayscale values of the corrected camouflage pattern data.

To achieve the above object, a third aspect of present invention provides a computer-readable storage medium for recording a tint block image generation program that causes a computer to execute a tint block image generation step of generating tint block image data including a latent image portion and a background portion, which have different output densities to be reproduced by copying,
the tint block image generation step comprising:
a gray grayscale value generation step of converting grayscale values of a plurality of colors included in color camouflage pattern data into gray grayscale values so as to generate gray grayscale value data by; and
a tint block image data generation step of generating latent image portion image data based on a latent image portion screen for an area corresponding to the latent image portion, and generating background portion image data based on a background portion screen for an area corresponding to the background portion, for gray grayscale values of the gray grayscale value data.

In the third aspect, it is preferable that the tint block image generation step further comprises a step of inputting color data selected from a plurality of color materials of an image generation device as a color of the tint block image, wherein the tint block image data is output as image data on the selected color.

In the third aspect, it is preferable that the tint block image generation step further comprises a camouflage pattern registration step of storing in a memory the color camouflage pattern data or the gray grayscale value data or both.

A fourth aspect of the present invention provides a tint block image generation device according to the first, second or third aspect.

BRIEF DESCRIPTION OF THE DRAWINGS

FIG. 9 shows output density characteristics with respect to the input grayscale value of the background portion basic dither matrix and the latent image portion dither matrix according to the first embodiment;

FIG. 10 shows a low density area expanded dither matrix 33 for the latent portion used for the present embodiment;

FIG. 11 shows a low density area expanded dither matrix 34 for the background portion used for the present embodiment;

FIG. 15 shows examples of a tint block arrangement;

FIG. 17 shows examples of camouflage patterns stored in a memory;

FIG. 19 shows a normalized background portion dither matrix 34N;

FIG. 20 shows the input-output density characteristics of the normalized background portion dither matrix, the background portion dither matrix before normalization, and the latent image portion dither matrix;

FIG. 31 is a diagram depicting the background portion dither matrix 34.

FIG. 32 is a diagram depicting the latent image portion dither matrix 33N.

FIG. 34 shows a tint block image example (2) when an arbitrary color camouflage pattern is used.

FIGS. 35A, 35B and 35C are diagrams for explaining a function of the lightness drop correction and the contrast correction.

FIG. 36 shows camouflage pattern data after the general contrast correction and lightness correction are performed and a tint block image using this data.

FIG. 41 to FIG. 43 show screens of the camouflage pattern adjustment steps of the printer driver.

DESCRIPTION OF THE PREFERRED EMBODIMENTS

Embodiments of the present invention will now be described with reference to the drawings. The technical scope of the present invention, however, shall not be limited to these embodiments, but extend to matters stated in the Claims and equivalents thereof.

Figure 5:
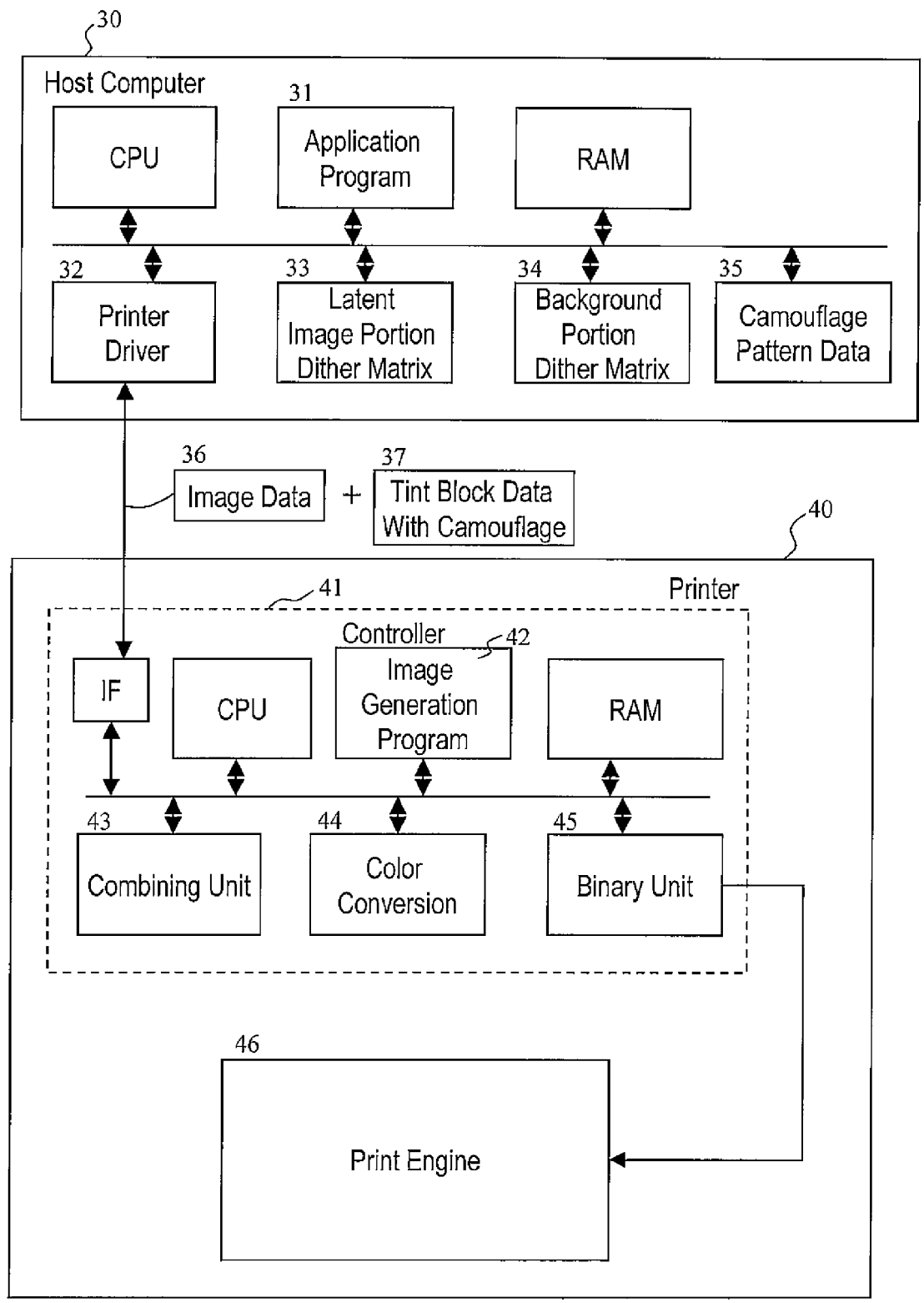
FIG. 5 is a diagram depicting a configuration of a tint block image generation device according to the present embodiment.

FIG. 5 is a diagram depicting a configuration of a tint block image generation device according to the present embodiment. The tint block image generation device comprises a printer driver program 32, a latent image portion dither matrix 33, a background portion dither matrix 34, a camouflage pattern data 35 which are installed in a host computer 30, and a printer 40. The latent image portion dither matrix 33 and the background dither matrix 34 are included in a printer driver program 32, which the printer manufacturer distributes to users via a recording media or via such a network as the Internet, and are stored in a recording media in the host computer when the printer driver program 32 is installed in the host computer. The host computer 30 further comprises a CPU, a RAM and an application program 31, and generates image data comprised of text, images and graphics, by executing the application program 31.

The host computer 30 also generates tint block data with camouflage pattern 37 using the printer driver 32 in response to a request from user. When a print request is received from the user for the image data generated by the application 31, the printer driver generates a print job of the printing target image data 36 based on a printer control language which the printer device 40 can interpret. If the print request from the user includes a request to add the tint block data to the printing target image data 36, then the printer driver 32 generates the tint block data, includes the tint block data 37 in the print job, and sends this data to the interface IF of the printer 40.

The image data 36 could take various forms, such as data described by a page description language, data developed into intermediate code of a printer, and RGB bit map data developed into pixels. The tint block data with camouflage pattern 37 is image data generated by screen-processing the grayscale data of a multi-grayscale camouflage pattern corrected (or modulated) by input grayscales of the tint block using the dither matrices 33 and 34. Further, the tint block data 37 with camouflage pattern is an image data of any color selected among plural color materials of the printer 40. When the color materials have four colors of CMYK, any color of CMY is preferable, for example. According to the present embodiment, the camouflage pattern has a multi-grayscale (three or more grayscales), and the grayscale data of the camouflage pattern is 3-bit or more binary data.

The printer 40, on the other hand, comprises a print engine 46, which comprises a print medium providing unit, a print execution unit for generating an image on a print medium, and a print medium discharge unit, and a controller 41 for performing a predetermined image processing on a received image data 36 and tint block data 37, and controlling the print engine 42. A CPU of the controller 41 executes an image generation program 42 and generates bit map data by developing the received image data 36 into pixels. If the received image data 36 is already in bit map data format, this bit map data can be directly used.

If the image data 36 is RGB grayscale data, the color conversion unit 43 converts this into CMYK grayscale data. Then the combining unit 44 combines a bit map data of a color selected as a tint block color (one of C, M and K) out of CMYK bit map data of the color-covered image data 36 and the dot data of the tint block data 37 (dot presence and dot absence of the tint block are converted into a maximum density value and minimum density value of grayscale values of the bit map respectively, and are combined). This combining is performed, for example, by superimposing the image of the image data 36 on the image of the tint block data 37. Then the binary unit 45 converts the CMYK grayscale data of the image data, after the tint block data is combined, into the dot data in the pixels, and outputs the result to the print engine 46. As a result, the print engine 46 generates a combined image of the print target image generated by the application program and the tint block image generated by the printer driver 32. This is the tint block original.

According to the embodiment in FIG. 5, the printer driver 32 of the host computer 30 generates the tint block data 37. However, as a variant form, the printer driver 32 may generates the print job data for specifying the generation of the tint block and camouflage pattern, in order to have the controller

41 generate the tint block and camouflage pattern, so that the controller 41 of the printer 40 generates the tint block data with the camouflage pattern using the latent image portion dither matrix and background portion dither matrix based on the print job data. The print job data for generating tint block is a data containing information required for generating tint block data with a camouflage pattern, such as the specification of characters and patterns, which disappear or appear during copying, the specification of density of the tint block, and the specification of the camouflage pattern.

[Overview of Tint Block Generation Procedure]

Figure 1:
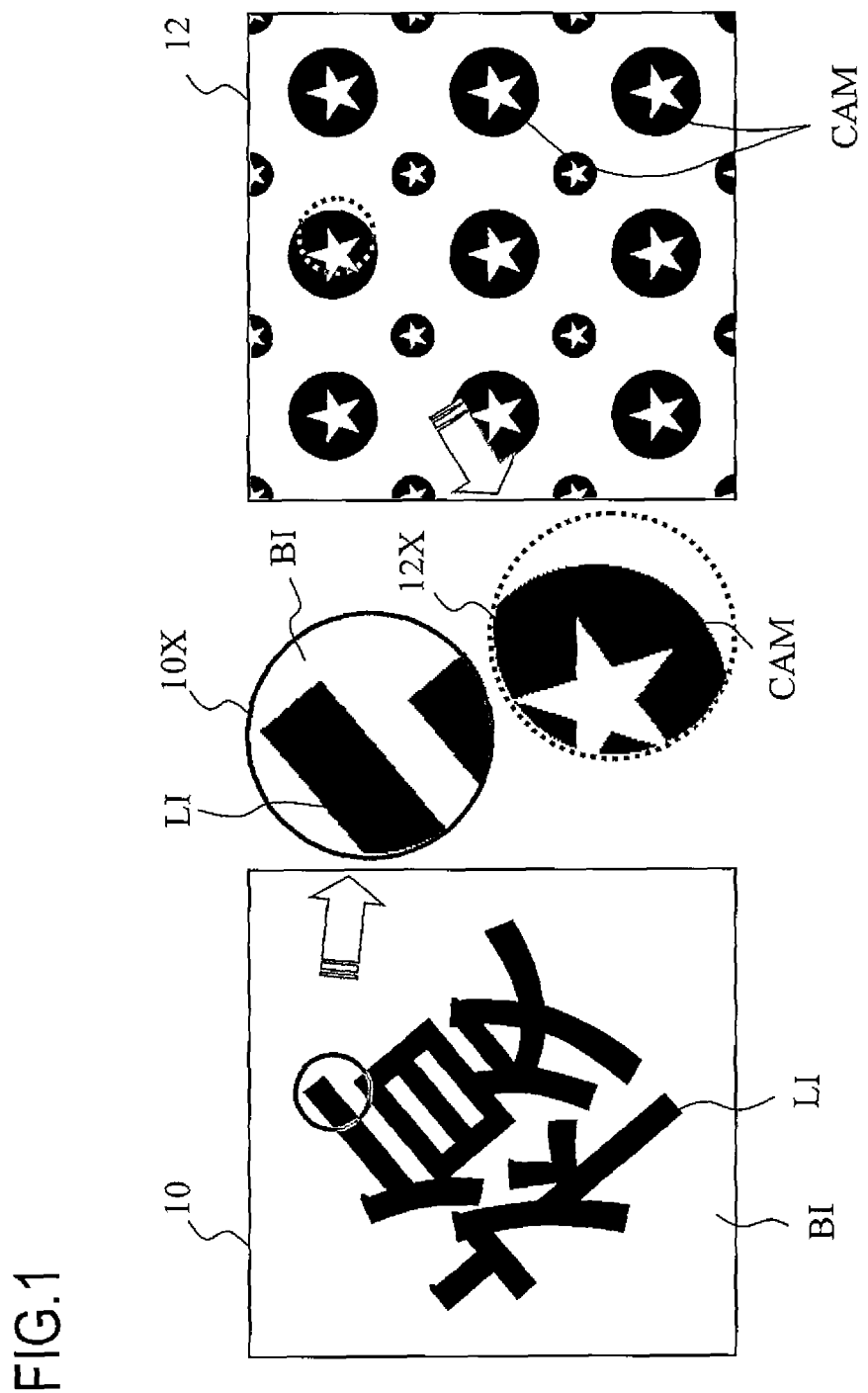
FIG. 1 is a diagram depicting an example of a latent image of a tint block and a camouflage pattern.
Figure 2:
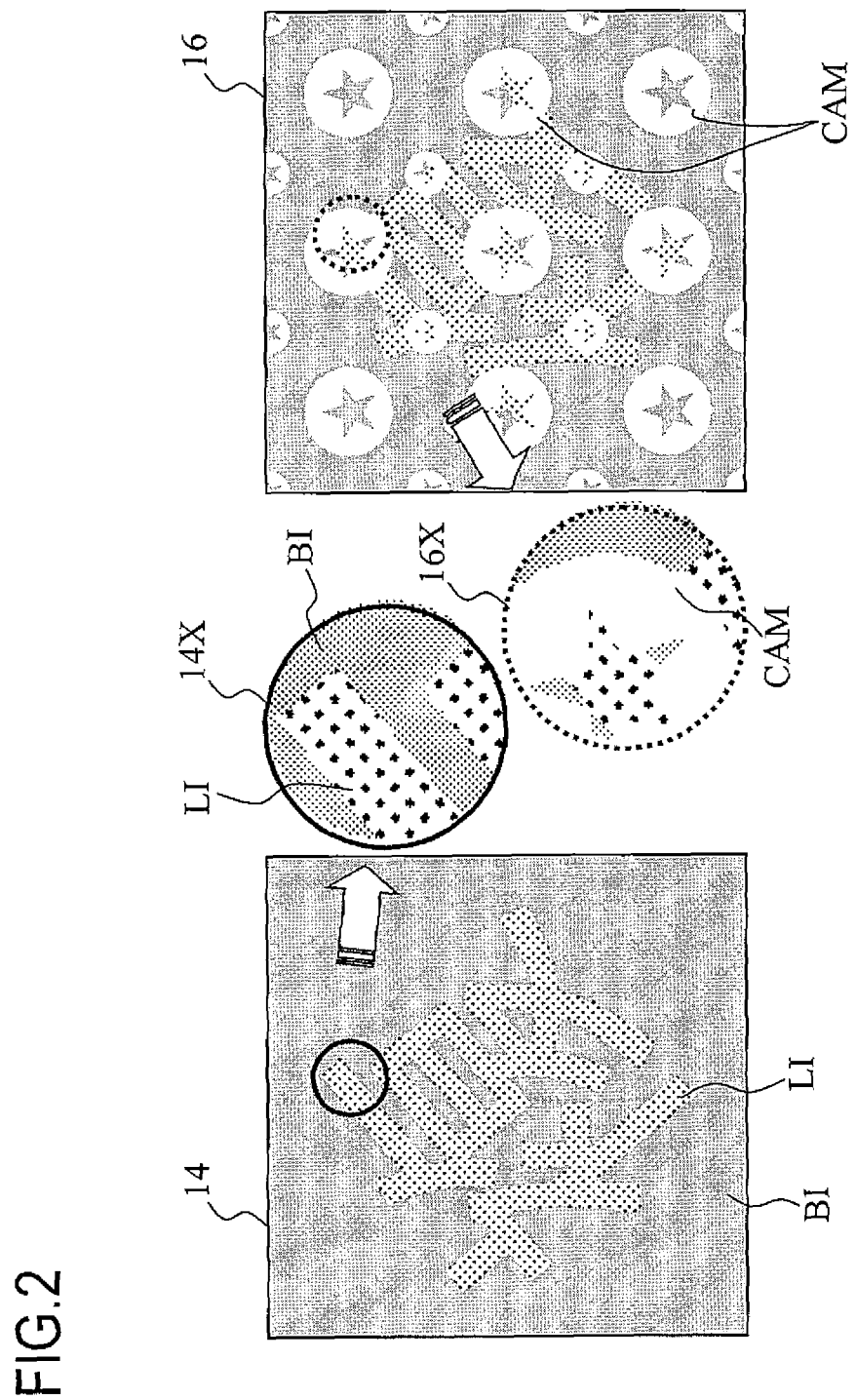
FIG. 2 is a diagram depicting an example of an original of a tint block.

The tint block generation method by the tint block image generation device according to the present embodiment will now be described in brief. The tint block image generation device is a host computer, in the case of the tint block image being generated by the printer driver 32, or the printer 40, in the case of the tint block image being generated by the image generation program 42. In the present embodiment, just like FIG. 1 and FIG. 2, the tint block image generation device generates tint block image data comprised of a latent image portion and a background portion, corresponding to a latent image mask pattern which the user selected from default patterns, or a latent image mask pattern which the user originally generated.

Figure 6:
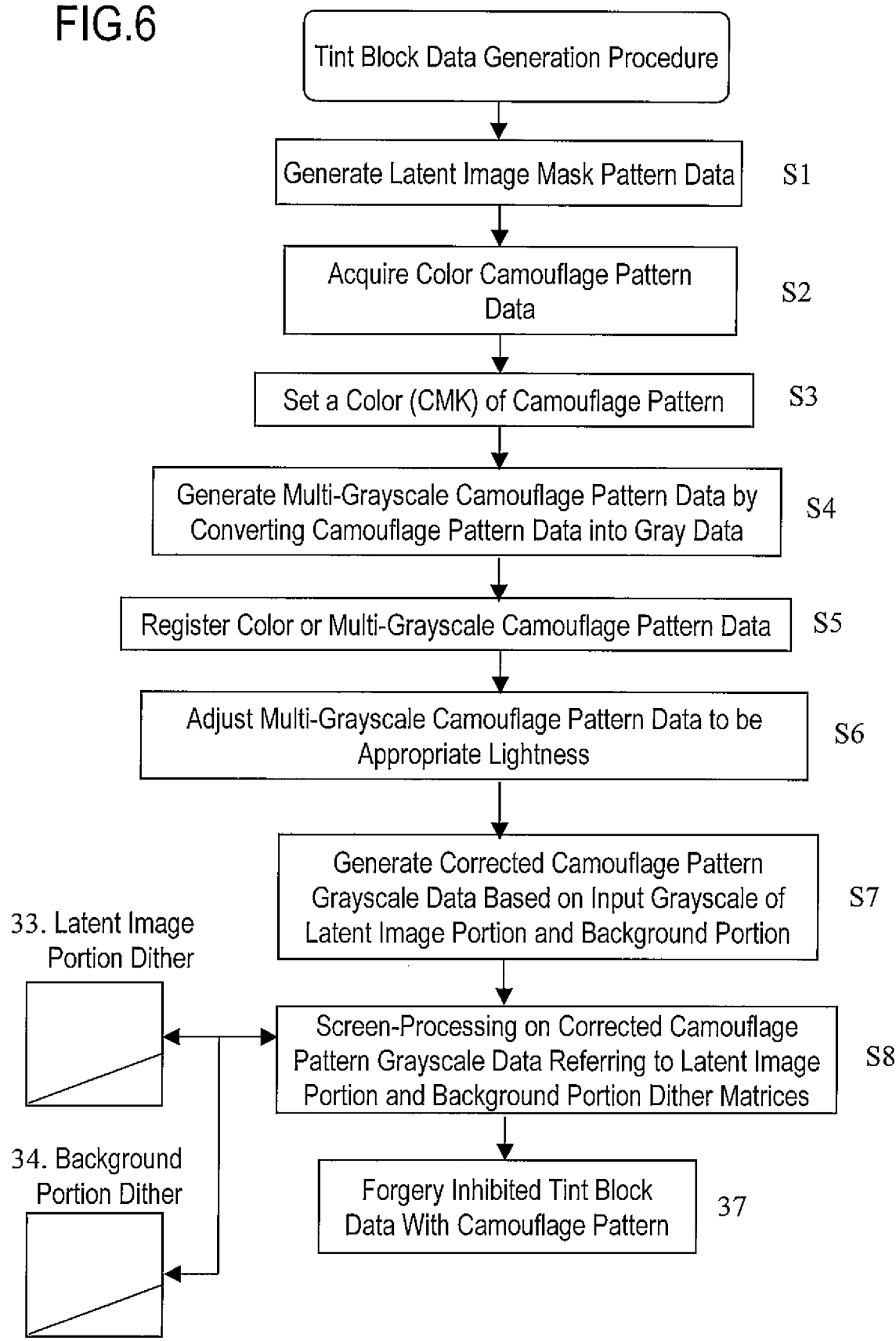
FIG. 6 is a flow chart depicting a tint block data generation procedure according to the present embodiment.

FIG. 6 is a flow chart depicting the tint block data generation procedure according to the present embodiment. The tint block image generation device generates latent image mask pattern data (S1). The latent image mask pattern data is data on the latent mask pattern 10, that is, the character "COPY" shown in FIG. 1, and each pixel is comprised of data, 0 or 1, which indicates a latent image portion LI or a background portion BI. The tint block image generation device input and acquires color or multi-grayscale camouflage pattern data (S2). The color or multi-grayscale camouflage pattern data is color image data, such as color photograph data and color image data, acquired by the user, or data selected from a plurality of color camouflage pattern data 35 stored in a memory of a host computer 30 in advance.

The tint block image generation device sets the color of the camouflage pattern responding to the color selection input for the tint block from the user (S3). The color of the tint block is set to one of CMK (C: Cyan; M: Magenta; K: Black), excluding Y, which has high lightness, from the C, M, Y and K color materials of the printer. The tint block image generation device also calculates the gray grayscale value data based on the grayscale value data of a plurality of colors (e.g. RGB) included in the color camouflage pattern data, and generates monochrome multi-grayscale camouflage pattern data (S4). Then the tint block image generation device stores the color camouflage pattern data or multi-grayscale camouflage pattern data having gray grayscale values in a memory, responding to the registration instruction input from the user, and registers the camouflage pattern (S5).

If the lightness of the multi-grayscale camouflage pattern data having the gray data is higher than a reference value, the tint block image generation device performs adjustment processing to drop the lightness, so as to be an appropriate lightness (S6). Since the user is allowed to use the originally acquired color camouflage pattern and multi-grayscale camouflage pattern, patterns having high lightness may be used. However, if the lightness of the pattern is high, the identification capability for the tint block image in the copy drops when the tint block image with a camouflage pattern is copied. Therefore the tint block image generation device performs adjustment processing for dropping the lightness of the camouflage pattern. In this adjustment processing S6, a contrast enhancement processing to enhance the contrast of the multi-grayscale camouflage pattern, sharpening processing or unsharpening processing to enhance the contrast of the edge portion of the camouflage pattern, for example, are performed according to necessity.

The multi-grayscale camouflage pattern data has 8-bit grayscale data, for example, for each pixel, and this camouflage pattern can represent 256 grayscales, exceeding two grayscales. By using a multi-grayscale camouflage pattern, a drop in identification capability for a print target print document image in the original can be suppressed, and a drop in identification capability for latent images in the copy can also be suppressed. Since a multi-grayscale camouflage pattern can be used, printed matter which excels in design can be created.

The camouflage pattern data according to the present embodiment is 8-bit (0: black to 255: white) grayscale value data for each pixel, and is grayscale image data represented by 256 grayscales. The output density of the camouflage pattern is lower as the grayscale becomes closer to 0 (black), and is higher as the grayscale becomes closer to 255 (white). The output density DA of the tint block, which is output with respect to the grayscale value A (A=0 to 255) of the camouflage pattern is $$DA = (A/255) \times D\max (0 \leq A \leq 255) \qquad (1)$$

where Dmax is the output density of the tint block in the case of no adding the camouflage pattern.

Therefore when the grayscale values of a camouflage pattern are all white (A=255), the output density DA of the tint block with a camouflage pattern becomes DA=Dmax, that is, the same output density as a tint block without a camouflage pattern. In other words, the output becomes the same as the output of the area other than the pattern CAM in 16 of FIG. 2. As the grayscale value of the camouflage pattern becomes closer to 255 (white), the decrease amount of the output density Dmax of the tint block decreases. Whereas as the grayscale value of the camouflage pattern becomes closer to 0 (black), the decrease amount of the output density Dmax of the tint block increases. And when the grayscale values of the camouflage pattern are all black (A=0), the output density DA of the tint block with a camouflage pattern becomes DA=0, and no dots are formed in the tint block. In other words, the output becomes the output of the pattern CAM in 16 of FIG. 2.

As mentioned above, if the multi-grayscale camouflage pattern is used, the multi-grayscale camouflage pattern can be combined with the latent image portion and background portion of the tint block, and compared with 1-bit and two grayscales camouflage pattern data, the contrast of the camouflage pattern can be decreased.

In order to reflect the above camouflage pattern in the tint block, the tint block image generation device generates the corrected camouflage pattern grayscale data based on the input grayscales of the latent image portion and background portion (S3). The input grayscales of the latent image portion and background portion correspond to the output density of the tint block image, and are grayscale values determined by default, or grayscale values corresponding to the output density of the tint block image which the user selected arbitrarily. As the above Expression (1) shows, the tint block image with a camouflage pattern is an image generated by modulating the tint block image comprised of the latent image portion and background portion, with the grayscale values of the multi-grayscales camouflage pattern. In other words, the tint block image with a camouflage pattern is an image generated by modulating the grayscale values of the multi-grayscale camouflage pattern with the input grayscales of the tint block image. The procedure S3 is a procedure to generate the camouflage pattern grayscale data by performing this modulation processing, and the corrected camouflage pattern grayscale data is the modulated grayscale data.

Finally, the tint block image generation device screen-processes the corrected camouflage pattern grayscale data, by referring to the latest image portion dither matrix 33 or the background portion dither matrix 34, according to the latent image mask pattern data, and generates the tint block data with camouflage pattern 37 (S8). In other words, the tint block image data is generated referring to the latent image portion dither matrix 33 in an area corresponding to the latent image portion, and the tint block image data is generated referring to the background portion dither matrix 34 in an area corresponding to the background portion.

The latent image portion dither matrix 33 and background portion dither matrix 34 are a threshold matrix or a grayscale conversion matrix, for example, which are both dither matrices that can be converted into multi-grayscale image data. The dither matrices 33 and 34 may be an AM screen, which represents multi-grayscales by a dot area, or may be an FM screen, which represents multi-grayscales by a dot density. However, the output density to be reproduced in copying must be different between the latent image portion and background portion as an original function of the tint block image, so the screen to be used must implement this function. For example, the screen ruling is different between the latent image portion dither matrix 33 and the background portion dither matrix 34. Or the latent image portion dither matrix 33 and the background portion dither matrix 34 are the dot clustered matrix and dot dispersed matrix respectively.

Now a procedure to generate tint block data with a camouflage pattern according to the present embodiment will be described.

[Latent Image Portion Dither Matrix and Background Portion Dither Matrix]

The latent image portion is generated to be an image with a predetermined output density by a plurality of first dots using the latent portion image dither matrix 33. The background portion, on the other hand, is formed to be an image with a predetermined output density by a plurality of second dots using the background portion dither matrix 34. In order to increase the latent image concealing capability in the original, it is preferable that the latent image portion and background portion become images which have a similar output density.

Figure 4:
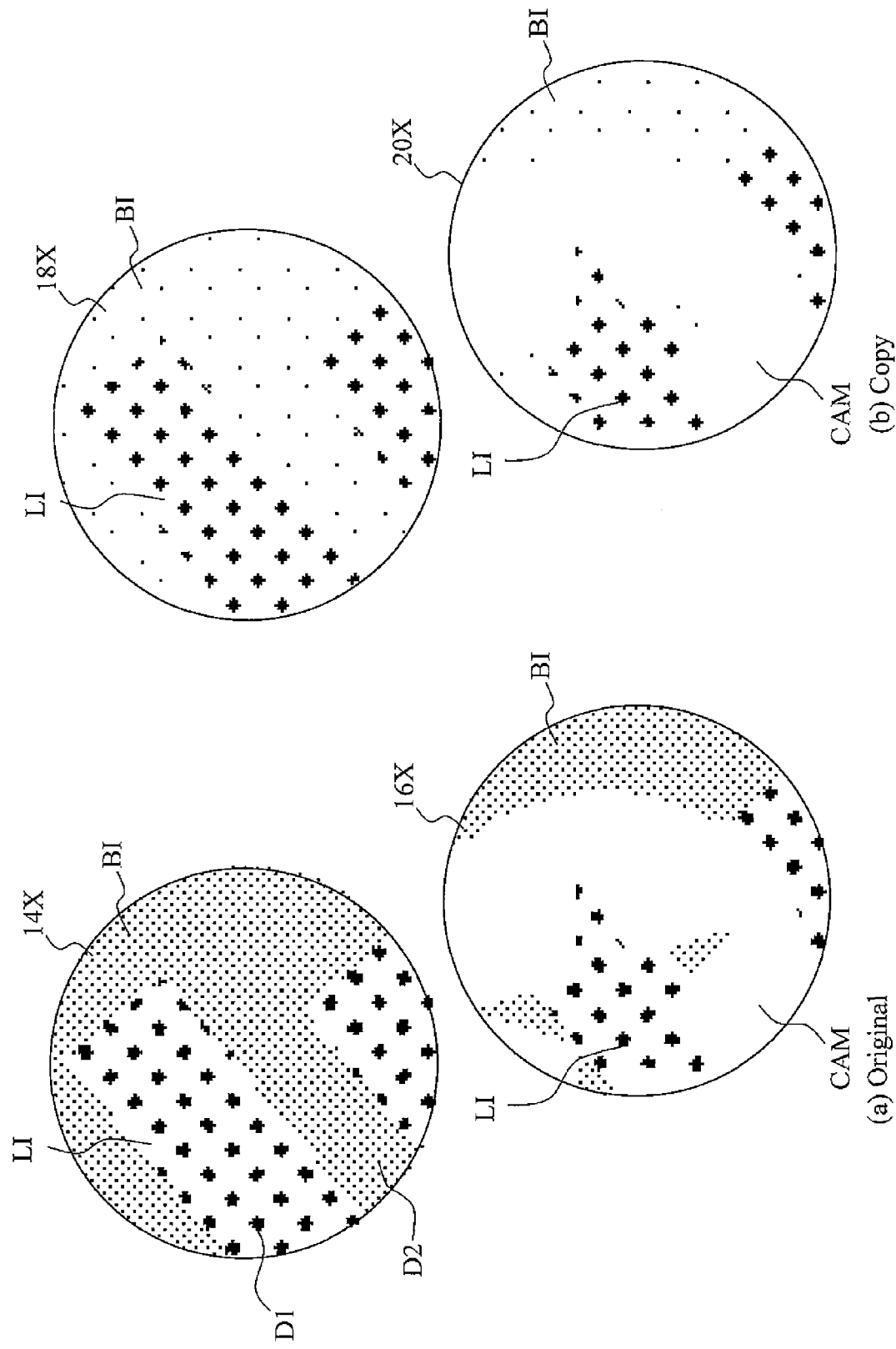
FIG. 4 are diagrams further enlarging the enlarged view of the original in FIG. 2 and the enlarged view of the copy in FIG. 3.
Figure 7:
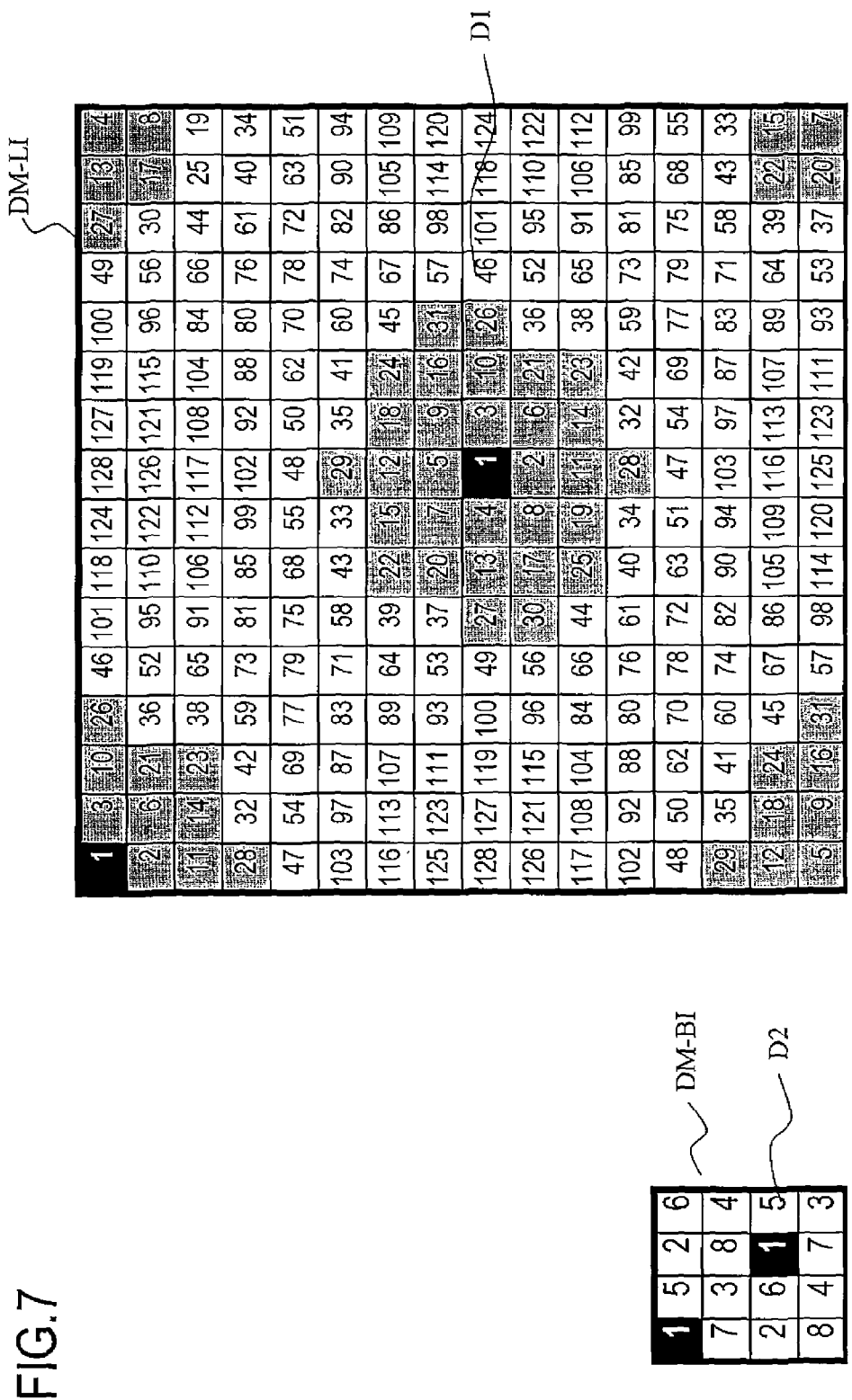
FIG. 7 shows an example of dither matrices for generating images of a background portion BI and a latent image portion LI of a tint block.

FIG. 7 shows an example of dither matrices for generating images of the background portion BI and the latent image portion LI of the tint block. The background portion basic dither matrix DM-BI in FIG. 7A is a dot dispersed dither matrix where each element of the 4×4 matrix has a threshold of 1 to 8. Threshold "1" is assigned to elements at positions of the displacement vectors (−2, 2) and (2, 2), threshold "2" is assigned at positions distant from the elements with threshold "1", and thresholds "3 to 8" are arranged there between. In the tint block image generation step, the input grayscale value of the background portion and the threshold of each element of the background portion basic dither matrix DM-BI are compared, and if the input grayscale value is the threshold or more, a dot is formed in the pixel. For the background portion basic dither matrix DM-BI in FIG. 7A, the input grayscale value is set to "1", and the second dot D2 is formed at a position of the black pixel which has threshold "1". The enlarged view of this is shown in the background portion BI of FIG. 4A, and in the background portion BI, micro dots D2 are formed with screen ruling 212 lpi.

The latent image portion basic dither matrix DM-LI in FIG. 7B, on the other hand, is a dot clustered dither matrix, where each element of a 32×32 matrix has a threshold of 1 to 128. Threshold "1" is assigned to elements at positions of the displacement vectors (−8, 8) and (8, 8), which correspond to the center position of a first dot (halftones) D1. Thresholds "2 to 128" are sequentially distributed from a pixel with a threshold of "1", which corresponds to the center position of the first dot (halftones) D1. In the tint block image generation step, the input grayscale value of the latent image portion and threshold of each pixel of the latent image portion basic dither matrix DM-LI are compared, and a dot is formed in the pixel if the input grayscale value is the threshold or more. In the latent image portion basic dither matrix DM-LI in FIG. 7B, the input grayscale value "31" is set, and a dot is formed at a position of an element which has a threshold of "1 to 13", whereby a large dot (halftones) D1 is formed. The enlarged view of this is shown in the latent image portion LI of FIG. 4A, and large dots D1 are formed with a screen ruling of 53 lpi.

As mentioned above, in the original, the tint block is demanded to keep concealment capability for the latent image high by equalizing output densities of the background portion and latent image portion. In the copy, it is demanded to increase the identification capability for the latent image by increasing the difference of output densities between the background portion and latent image portion, and increasing the output density of the latent image portion. The first dot D1, which is large, hardly disappears in the copy, but the second dot D2, which is small, easily disappears in the copy. Thereby the output densities during copying differs between the latent image portion and background portion.

However, in the image generated by the dither matrices DM-BI and DM-LI in FIG. 7, the number of grayscales (resolution) of the output density is limited in a low output density area used for a tint block, such as an area of which output density is 10 to 15%. In the case of the background portion basic dither matrix DM-BI, a micro dot D2 is formed at a position which has threshold "1", so the background portion is generated with an output density corresponding to this micro dot formation. Whereas in the case of the latent image portion generation step, an input grayscale value that can generate the output density which is the same as the output density of the background portion is selected, and the image in the latent image portion is generated by comparing this input grayscale value with the latent image portion basic dither matrix DM-LI. However, the number of grayscales (resolution) of the output density of the latent image portion LI is limited, as mentioned above, so in some cases, the latent image portion LI may not be generated with an output density matching the output density of the background portion.

Figure 8:
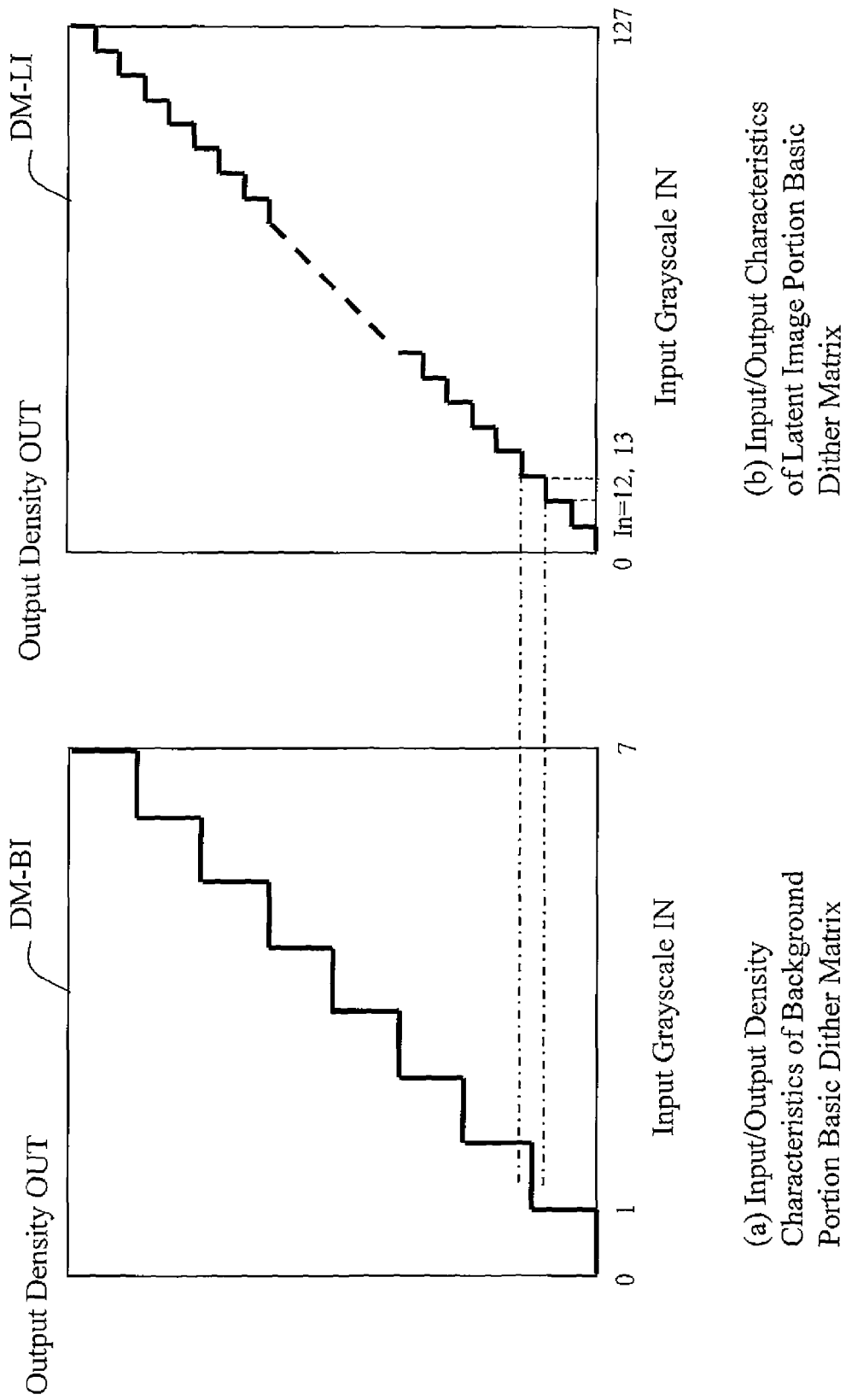
FIG. 8 shows an input grayscale and an output density characteristic of a background portion basic dither matrix DM-BI and a latent image portion basic dither matrix DM-LI.

FIG. 8 shows the characteristics of the input grayscale and output density of the background portion basic dither matrix DM-BI and the latent image portion basic dither matrix DM-LI. The characteristics shown in FIG. 8 are based on the assumption that the number of dots generated in a pixel, of which threshold is less than the input grayscale value, and the output density of the tint block image generated by the printer engine, are in an ideal linear relationship in the basic dither matrix, to simplify description.

When the tint block image generation device uses the latent image portion basic dither matrix DM-LI shown in FIG. 7B as the latent image portion dither matrix 33 and the background portion basic dither matrix DM-BI shown in FIG. 7A as the background portion dither matrix 34, the characteristics of the input grayscale value and the output density of the corresponding latent image portion image data and background portion image data are as shown in FIG. 8. In other words, in the case of the background portion, the output density OUT with respect to the input grayscale value In=0 to 7 may possibly be one of 8 output density values, including "0". This means that the number of grayscales (or resolution) of the output density, from white, where all pixels dots are OFF, to the maximum output density, where all pixel dots are ON, is 8. And as shown in FIG. 7A, in the background portion, micro second dots D2 are dispersed in positions of pixels having threshold "1" of the dither matrix DM-BI with respect to the input grayscale value In=1. Whereas in the case of a latent image portion, the output density OUT may possibly be one of 128 output density values, including "0", with respect to the input grayscale value In=0 to 127. This means that the number of grayscales (or resolution) of the output density, from white to the maximum output density, is 128.

However, the output density corresponding to the input grayscale In=1 in the background portion is between two output densities corresponding to the input grayscales In=12 and 13 in the latent image portion. Therefore, it is not possible to make the output densities of the background portion and latent image portion the same.

The output density range that can be used as the tint block image is 10 to 15% of the maximum output density. In the range of the output density 10 to 15%, the number of grayscales of the output density that can be reproduced by the latent image portion basic dither matrix is at most 20. Since the change of the output densities that can be adjusted by changing one step of the input grayscale value of the latent image portion becomes greater than a predetermined value, it is difficult or impossible to match the output density of the latent image portion with the output density of the background portion at high precision, even if the screen ruling of the latent image portion dither matrix is increased, and the number of grayscales of the output density of the latent image portion is increased.

Even if the change of the output density of the tint block image is enabled within a 10 to 15% range by doubling or quadrupling the size of the background portion basic dither matrix, and increasing the number of grayscales of the output density of the background portion, it is still difficult or impossible to match the output density of the background portion and the output density of the latent image portion at high precision due to reasons similar to above.

FIG. 9 shows an example when the concealment capability for the latent image in the original deteriorates. FIG. 9B shows a tint block image when the input grayscale value of the latent image portion is set to "12" in the latent image mask pattern "COPIED" in FIG. 9A, and FIG. 9C shows a tint block image when the input grayscale value of the latent image portion is set to "13". In FIG. 9B, the output density of the latent image mask pattern is lower than the background portion, therefore the concealment capability for the latent image "COPIED" has dropped. In FIG. 9C, the output density of the latent image mask pattern is higher than the background portion, therefore the concealment capability for the latent image "COPIED" has also dropped.

Therefore in the present embodiment, for the background portion dither matrix and latent image portion dither matrix, the dither matrices which are generated based on the basic dither matrix in FIG. 7, and have characteristics where the output density increases within a low density area, such as 0 to 15%, with respect to the input grayscale value 0 to 255, are used.

Figure 10:
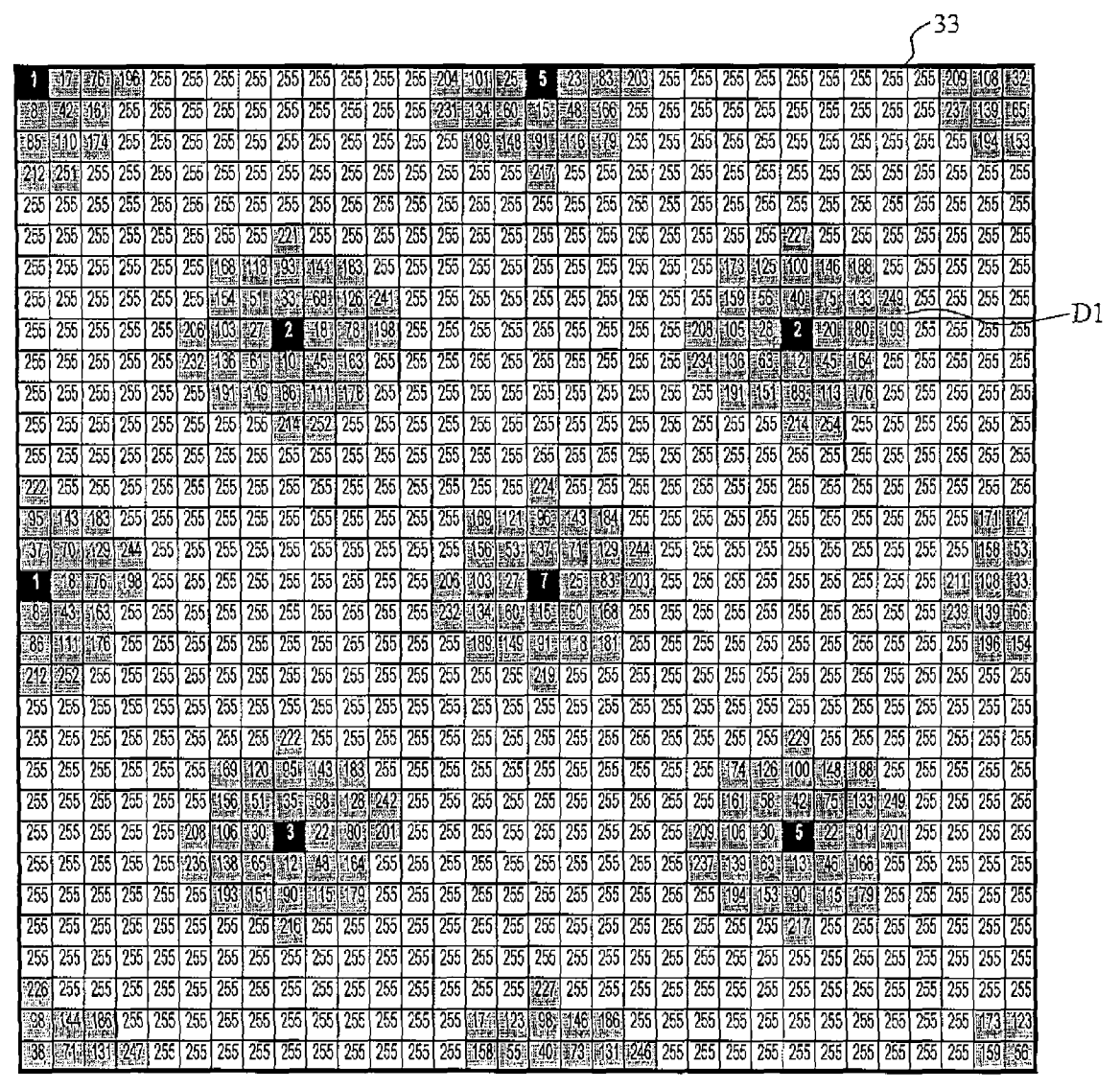
Figure 11:
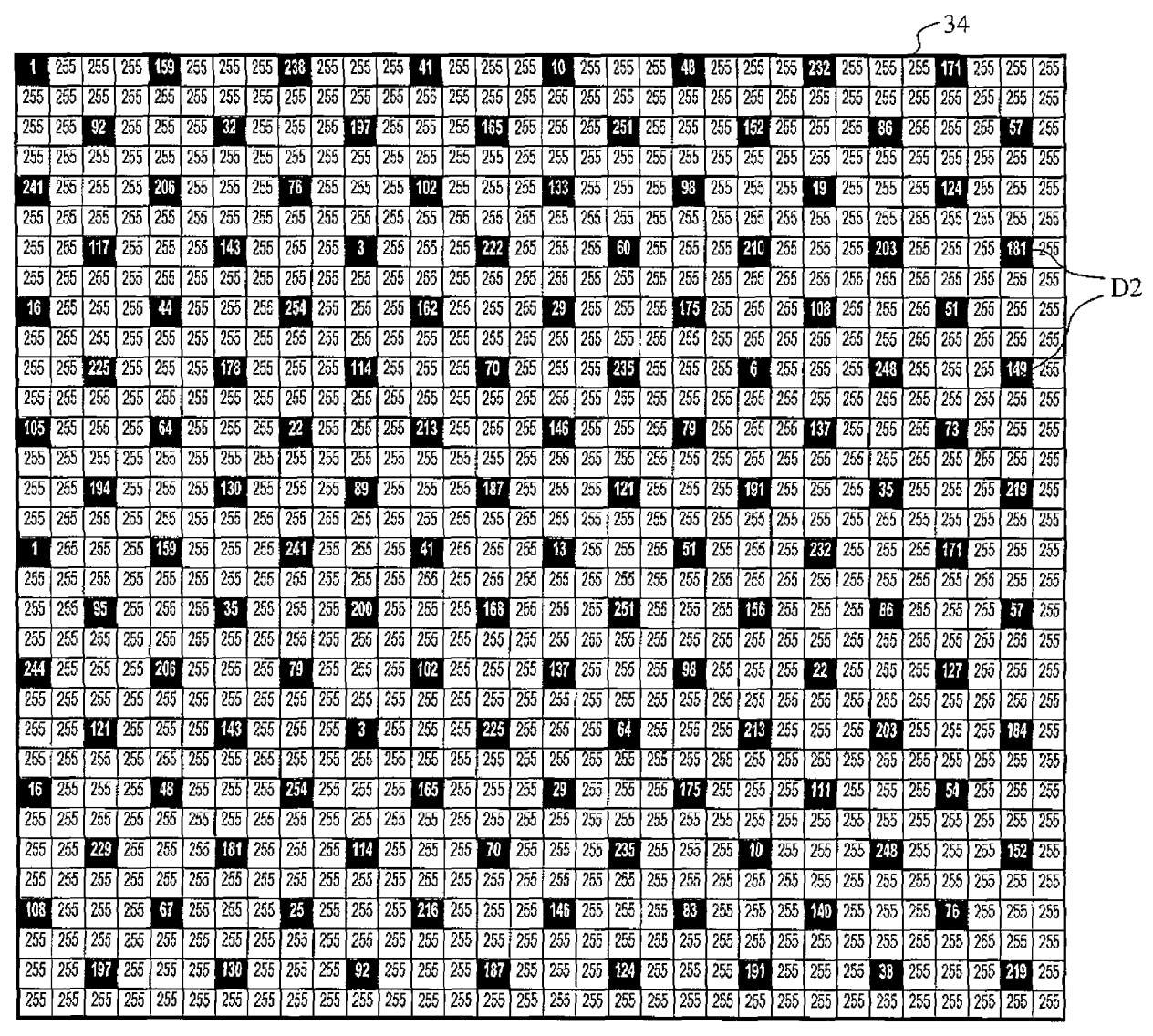
Figure 12:
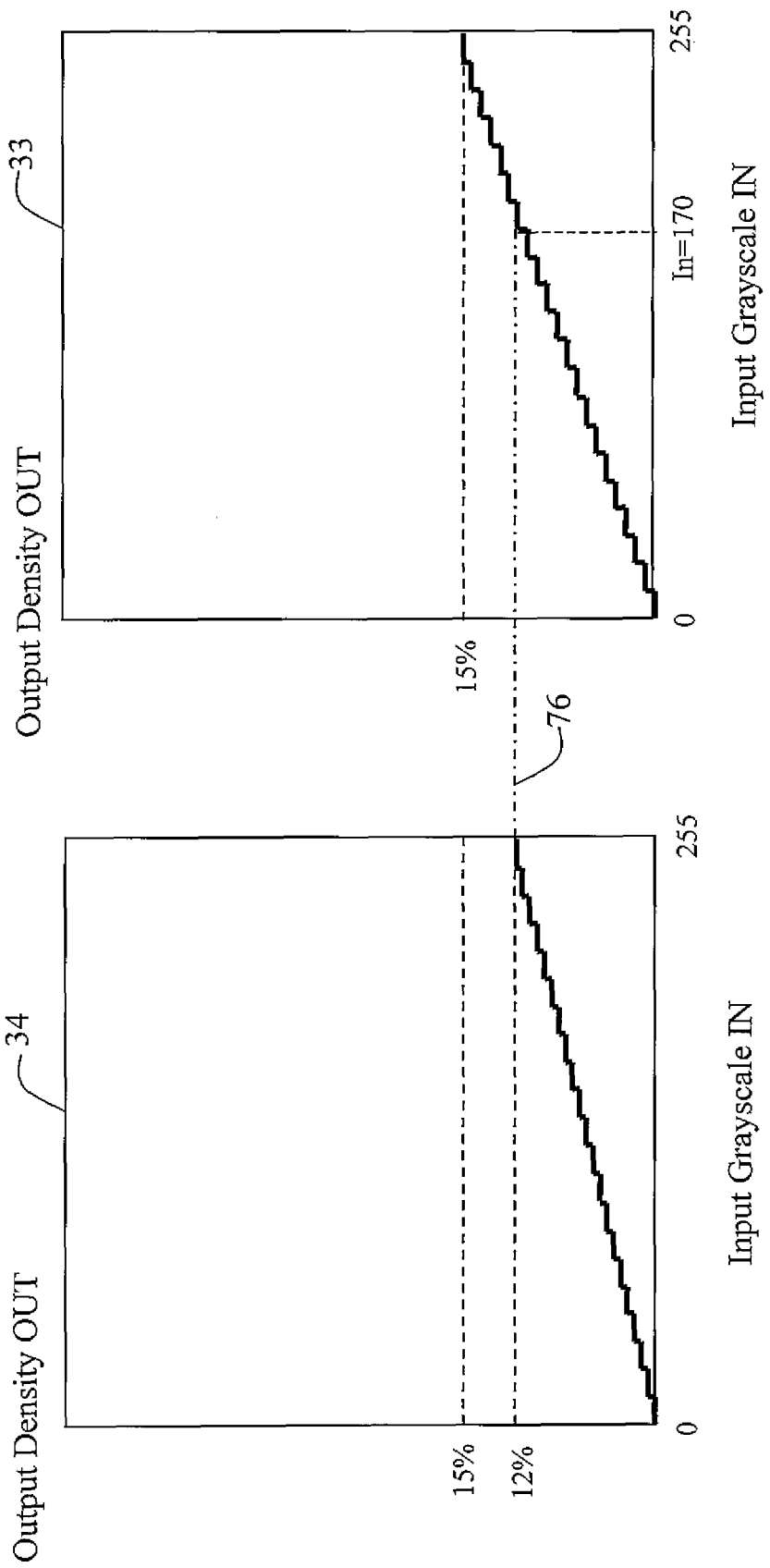
FIG. 12 shows an output density characteristic with respect to the input grayscale value of the latent image portion dither matrix 33 and the background portion dither matrix 34.

FIG. 10 and FIG. 11 show the latent image portion dither matrix 33 in which a low density area is expanded, and the background portion dither matrix 34 in which a low density area is expanded. FIG. 12 shows the output density characteristics of the latent image portion dither matrix 33 and background portion dither matrix 34 with respect to the input grayscale values.

In order to generate the dither matrix 33 34, the sizes of the basic dither matrices DM-BI and DM-LI in FIG. 7 are expanded until the number of grayscales becomes sufficient. For example, the matrix size is expanded to 128×128. In FIG. 10 and FIG. 11, however, a matrix size of 32×32 is shown for convenience. Then all thresholds of the expanded dither matrix are dispersed and diffused so that all thresholds are different in the sequence of dot generation, corresponding to the increase in the input grayscale value. This is called a "diffused dither matrix".

Then using the diffused dither matrix, a background portion and latent image portion, with respect to the plurality of input grayscale values, are printed by a printer, and the output density is measured by a colorimeter. Based on the measurement result of this output density, thresholds are corrected so as to be ideal output density characteristics, such as linear characteristics, with respect to the input grayscale 0 to 255. This correction is the same correction which is normally performed in the calibration step of the screen gamma table. As a result, a corrected and diffused dither matrix is generated.

Finally, the thresholds of the corrected and diffused dither matrix are multiplied by 15/100 so that the maximum value becomes about 15% of the maximum output density, whereby the low density area expanded dither matrices 33 and 34 are generated. In other words, if screen processing is performed using a low density area expanded dither matrix, the output density characteristics, where the output density increases to about 15% at maximum with respect to the input grayscale 0 to 255, are implemented.

In the case of the low density area expanded dither matrix 33 of the latent image portion in FIG. 10, a threshold 1 to 7 is assigned to elements at positions of the displacement vectors (−8, 8) and (8, 8), and a threshold 8 to 254 is assigned to peripheral gray elements thereof. In other words, the black and gray pixels correspond to the maximum size of the first dot D1. The threshold 255 is assigned to other elements. In this case, a dot is generated in pixels of which threshold is less than the input grayscale if the input grayscale is 0 to 254, but the dots of pixels of which threshold is the input grayscale 255 are controlled to be OFF. Or the input grayscale 255 is inhibited in the background portion.

Therefore, by using the low density area expanded dither matrix 33 of the latent image portion, in the image of the latent image portion, the first dot D1 changes from being at the minimum size of an element at positions of the displacement vectors (−8, 8) and (8, 8), to being at the maximum size of the black and gray elements with respect to the input grayscale 0 to 255. Since the output density when the first dot D1 is at the maximum size is 15% solid black, the output density changes in a 0 to 15% range with respect to the input grayscale 0 to 255. Therefore many grayscales (254 grayscales) exist in the output density 0 to 15% range.

In the latent image portion basic dither matrix DM-LI in FIG. 7B, the thresholds 1 to 31 are assigned to the elements where the first dot D1 at the maximum size is generated. Whereas in the low density area expanded dither matrix 33 in the latent image portion in FIG. 10, the thresholds 1 to 254 are assigned to the elements where the first dot D1 at the maximum size is generated. In other words, the number of grayscales (resolution) of the output density is far more than the case in FIG. 7B. This means that resolution in the density adjustment is high, and the output density of the latent image portion can be adjusted to be the same output density of the background portion at high precision.

In the low density area expanded dither matrix 34 of the background portion in FIG. 11, the thresholds 1 to 254 are dispersed in the elements at positions of the displacement vectors (−2, 2) and (2, 2), and the threshold 255 is assigned to other elements. In this case as well, a dot is generated in pixels of which threshold is less than the input grayscale with respect to the input grayscales 0 to 254, but the dots of the pixel of which threshold is the input grayscale 255 is controlled to be OFF. Or the input grayscale 255 is inhibited in the background portion.

If the low density area expanded dither matrix 34 of the background portion is used, micro dots D2 are sequentially generated only in pixels at the positions of the displacement vectors (−2, 2) and (2, 2) for the input grayscale values 0 to 255, and dots are not generated for other pixels. Therefore the image of the background portion has only the micro dots D2 dispersed at positions of a screen ruling of 212 lpi, and other dots are not generated. The output density, when micro dots D2 are generated in all pixels at the positions of the displacement vectors (−2, 2) and (2, 2), is about 12% solid black. In other words, the output density of the low density area expanded dither matrix 34 of the background portion increases or decreases within roughly a 0 to 12% range with respect to the input grayscales 0 to 255. As a result, a stable arrangement of micro dots, with which characteristics of the background portion can be exhibited the most, is guaranteed.

FIG. 12 shows the output density characteristics of the low density area expanded dither matrices 33 and 34 in FIG. 10 and FIG. 11 with respect to the input grayscale values. As mentioned above, the output density characteristics of the background portion dither matrix 34, with respect to the input grayscale value, is that the output density is roughly within a 0 to 12% range with respect to the input grayscales 0 to 255. The output density characteristics of the latent image portion dither matrix 33, with respect to the image grayscale value, is that the output density is in a 0 to 15% range with respect to the input grayscales 0 to 255. In both cases, the output density simply increases, with respect to the input grayscale value, that is, in a linear relationship, because of calibration.

The above is a description on the background portion and latent image portion dither matrices 33 and 34 according to the present embodiment.

[Tint Block Image Data Generation Method]

Now a method for generating the tint block image data with a multi-grayscale camouflage pattern according to the present embodiment will be described.

Figure 13:
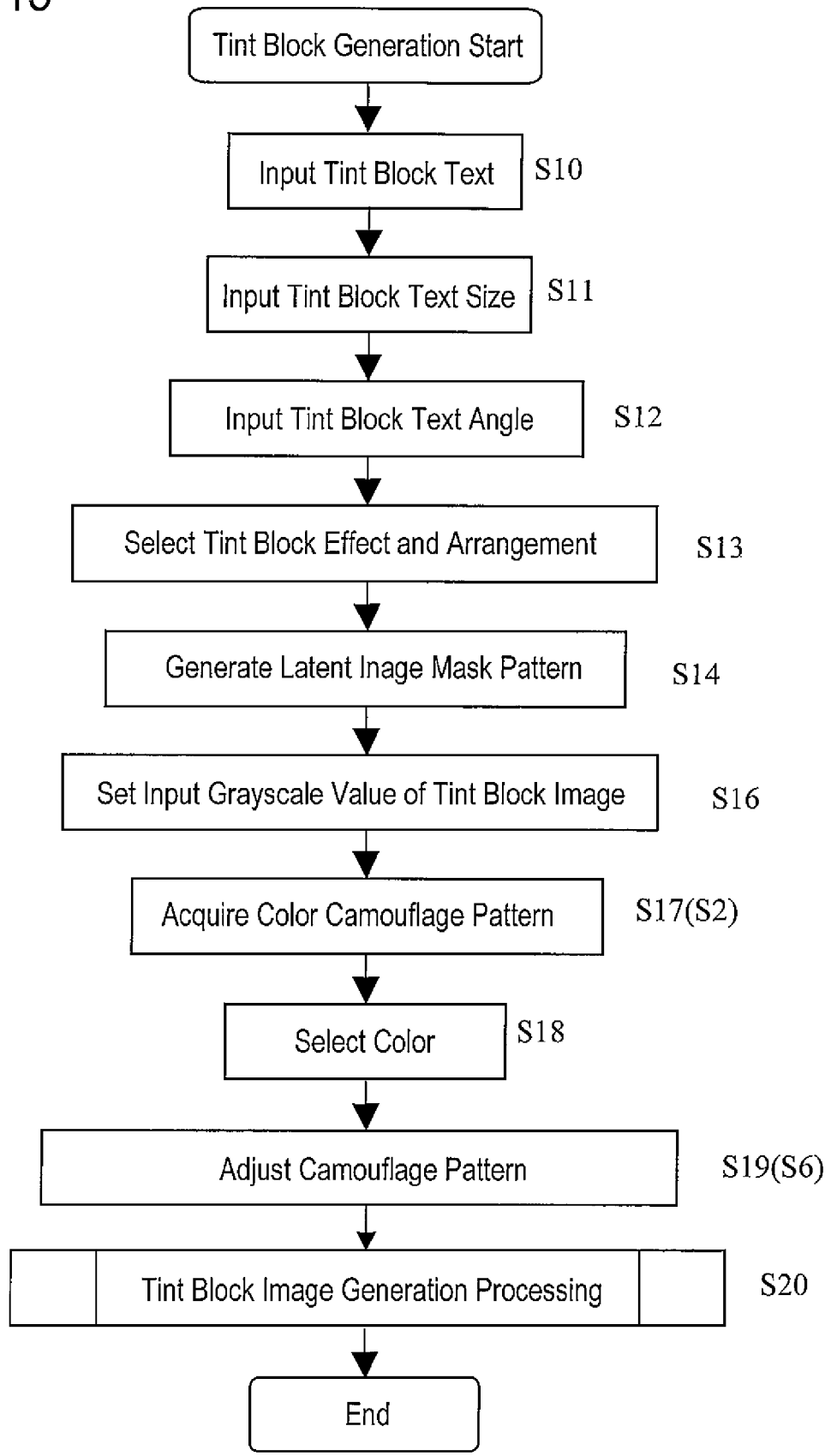
FIG. 13 is a flow chart depicting a tint block image data generation method according to the present embodiment.

FIG. 13 is a flow chart depicting the tint block image data generation method according to the present embodiment. In the printer driver 32 of the host computer 30, the printer user selects the tint block generation menu, and executes the generation of tint block image data according to the flow chart in FIG. 13.

If the user generates an original latent image mask pattern, the user inputs the text of the tint block (S10). For example, the text "COPIED", "DUPLICATE" or "CONFIDENTIAL" and this text becomes the latent image of the tint block. Also the size of the tint block text, such as 48 point, is input (S11), an angle of the tint block text, such as 40 degrees, is input (S12), and the tint block effect and the arrangement are selected (S13). The tint block effect is twofold: the text is either void (text is white and surrounding is block) or embossed (text is black and surrounding is white). In the case of void, the text becomes the background portion, and the surrounding becomes the latent image portion, and in the case of embossed, the text becomes the latent image portion and the surrounding becomes the background portion. The arrangement of the tint block is square, oblique and inverted, for example.

Figure 14:
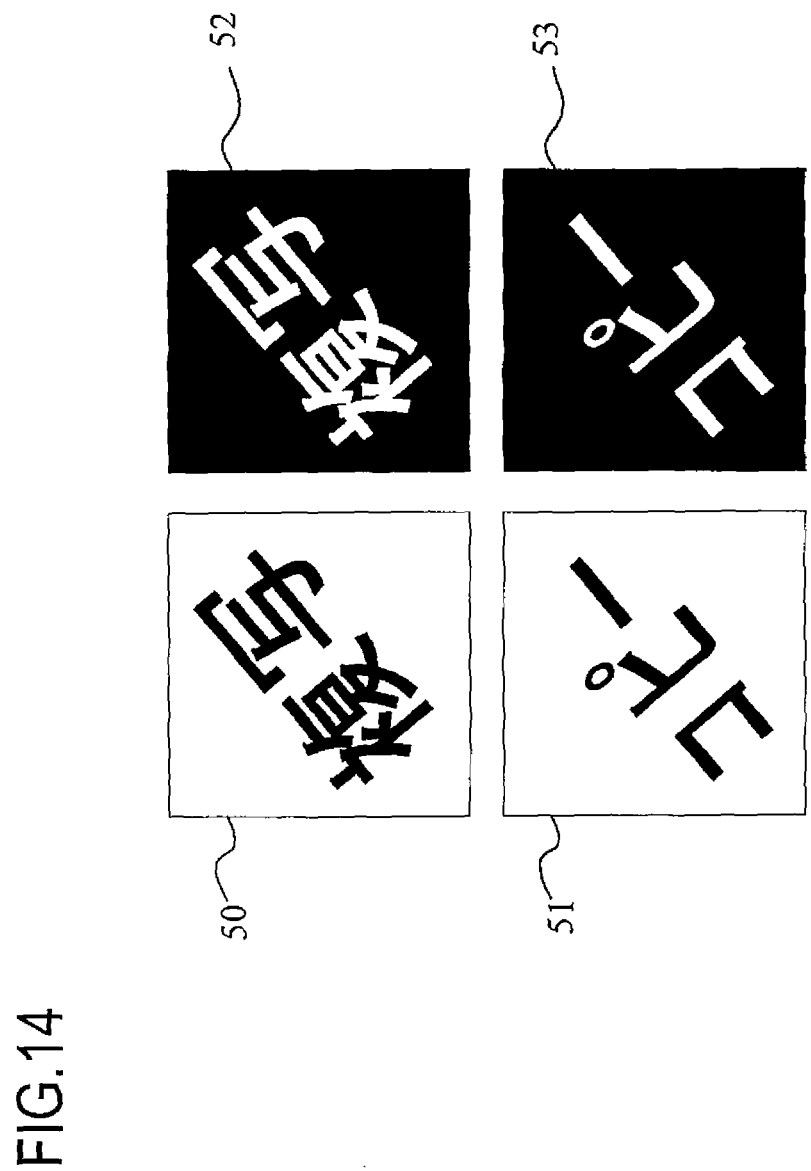
FIG. 14 shows examples of the tint block effect.

FIG. 14 shows an example of the tint block effect. The tint block patterns 50 and 51 are the text COPIED and DUPLICATE, the text is embossed in the original or in the copy thereof. The tint block patterns 52 and 53 are the same above text, but are examples of the tint block effect when the text is void in the original or in the copy. In both cases, the angle of the text is set to 40 degrees.

FIG. 15 shows examples of the arrangement of a tint block. In all these cases, the text is COPIED, the angle is 40 degrees, and the tint block effect is embossed. In the case of (a) square arrangement, the tint block image is generated so that the latent image mask pattern is attached like a tile. In the case of (b), an oblique arrangement, the latent image mask pattern is shifted by a predetermined phase at every line feed. And in the case of (c), an inverted arrangement, the latent image mask pattern is vertically inverted at every line feed.

When the user finishes input or selection in steps S10 to S13, the printer driver 32 generates a latent image mask pattern (S14). An example of the latent image mask pattern is a 1-bit data, where the latent image portion area and background portion area can be distinguished, as shown in FIG. 14.

If the user uses a default latent image mask pattern, S10 to S14 are omitted, and the latent image mask pattern by the user is selected.

Then the printer driver 32 sets the input grayscale value of the tint block (S16). If the latent image portion dither matrix 33 and background dither matrix 34 shown in FIG. 10 and FIG. 11 are used, the maximum value of "255" is selected as the input grayscale value for the background portion, and the input grayscale value In=170, which matches the output density of the background portion (12% of solid black), is selected for the latent image portion. In other words, in the background portion, where the input grayscale value is set to "255", the micro dot D2 is generated in all the black pixels at positions of the displacement vectors (−2, 2) and (2, 2) of the background portion dither matrix 34 (FIG. 11). The output density in this case is 12% of solid black, and a maximum number of dispersed second micro dots are generated, which is the optimum as a tint block image. In the latent image portion, where the input grayscale value is set to In=170, on the other hand, a number of dots corresponding to In=170 are generated in a half tone area comprised of pixels corresponding to the black elements and gray elements of the latent image portion dither matrix 33 (FIG. 10). As a result, the large dot D1 having a size corresponding to the input grayscale value In=170 is generated.

As the output density characteristics in FIG. 12 show, in the latent image portion dither matrix 33 and background portion dither matrix 34 in FIG. 10 and FIG. 11, the output density characteristics with respect to the input grayscale are different. In other words, the inclination of the output density with respect to the input grayscale is greater in the latent image portion dither matrix than in the background portion dither matrix. Therefore if the input grayscale "255", whereby an optimum output image can be reproduced in the background portion, is selected, the input grayscale In=170, of which the output density matches with the output density of the background portion, is selected in the latent image portion.

The printer driver 32 acquires the color or multi-grayscales camouflage pattern data according to the selection request from the user (S17). The color or multi-grayscales camouflage pattern data is stored in a memory of the host computer or external memory, and the printer driver acquires the color or multi-grayscales camouflage pattern according to the selection request from the user. And the selected color or multi-grayscales camouflage pattern data is stored in a memory to be registered.

Figure 16:
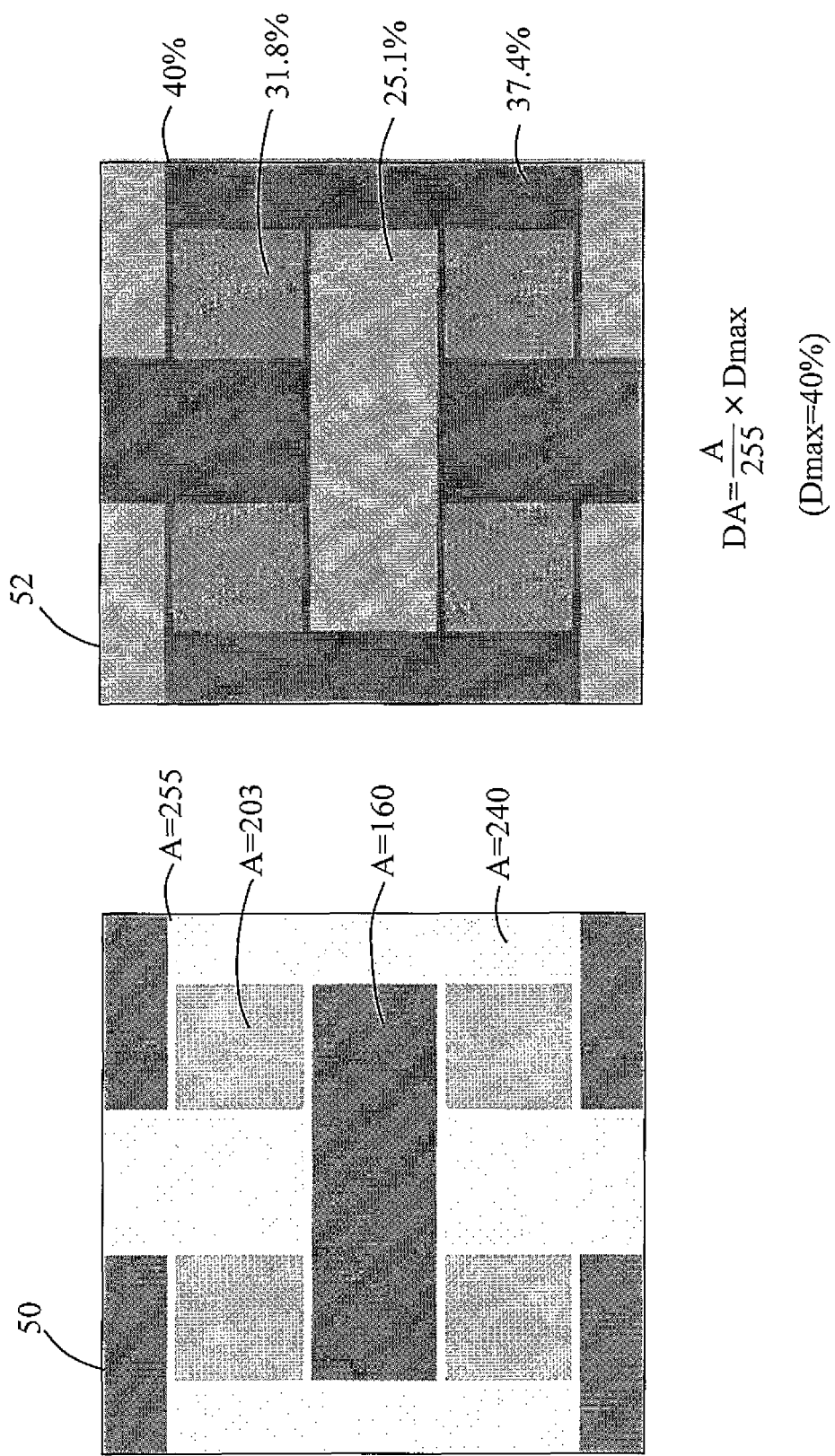
FIG. 16 shows an example of a camouflage pattern and an example of a tint block image using this camouflage pattern.

FIG. 16 shows an example of a camouflage pattern and an example of a tint block image generated by using this pattern. The camouflage pattern 50 is comprised of a plurality of rectangular areas, and the grayscale value A of each rectangular area is as shown in FIG. 16. The tint block image 55 is a tint block generated by selecting this multi-grayscale camouflage pattern. In this tint block image 52, the output density Dmax of the tint block image (e.g. Dmax=40%) is multiplied by A/255 according to the above mentioned Expression (1). In this way, in a darker area of the camouflage pattern, the output density of the tint block image drops more, and in a lighter area of the camouflage pattern, the output density of the tint block image drops less.

FIG. 17 shows examples of the camouflage pattern stored in a memory. FIG. 17 shows ten kinds of camouflage patterns. (1), however, is solid black (grayscale=0), so if this camouflage pattern is used, the tint block image becomes solid white.

Grayscale value A of the camouflage pattern is gray data, as mentioned above. If the camouflage pattern is RGB color image data, the gray grayscale value A is determined by the following Expression (2).

$$A=0.3\times R+0.59\times G+0.11B \tag{2}$$

As a result of defining the gray grayscale values of the camouflage pattern data using black "0" and white "255", the camouflage pattern image generated by the camouflage pattern data and the camouflage pattern image reflected in the tint block are images in which black/white are inverted. In order to allow the user to select the camouflage pattern in a state reflected on the tint block, it is preferable that the printer driver 32 displays a white/black inverted camouflage pattern image on the select screen. The grayscale value K of the image data of the white/black inverted image is determined by the following Expression (3).

$$K=255-A \tag{3}$$

The printer driver 32 also selects the color of the tint block (e.g. black, cyan or magenta) according to the selection request of the user (S18). It is preferable that the color of the tint block is a single color. The grayscale value of the camouflage pattern data of a single color, C, M or K, becomes the grayscale value K of Expression (3), which is an inversion of grayscale value A of the gray data. The reason for this lies in the difference between RGB, which is an addition color mixing indication, and CMYK, which is a subtraction color mixing indication. The later mentioned comparison with the threshold of the threshold dither matrices of the latent image portion and background portion is performed for this grayscale value K or the grayscale value of the corrected camouflage pattern gradation.

Then the printer driver 32 adjusts the camouflage pattern (S19). In the present embodiment, an arbitrary color or multi-grayscale camouflage pattern, which the user acquired by photographing, for example, can be used. Therefore, in some cases an image quality is inappropriate for combining with a tint block image, such as the lightness of a camouflage pattern being too high. Hence a processing for adjusting lightness, contrast and sharpness of the edges of the camouflage pattern is required. Either the camouflage pattern data after adjustment or the parameters required for adjustment is stored in memory. Details on the adjustment processing will be described later.

When S10 to S19, including input by the user, ends, the printer driver 32 executes the tint block image generation processing (S20). The tint block image generation processing is performed according to the flow chart in FIG. 18.

Figure 18:
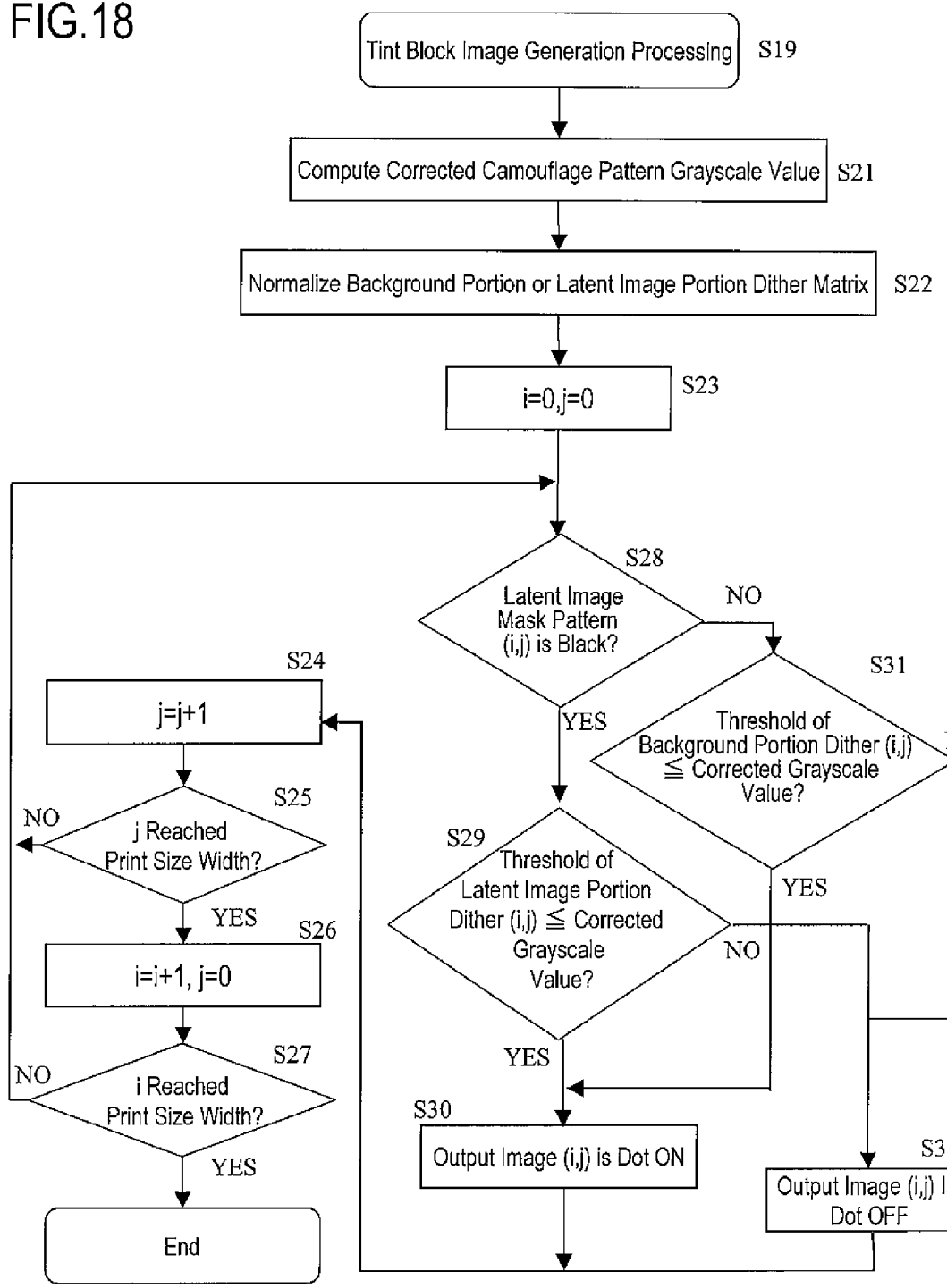
FIG. 18 is a flow chart depicting the tint block image generation processing according to the present embodiment.

FIG. 18 is a flow chart of the tint block image generation processing according to the present embodiment. In other words, the tint block image generation processing S20 in FIG. 13 is shown in the flow chart in FIG. 18. First the grayscale values of the adjusted camouflage pattern data are corrected based on the input grayscale values of the latent image portion and background portion, so as to generate the corrected camouflage pattern data (S21). This procedure corresponds to the procedure S7 in FIG. 6.

It is assumed that the grayscale value of the adjusted camouflage pattern is A ($0 \leq A \leq 255$), and the input grayscale value of the latent image portion and background portion constituting the tint block is In ($1 \leq In \leq 254$). First the grayscale value A of the adjusted camouflage pattern is converted into grayscale value K (=255−A) of subtraction color mixing. Then the grayscale value Ki of the corrected camouflage pattern is calculated according to the following Expression (4).

$$Ki=(K/255)\times In \tag{4}$$

This expression corresponds to the above mentioned Expression (1).

In step S16 to set the input grayscale values of the tint block image in FIG. 13, the input grayscale values was set to "255" in the background portion, and the input grayscale values was set to In=170 in the latent image portion. If different input grayscales values are set for the background portion and the latent image portion in this way, input grayscales values In to be modulated must be different between the latent image portion and background portion according to the latent image mask pattern, when the corrected camouflage pattern grayscale data is computed by Expression (4). This is because the latent image portion dither matrix 33 and background portion dither matrix 34 have different output density characteristics as shown in FIG. 12.

Therefore according to the present embodiment, a common input grayscale values In=170 is used for both the latent image portion and background portion to simplify the computation. However, the background portion dither matrix 34 is normalized so that the maximum output density (12%) is implemented when the input grayscale values is In=170 (e.g. FIG. 20), and screen processing is performed referring to the normalized background portion dither matrix.

Figure 27:
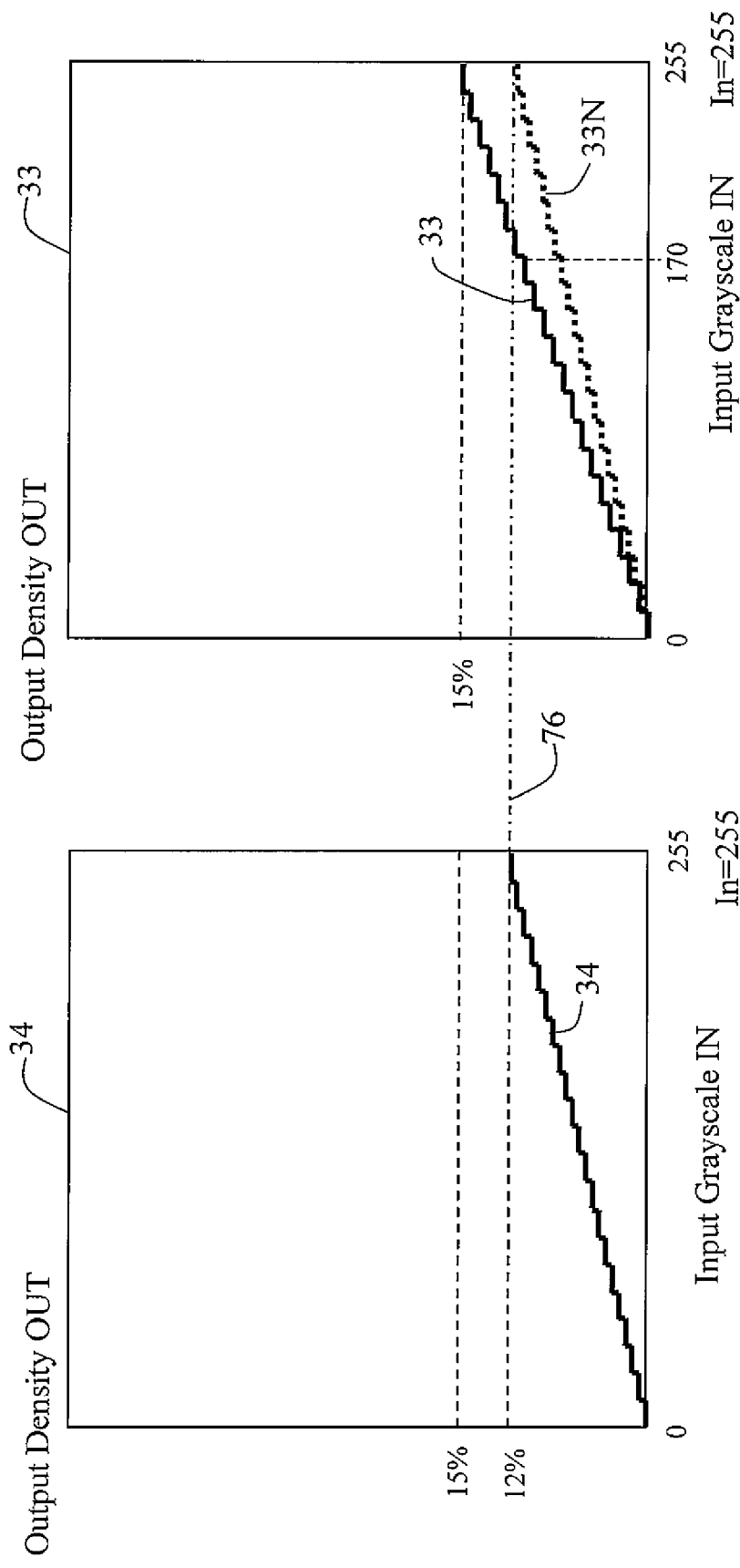
FIG. 27 shows the input-output density characteristics of a background portion dither matrix and a normalized latent image portion dither matrix according to a variant form of the present embodiment.

Or, as in the later mentioned variant form of the present embodiment (see FIG. 27), the input grayscales are set to the maximum value of the possible grayscale values (e.g. 255) for both the latent image portion and background portion, and the latent image portion dither matrix 33 is normalized so that the output density (12%) corresponding to the input grayscale value In=170 is implemented at the input grayscale value "255". In other words, the characteristics of the input grayscale values 0 to 170 of the latent image portion dither matrix and output densities thereof in FIG. 10 and FIG. 12 are normalized by the input grayscale value 0 to 255. The input-output characteristics of the normalized latent image portion dither matrix is shown in FIG. 27 explained later.

Now the case when the input grayscale values In=170 is set will be described. In step S21, the grayscale value data of the corrected camouflage pattern, when the input grayscale values In=170, is computed based on Expression (4). Then the printer driver 32 normalizes the background portion dither matrix 34 in FIG. 11 and FIG. 12 so as to generate the normalized background portion dither matrix shown in FIG. 20 (S22).

Figure 19:
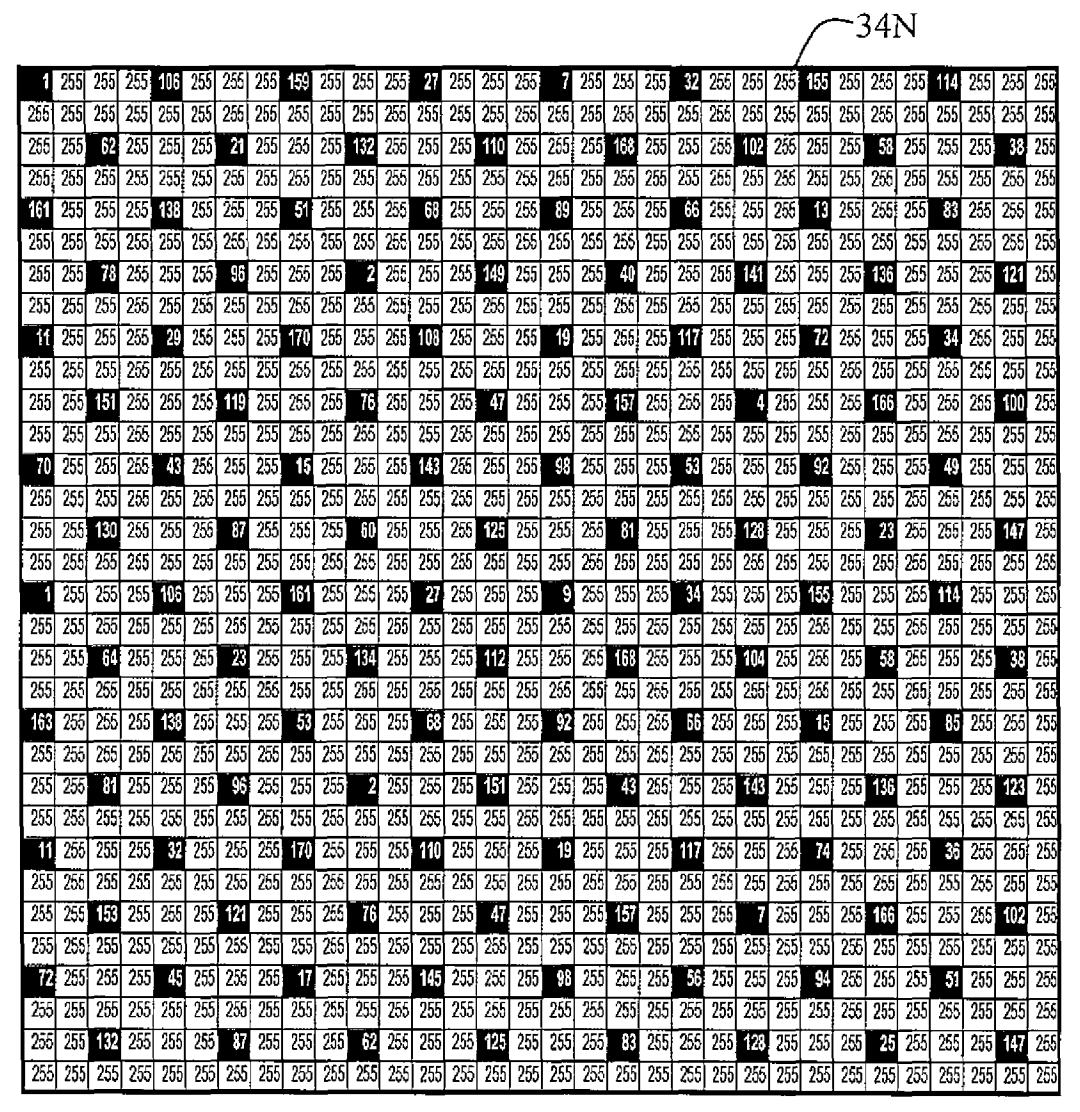

FIG. 19 shows the normalized background portion dither matrix 34N. The thresholds 0 to 254 in the black pixels at the positions of the displacement vectors (−2, 2) and (2, 2) of the background portion dither matrix 34 in FIG. 11 are normalized to new thresholds 0 to 170 (=In) using the following Expression (5).

$$\text{Normalized threshold} = (\text{threshold}/254) \times In \qquad (5)$$

Therefore in the normalized background portion dither matrix 34N in FIG. 19, the thresholds in the black pixels are replaced with 0 to 170, and a dot is generated in all the black pixels and the output density becomes the maximum output density (12% of solid black) when the input grayscale value is "170".

FIG. 20 shows the input/output density characteristics of the normalized background portion dither matrix, the background portion dither matrix before normalization, and the latent image portion dither matrix respectively. The output density characteristics of the background portion dither matrix 34 and the latent image portion dither matrix 33 are the same as FIG. 12. In the above mentioned example, the input grayscale "255", to generate a dot in all the pixels corresponding to the elements on the displacement vectors, is used for the background portion, and the input grayscale value In=170, which can generate the same output density as the background portion, is used for the latent image portion. Therefore, in order to use the input grayscale value In=170 for the background portion as well, the background portion dither matrix 34 is normalized with the input grayscale value In=170 so as to generate the normalized background portion dither matrix 34N shown by the characteristics of the broken line 34N in FIG. 20. The normalized background portion dither matrix 34N can be easily computed using the above mentioned Expression (5).

The input grayscale value In of the latent image portion may fluctuate due to age deterioration of the engine. By generating the normalized background portion dither matrix 34N using the input grayscale value In when fluctuation occurs, age deterioration can be absorbed.

Back in FIG. 18, tint block image data with a camouflage pattern is generated for the corrected camouflage pattern grayscale data with reference to the latent image portion dither matrix 33 or normalized background portion dither matrix 34N, according to the latent image mask pattern (S23 to S32). This tint block image data with a camouflage pattern is image data which indicates whether a dot exists or not for each pixel.

Figures 21A, 21B, 21C, 21D:
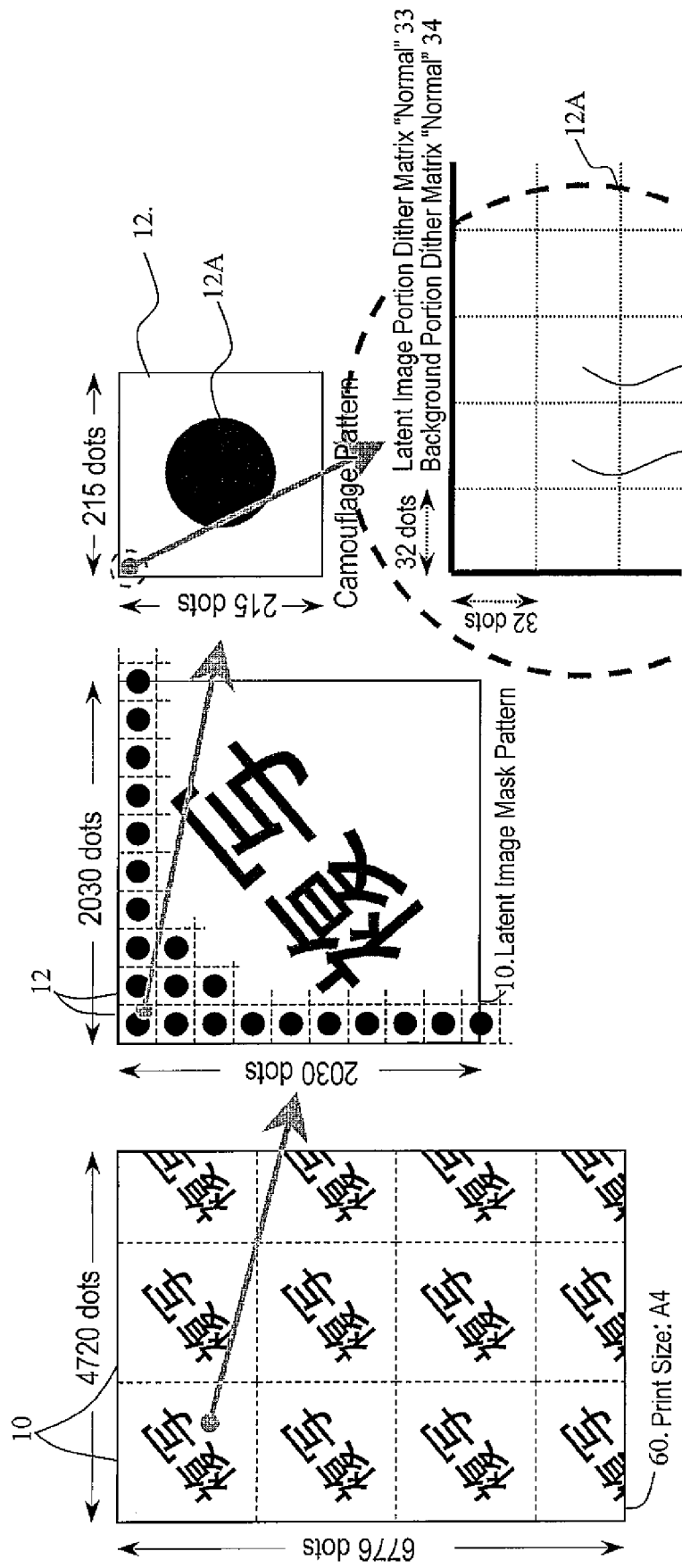
FIG. 21 describes the tint block image generation processing in FIG. 18.

FIG. 21 is a diagram depicting the tint block image generation processing in FIG. 18. FIG. 21A shows a tint block image where a plurality of latent image mask patterns 10 are arranged in a square in an A4 print size 60. In the case of the pixels in an A4 size, there are 4720 dots in the horizontal direction and 6776 dots in the vertical direction. FIG. 21B shows the positional relationship of the latent image mask pattern 10 at the upper left of FIG. 21A and the camouflage pattern 12 arranged as tiles. The latent image mask pattern 10 is a square pattern having 2030 dots of pixels in the horizontal direction and 2030 dots of pixels in the vertical direction. The camouflage pattern 12, on the other hand, is a square pattern having 215 dots of pixels in the horizontal direction and 215 dots of pixels in the vertical direction, as shown in FIG. 21C.

FIG. 21D is an enlarged view of the upper left edge of FIG. 21C. The latent image portion dither matrix 33-4 and the background portion dither matrix 34-5 are both 32 cells×32 cells matrices, and each cell is pasted like a tile sequentially from the upper left. Since the dither matrices 33-4 and 34-5 of the latent image portion and the background portion have the same matrix size, the correspondence relationship with pixels match perfectly, as shown in FIG. 21D.

The printer driver compares the grayscale values Ki of the corrected camouflage pattern and the thresholds of the dither matrices 33-4 and 33-5, and if the grayscale value Ki is the threshold or more, the pixel dot is set to ON, and if the grayscale value Ki is less than the threshold, the pixel dot is set to OFF. The grayscale values Ki of the corrected camouflage pattern are set only in a 0 to 254 range. Or if the input grayscale value is 255, such pixels dots are all set to OFF. The comparison target dither matrix is selected corresponding to black or white of the latent image mask pattern.

According to the flow chart in FIG. 18, the tint block image generation processing will be described. The indices i and j of the pixels of the tint block image are initialized to i=0 and j=0 respectively (S23). Then if the mask pattern at pixel (i, j) is black (YES in S28), the threshold of a corresponding pixel of the latent image portion dither matrix 33 and the corrected camouflage pattern grayscale value Ki are compared (S29), and if the latent image portion mask pattern is not black (NO in S28), the threshold of a corresponding pixel of the normalized background portion dither matrix 34N and the corrected grayscale value Ki are compared (S31). In both comparisons, the tint block image data (i, j) becomes dot ON if the corrected grayscale value Ki is the threshold or more (S30), and the tint block image data (i, j) becomes dot OFF if the corrected grayscale value Ki is less than the threshold (S32).

By this, the first dots (half tone) having a size corresponding to the corrected camouflage pattern grayscale value Ki are generated in the latent image portion, and a number of second dots corresponding to the corrected grayscale value Ki are generated in pixels in the corresponding positions in the background portion.

When the above processing completes, the index j in the row direction of the pixels is incremented (j=j+1) (S24), and the same processing is repeated until the index j reaches the print size width (S25). When the index j reaches the print size width (YES in S25), the index i in the column direction is incremented (i=i+1), and the index j in the row direction is reset to 0 (S26), and the same processing is repeated. When the index i in the column direction reaches the print size height (YES in S27), one page of tint block image generation processing completes. In this way, the processing target pixels are processed from the upper left in the raster scan direction, and each pixel is set to dot ON or OFF.

By the above processing, the tint block data reflecting the multi-grayscale camouflage pattern is generated.

EXAMPLES

The generation of the tint block image with a multi-grayscale camouflage pattern according to the present embodiment will be described using examples.

Figure 22:
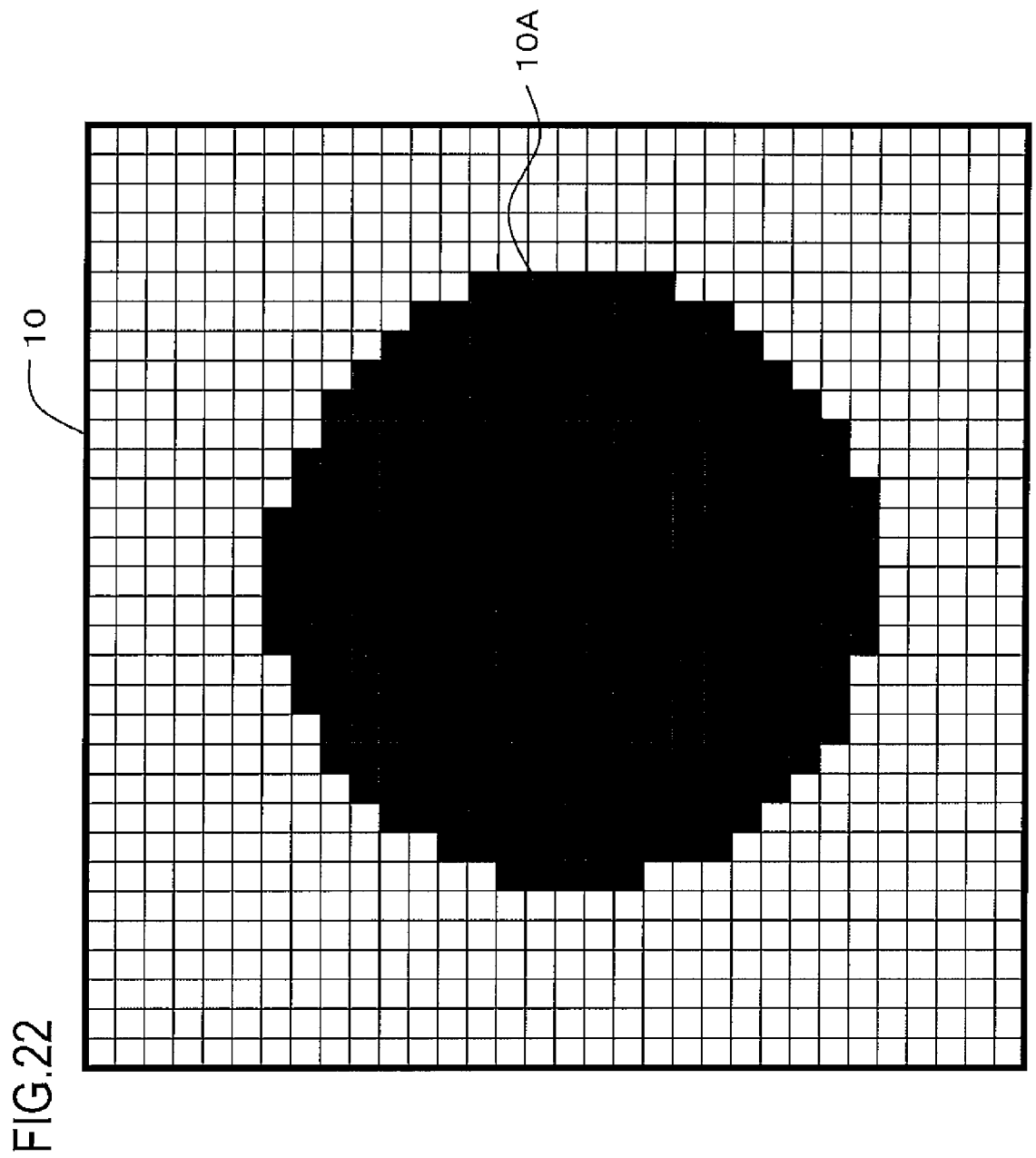
FIG. 22 shows an example of a latent image mask pattern.

FIG. 22 shows an example of a latent image mask pattern. A latent image mask pattern 10 is generated in a 32×32 matrix. The pattern 10A corresponds to the latent image portion, and an area other than the pattern 10A corresponds to the background portion. This means that the matrix data of this latent image mask pattern has 1 bit, "0" (latent image pattern) or "1" (background portion), in each pixel of the 32×32 matrix.

Figure 23:
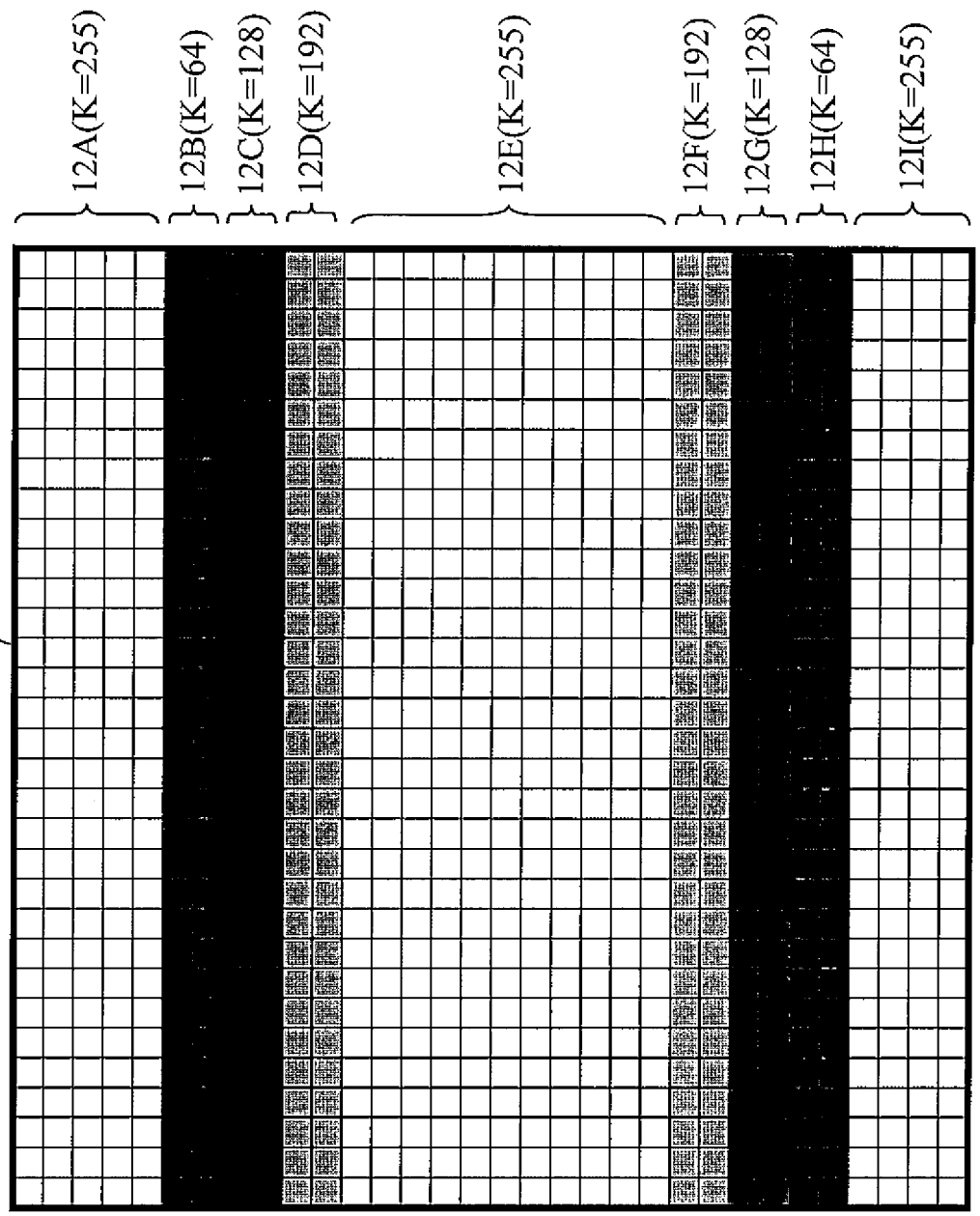
FIG. 23 shows an example of a camouflage pattern.

FIG. 23 shows an example of a camouflage pattern. In this camouflage pattern 12, the pixels in the 32×32 matrix have nine strip areas 12A to 12I. A threshold A of each area 12A to 12I is shown in FIG. 23. In other words, the areas 12A, 12E and 12I are white areas of which grayscale value is "255", and areas 12B and 12H are areas closest to black, of which grayscale value is "64".

Figure 24:
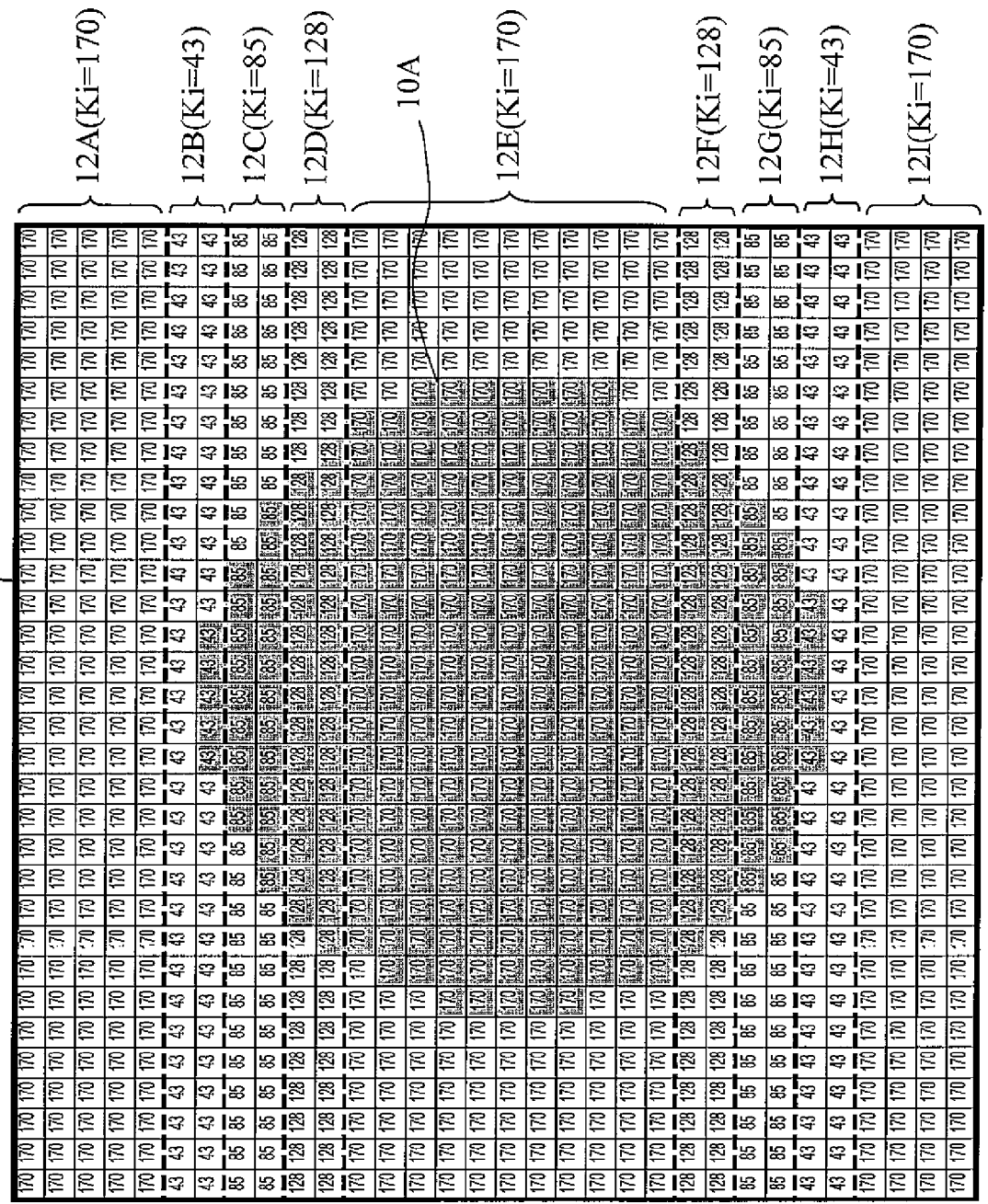
FIG. 24 shows an example of a corrected camouflage pattern.

FIG. 24 shows an example of corrected camouflage pattern grayscale values. The corrected camouflage pattern grayscale value data 120 is determined by the above mentioned Expression (4). This example shows the grayscale value data acquired by correcting the camouflage pattern in FIG. 23 based on the input grayscale value In=170 of the tint block image. In FIG. 24, the latent image mask pattern 10A is shown by gray, and the camouflage pattern areas 12A to 12I are shown by the broken lines. The grayscale values Ki of the camouflage pattern, corresponding to the grayscale values A of the camouflage pattern in FIG. 23 are shown in FIG. 24.

Figure 25:
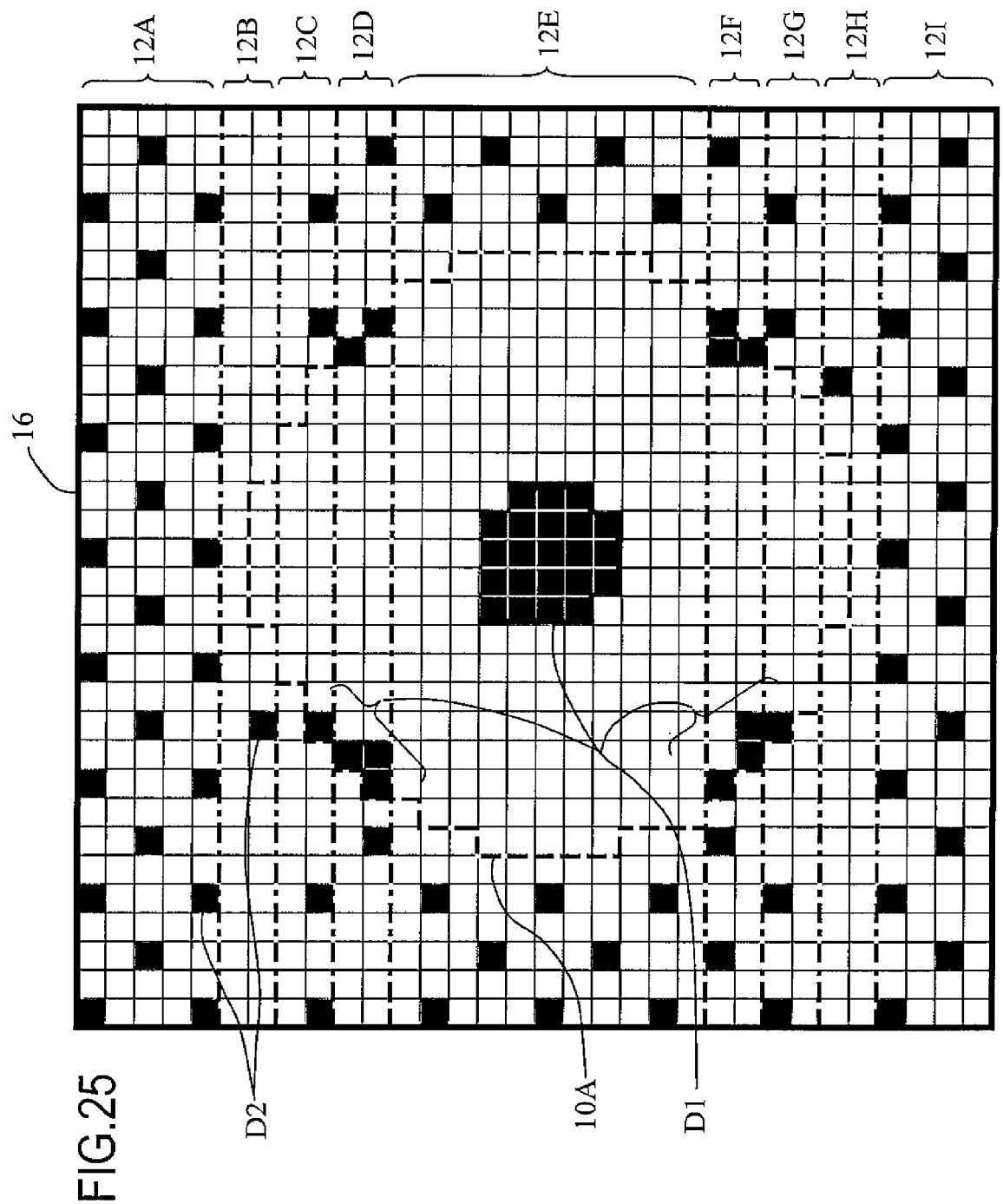
FIG. 25 shows an example of a tint block image with a camouflage pattern.

FIG. 25 shows an example of a tint block image with a camouflage pattern. This is a tint block image 16 generated by performing screen processing on the grayscale values Ki of the corrected camouflage pattern shown in FIG. 24, referring to the latent image portion dither matrix 33 and the normalized background portion dither matrix 34N in FIG. 10, FIG. 19 and FIG. 20. In FIG. 25, the camouflage pattern areas 12A to 12I are indicated by the dash and dot lines, and the latent image mask pattern 10A is indicated by the broken lines.

In the latent image mask pattern 10A, the first dots D1 corresponding to the corrected grayscale Ki=170 are formed in the area 12E, and the first dots D1 corresponding to the corrected grayscale Ki=128 and 85 are formed in the areas 12D, 12C, 12F and 12G. Outside the latent image mask pattern 10A, the second dots D2 corresponding to the corrected grayscale Ki=170 are formed on all the displacement vectors in the area 12A, and the second dots D2 corresponding to the respective corrected grayscale Ki=43, 85, 128, 128, 85 and 43 are formed in the other areas 12B, 12C, 12D, 12F, 12G and 12H.

As the tint block image in FIG. 25 shows, dots in density or size corresponding to the grayscale values of the camouflage pattern are formed in the tint block image by using a multi-grayscale camouflage pattern.

Figure 26:
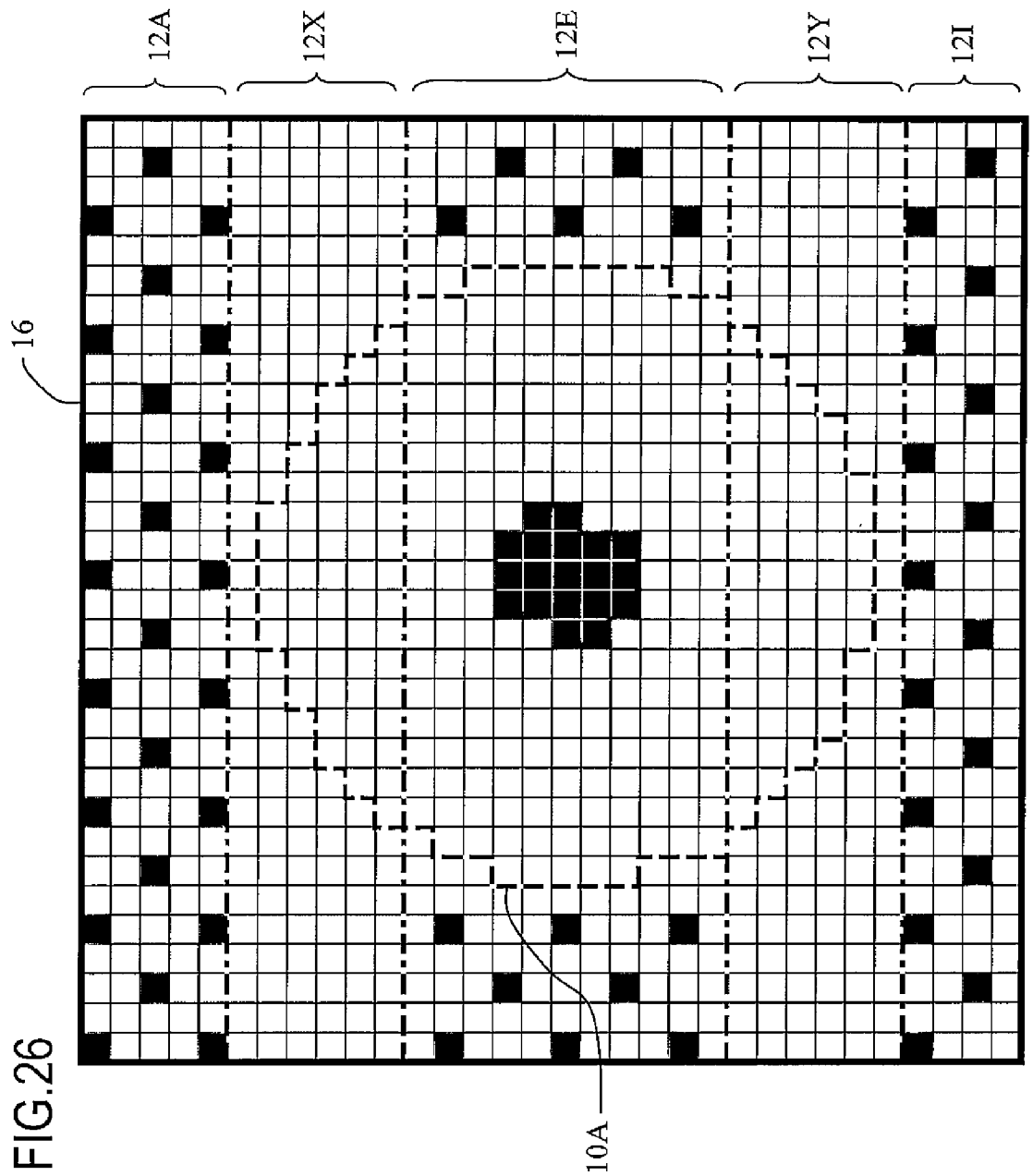
FIG. 26 shows an example of a tint block image in the case of a conventional two-grayscale camouflage pattern.

FIG. 26 shows an example of the tint block image in the case of a conventional two-grayscale camouflage pattern. A conventional two-grayscale camouflage pattern only has areas 12A, 12E and 12I where dots exist, and areas 12X and 12Y where dots do not exist. In other words, halftone areas 12B, 12C, 12D, 12F, 12G and 12H do not exist. Therefore no dots are formed in areas 12X and 12Y.

[Variant Form]

FIG. 27 shows the input/output density characteristics of the background dither matrix and the normalized latent image portion dither matrix according to a variant form of the present embodiment. In the above mentioned embodiment, the screen processing is performed referring to the normalized background portion dither matrix 34N and the latent image portion dither matrix 33 shown in FIG. 20. In FIG. 27, the background portion dither matrix 34 is the same as FIG. 12, but the normalized latent image portion dither matrix 33N is normalized so that the output density (12%) with respect to the input grayscale value "170" becomes the output density with respect to the maximum input grayscale value "255".

For normalization, the following Expressions (6) and (7) are used.

Normalization threshold=(threshold/$In$)×254
($1 \leq$ threshold $\leq In$)      (6)

Normalization threshold=255 (if $In$<threshold)      (7)

In other words, the thresholds 1 to In (=170) in the latent image portion dither matrix 33 in FIG. 10 are converted into the normalized thresholds 1 to 254, and the thresholds In to 254 are converted into the normalized threshold "255". Thereby the image data, of which output density is in a 0 to 12% range with respect to the grayscale value Ki, is generated.

When the background portion dither matrix 34 and the normalized latent image portion dither matrix 33N in FIG. 27 are used, the input grayscale value In of the tint block image is set to In=255. In other words, the background portion and the latent image portion both become 12% output density in the tint block image. As a result, the above Expression (4), when In=255, becomes Ki=(K/255)×In=K, and the grayscale value Ki of the camouflage pattern after correction becomes the same as the grayscale value A of the camouflage pattern before correction.

In other words, the step of computing the grayscale values of the corrected camouflage pattern (S3 in FIG. 6 and S21 in FIG. 18) is not required. And the grayscale value Ki of the camouflage pattern after correction becomes one of the maximum grayscale range 0 to 255. Therefore the multi-grayscale representation of the camouflage pattern can be fully utilized.

However, it is necessary that the output density characteristics with respect to the possible input grayscale value range 0 to 255 of the latent image portion dither matrix 33N and the background portion dither matrix 34 match, and the input grayscale values In of the latent image portion and the background portion of the tint block image are the input grayscale value "255", which is the maximum in the possible input grayscale value range of the latent image portion dither matrix and background portion dither matrix. In other words, if the latent image portion and background portion dither matrices are designed to be optimum output densities at the maximum input grayscale value In=255, as mentioned above, then the tint block image with a multi-grayscale camouflage pattern can be generated by performing halftone processing in which these dither matrices are referred to for the grayscale values of the camouflage pattern according to the latent image mask pattern.

The normalized dither matrix 34N in FIG. 20 and the normalized dither matrix 33N in FIG. 27 to be used are generated based on the engine characteristics before shipment. If the output density characteristics of the engine change by age deterioration, it is preferable to normalize the dither matrix at an appropriate timing or when the tint block image is generated.

Experimental Example

Figure 28:
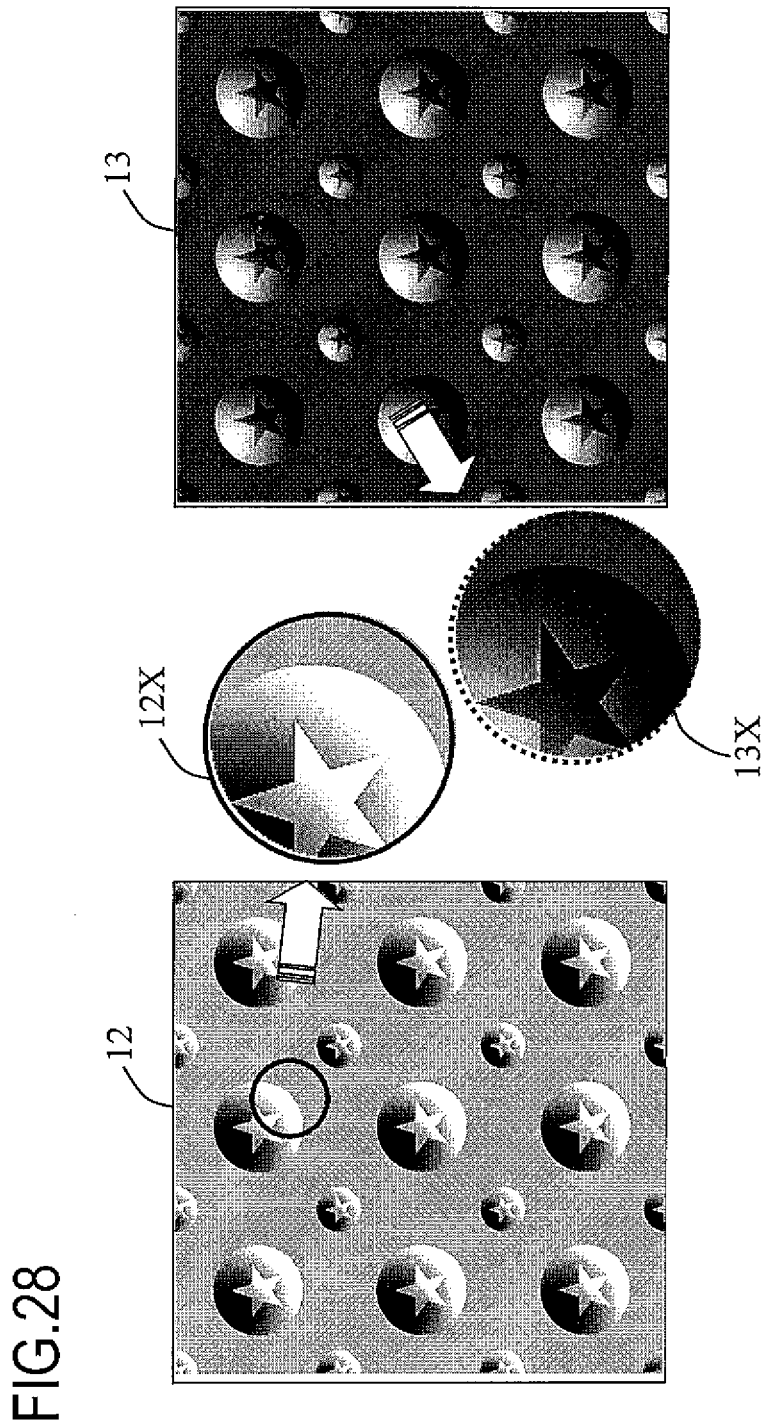
FIG. 28 shows an experiment example of a multi-grayscale camouflage pattern.

FIG. 28 shows the experiment example of the multi-grayscale camouflage pattern. This multi-grayscale camouflage pattern 12 has halftones. When this camouflage pattern 12 is reflected in the tint block image, the black/white inverted camouflage pattern 13 is generated, as mentioned above. 12X and 13X are enlarged views of the camouflage pattern 12 and the camouflage pattern 13 respectively.

Figure 3:
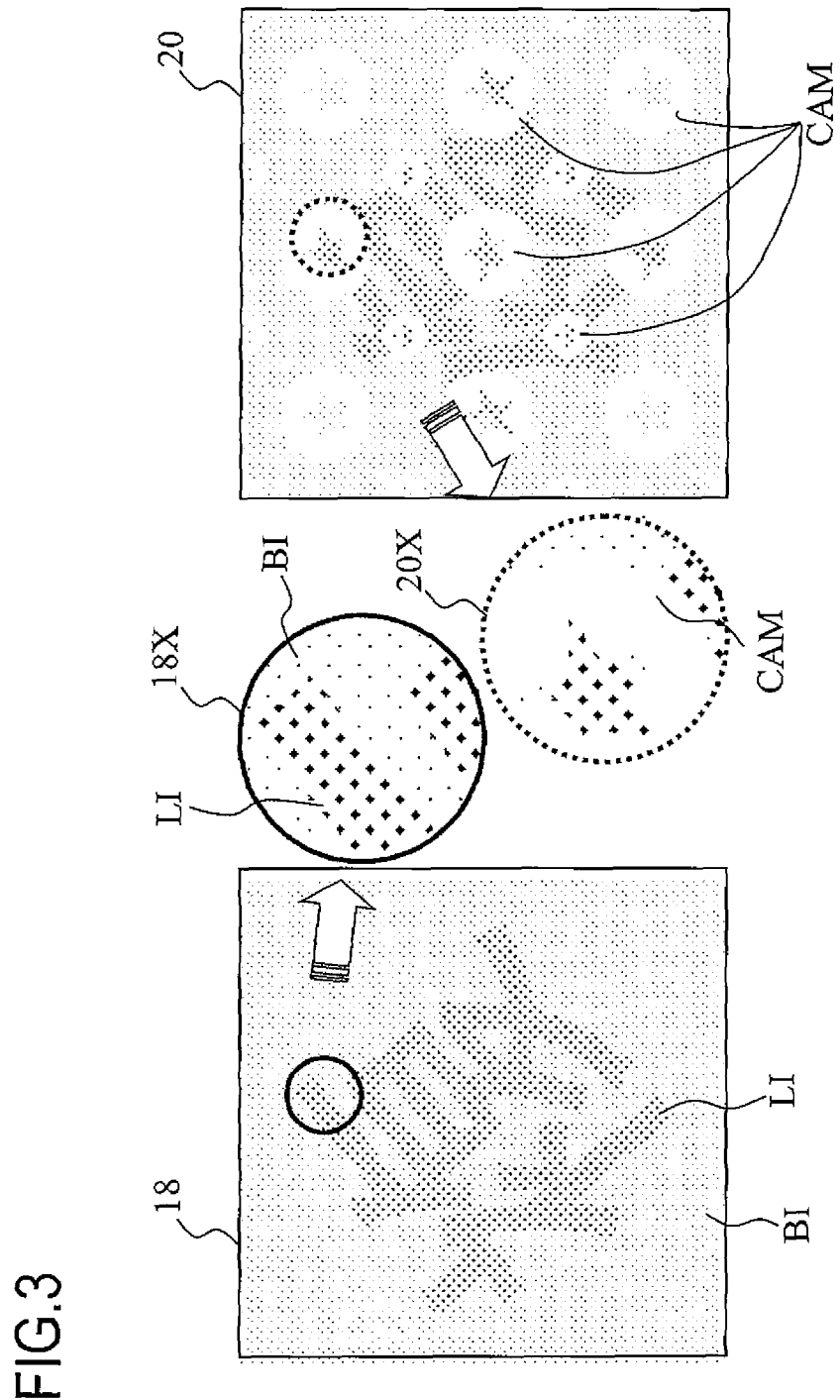
FIG. 3 is a diagram depicting an example of a copy of a tint block.
Figure 29:
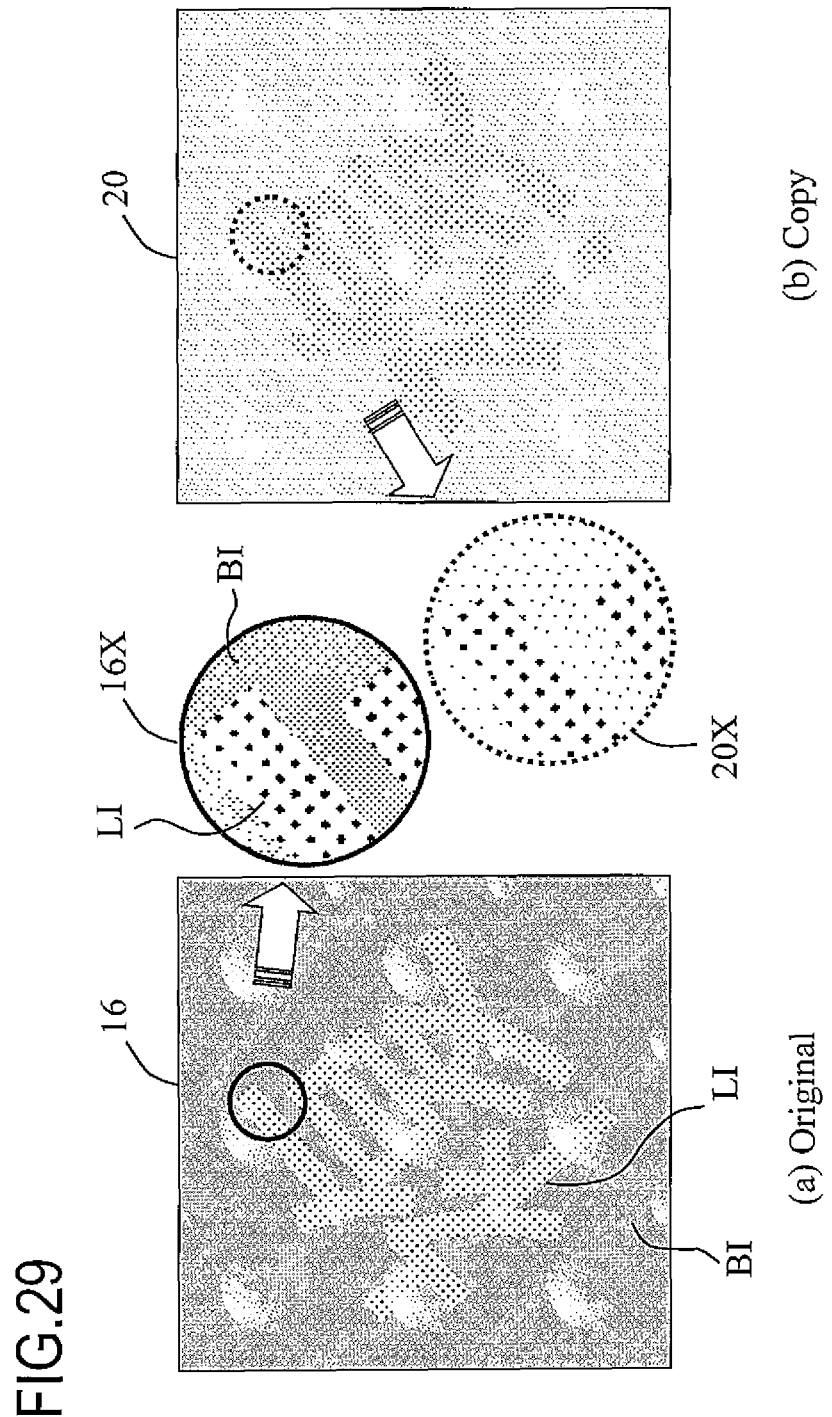
FIG. 29 shows an experiment example of an original and copy of the tint block image where the multi-grayscale camouflage pattern in FIG. 28 is reflected.
Figure 30:
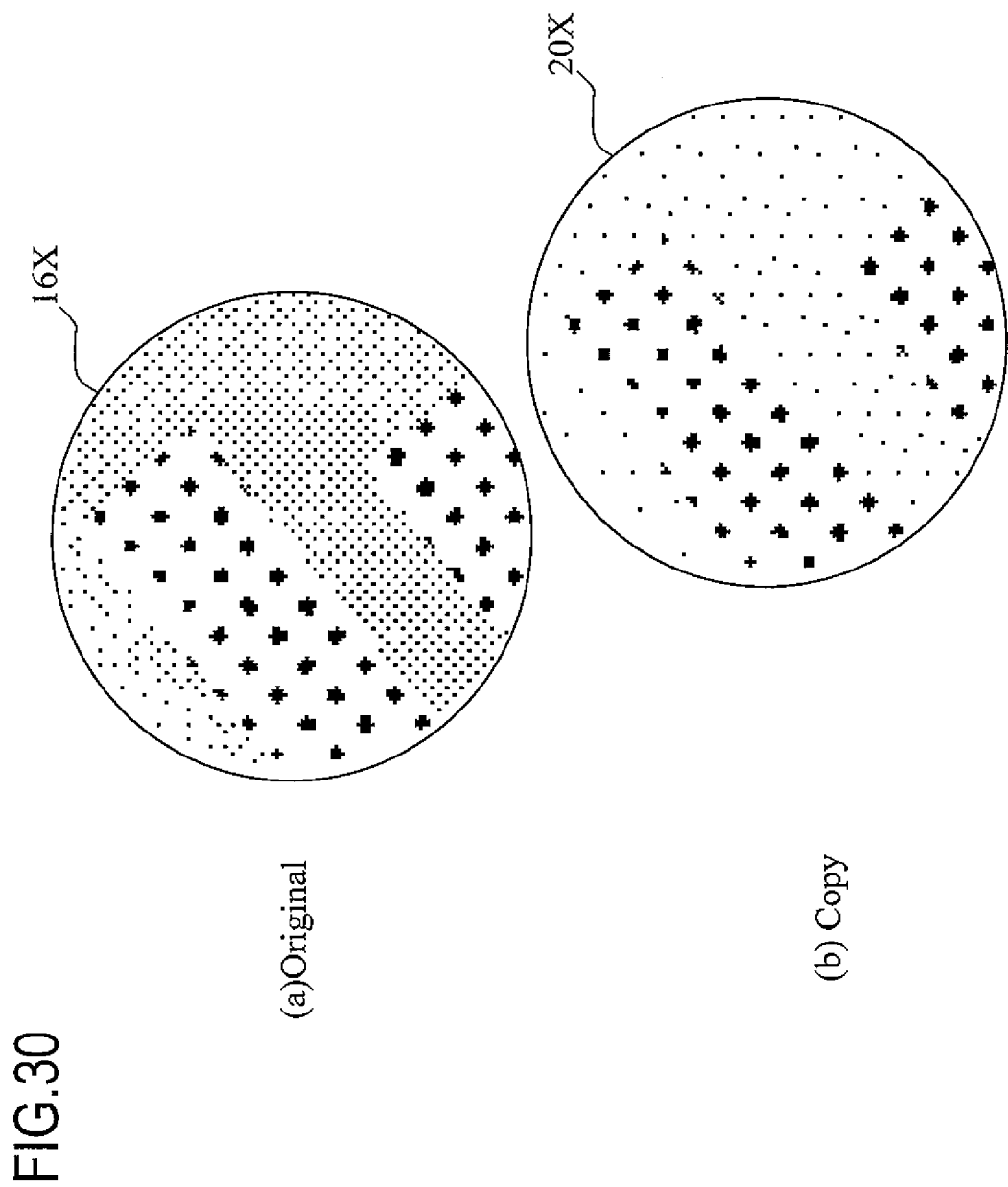
FIG. 30 are diagrams further enlarging the enlarged views 14X and 16X in FIG. 29.

FIG. 29 shows an experiment examples of an original and a copy of the tint block image where the multi-grayscale camouflage pattern in FIG. 28 is reflected. FIG. 30 are diagrams further enlarging the enlarged views 16X and 20X thereof. As the original 16 in FIG. 29A shows, contrast is suppressed in the multi-grayscale camouflage pattern, and the discerning capability for an original print document image is not diminished very much. As the copy 20 in FIG. 29B shows, the latent image "COPY" is more accurately reproduced in the copy because of the multi-grayscale camouflage pattern, and identification capability for the latent image in the copy can be increased. By comparing this with the original 16 in FIG. 2 and the copy 20 in FIG. 3, the above mentioned effect can be more clearly understood.

As described above, according to the present embodiment, three-dimensional patterns can also be represented by using the multi-grayscale camouflage pattern, and artistic expression and flexibility of a camouflage pattern can be improved dramatically. The contrast of the camouflage pattern can be adjusted to be lower, so when a camouflage pattern is combined with a print document image, the camouflage pattern does not drop the discerning capability of original. Also in the copy of the tint block image, dots can remain corresponding to the grayscale values of the camouflage pattern, both in the latent image portion and the background portion, so the identification capability for the latent image "COPY" in the copy can be improved.

[Arbitrary Color or Multi-Grayscale Camouflage Pattern]

In the present embodiment, a color or multi-grayscale camouflage pattern, which the user arbitrarily acquired by photographing or computer graphics, can be registered, and can be combined with a tint block. By including this camouflage pattern function in the printer, flexibility of the camouflage pattern improves, and convenience for the user increases.

If the flexibility of the camouflage pattern improves, the registration of the pattern, which is inappropriate for a tint block image, may be requested, so in order to accept an arbitrary color or multi-grayscale camouflage pattern data, a predetermined processing is demanded. Now the expected problems in the case of accepting an arbitrary color camouflage pattern will be described.

First an example of dither matrices corresponding to the background portion and latent image portion screens used for generation of the tint block image with the camouflage pattern shown below will be described. The characteristics of the input grayscale values and the output density of the background portion and latent image portion dither matrices are the same as the dither matrices 34 and 33N shown in FIG. 27, and are threshold matrices when the input grayscale value of the tint block image is set to In=255, and the latent image portion dither matrix 33N is normalized.

Figure 31:
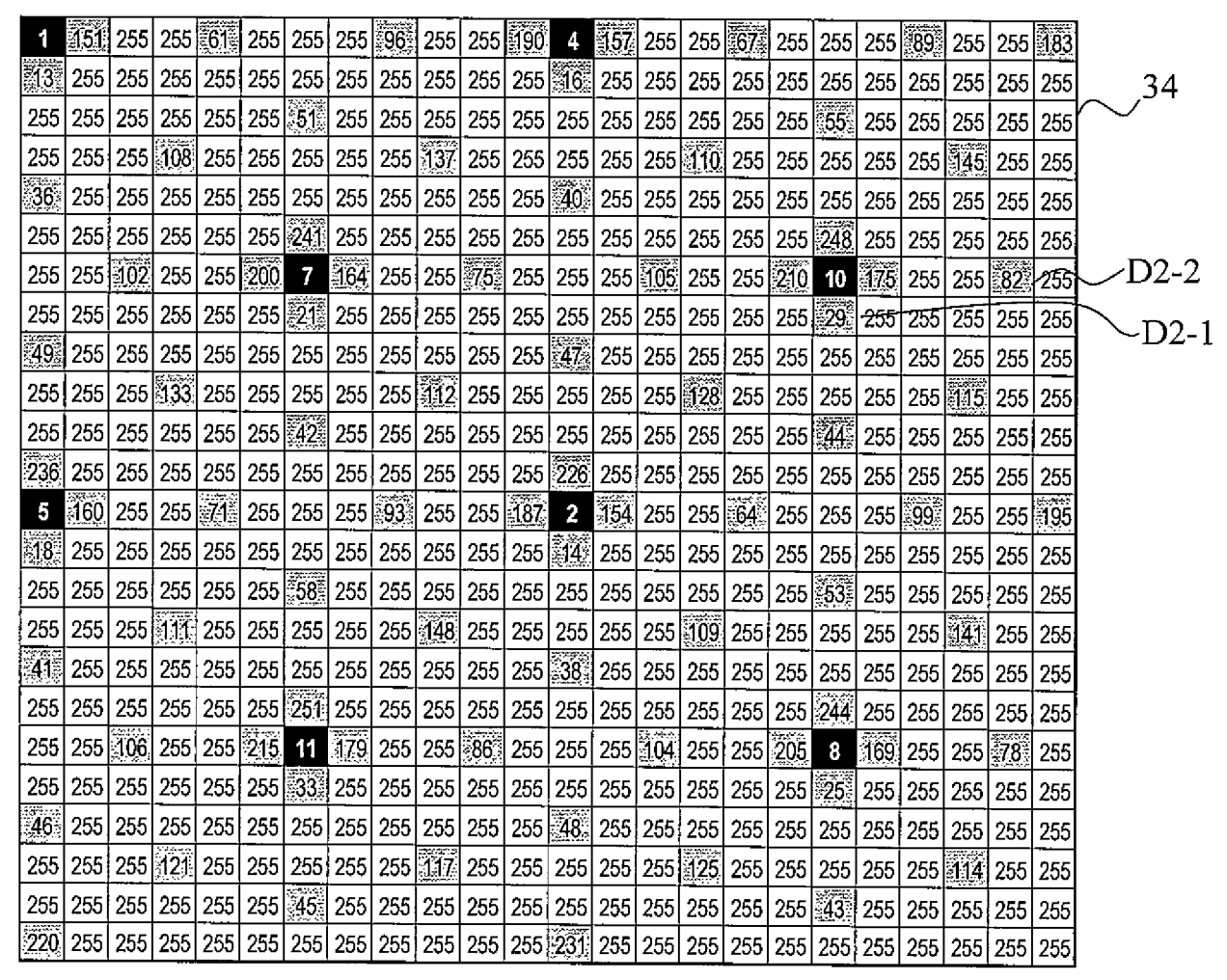

FIG. 31 is a diagram depicting the background portion dither matrix 34. The background portion dither matrix 34 is a dot dispersed dither matrix with high screen ruling (71 lpi) in which small dots D2-1 and D2-2 are dispersed, just like FIG. 7A. However unlike FIG. 7A, the background portion dither matrix 34 is a 24×24 matrix, and the generated small dots are either a relatively large sized small dot D2-1 which is formed by four pixels, or a relatively small sized small dot D2-2 which is formed by one pixel. By generating relatively large sized small dots D2-1 in the small dots, small dots can be generated stably in the background portion. However both small dots D2-1 and D2-2 have small areas, compared with the later mentioned large dot D1 in the latent image portion, so the degree of disappearance during copying is greater than that of large dots D1 in the latent image portion.

The background portion dither matrix 34 has a same characteristics as the output density characteristics with respect to the input grayscale value In shown in FIG. 27A. In other words, the output density is in a 0 to 12% density range of solid black with respect to the input grayscale value In=0 to 255.

Figure 32:
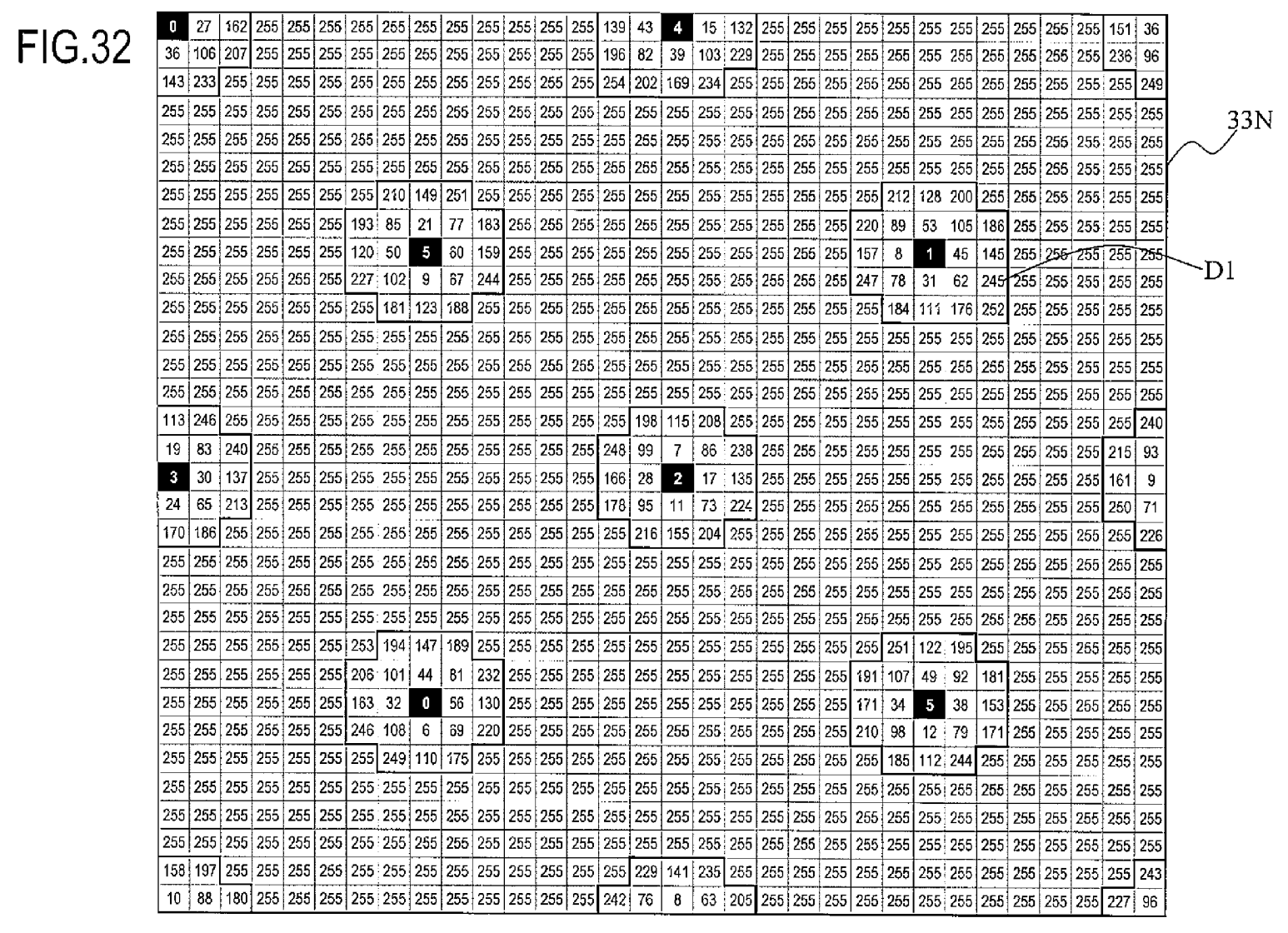

FIG. 32 is a diagram depicting the latent image portion dither matrix 33N. The latent image portion dither matrix 33N is a dot concentrated dither matrix with low screen ruling (53 lpi) for generating large dots D1. The latent image portion dither matrix 33N is a threshold matrix obtained by normalizing the low density area expanded dither matrix 33 shown in FIG. 10, as shown in FIG. 27B. Therefore the output density characteristic with respect to the input grayscale value In of the latent image portion dither matrix 33N, is that the output density is 0 to 12% density range of solid black with respect to input grayscale value In=0 to 255. This characteristic is the same as the background portion dither matrix 34 in FIG. 31. The size of the large dot D1 generated by the latent image portion dither matrix 33N is smaller than the dot in FIG. 10 since normalization in FIG. 27B was performed. However the large dot D1 in the latent image portion is larger than the small dots D2-1 and D2-2 of the background portion in FIG. 31, so the loss of dots during copying the tint block image is lower and density change is smaller compared with the background portion.

Figure 33:
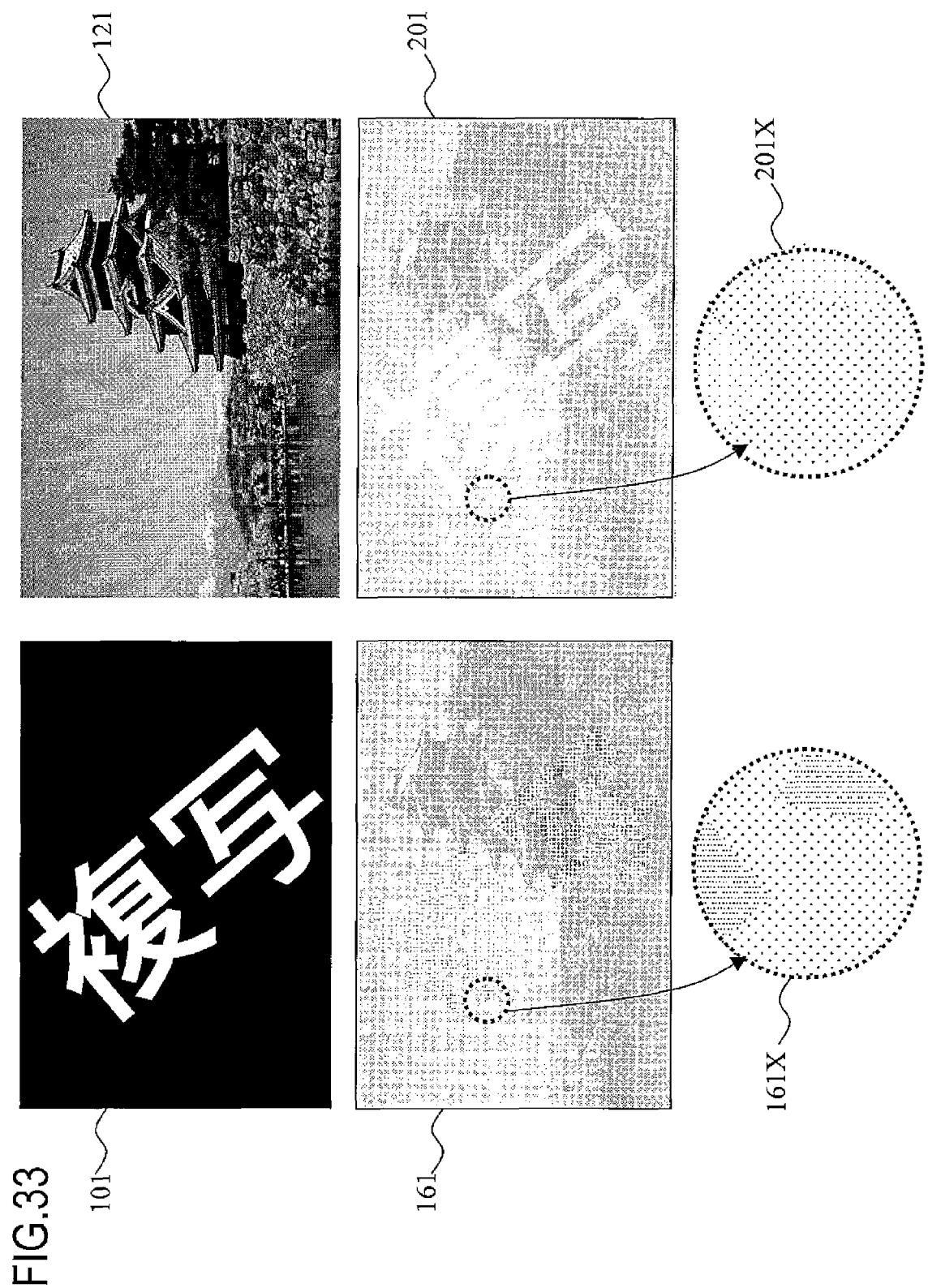
FIG. 33 shows a tint block image example (1) when an arbitrary color camouflage pattern is used.

FIG. 33 shows a tint block image example (1) when an arbitrary color camouflage pattern is used. In the latent image pattern 101 of the characters "COPIED" of this example, the black portion is set to the latent image portion, and the white portion is set to the background portion. For color camouflage pattern 121, the color landscape photo data is used. This color camouflage pattern 121 is a relatively bright image, such as the sky. FIG. 33 shows the tint block image original 161 and the tint block image copy 201.

According to the present embodiment, when color camouflage pattern data is registered, the gray grayscale value A is determined using the above mentioned Expression (2), the input grayscale value In of the tint block is set to In=255, and the corrected grayscale value Ki (=K), is determined from the grayscale value K, which is inverted gray grayscale value A, using Expression (4), and the data on presence/absence of dots is generated by comparing the grayscale value Ki with the thresholds of the dither matrices in FIG. 31 and FIG. 32, so that the tint block image data with a camouflage pattern is generated.

When a monochrome multi-grayscale camouflage pattern data is registered, the corrected grayscale value Ki is determined from the grayscale value K, which is an inverted gray grayscale value A, using Expression (4), based on the input grayscale value In=255 of the tint block, and the data on presence/absence of dots is generated by comparing the grayscale value Ki with the threshold of the dither matrices in FIG. 31 and FIG. 32, so that the tint block image data with a camouflage pattern is generated.

In the tint block image original 161 in FIG. 33, the concealing capability for latent image "COPIED" is high since a camouflage pattern is used, the contrast is low since a multi-grayscale camouflage pattern is used, and the identification capability for the original print document image does not drop. However the lightness of a partial area of the camouflage pattern is too high, so the dot sizes generated in both the latent image portion and background portion become small, as shown in the enlarged view 161X of the tint block image original 161. In other words, large dots are not generated in the latent image portion. As a result, as the enlarged view 201X of the tint block image copy 201 shows, the degree of loss of dots become similar in the latent image portion and background portion, the density difference between the latent image portion and background portion is suppressed, and identification capability for the latent image "COPIED" in the copy 201 drops.

FIG. 34 shows a tint block image example (2) when an arbitrary color camouflage pattern is used. In this example as well, the same latent image pattern 101 as FIG. 34 is used. The color camouflage pattern 122, however, is generally a dark landscape image, and contrast is generally low. Since the lightness of the camouflage pattern 122 is low, many small dots are generated in the background portion, and large dots are generated in the latent image portion of the tint block image original 162, as shown in the enlarged view 162X. Therefore in the tint block image copy 202, the density drop of the background portion is major, and the density drop of the latent image portion is minor according to the difference of the dot sizes. In other words, the identification capability for the latent image "COPIED" of the tint block image copy 202 is high.

However in the tint block image original 161 in FIG. 34, the contrast of the camouflage pattern 122 is low, so the concealing capability for the latent image "COPIED" of the tint block image original is low. The camouflage pattern of which contrast is low also gives a negative impression in terms of design of the tint block original.

The present embodiment solves the problems in FIG. 33 and FIG. 34, and provides an optimum tint block image quality which has high concealing capability in the tint block original and good design of the camouflage pattern, and has high identification capability in the tint block copy, even when an arbitrary color or multi-grayscale camouflage pattern is used.

As described in FIG. 6 and FIG. 13, in the present embodiment, corresponding to allowing use of an arbitrary color or multi-grayscale camouflage pattern, the printer driver 32 has a function to converts color data into gray data (S4), and a camouflage pattern adjustment function (S6, S19). The camouflage pattern adjustment function has (1) a function to drop the lightness if the lightness of the camouflage pattern is higher than a reference value, (2) a function to enhance the general contrast of the camouflage pattern, and (3) a function to enhance the contrast of edge portions of the camouflage pattern (or sharpening function, or unsharpening function). These functions (2) and (3) are selected according to the image type of camouflage pattern, or selected by the adjustment parameter specified by the user.

FIG. 35 are diagrams depicting functions to drop lightness and to enhance the general contrast. FIG. 35 describes the above mentioned function (1) and function (2). As mentioned above, relatively low lightness is desired for a color or multi-grayscale camouflage pattern in order to acquire an optimum tint block image quality. However merely decreasing lightness decreases the lightness difference of the camouflage pattern in the tint block original, which weakens contrast and obscures the camouflage pattern. In other words, a drop in lightness damages the design of the tint block original, and drops the concealing capability for the latent image of the tint block original. Hence in order to improve design of the tint block original and improve the concealing capability thereof, an adjustment to enhance the contrast of the camouflage pattern is required.

As an adjustment of the camouflage pattern to improve the tint block image, a contrast correction is performed using the following Expression (9), and then the lightness drop correction is performed using Expression (8).

$$Gray\_V = Gray\_C \times V/100 \tag{8}$$

Gray_C: contrast correction grayscale value ($0 \leq Gray\_C \leq 255$)
V: lightness parameter ($40 \leq V \leq 100$)

$$\left. \begin{array}{ll} 0 \leq Gray < x_1 & Gray\_C = \dfrac{f_a}{3 \cdot x_1^2} Gray^3 \\ x_1 \leq Gray < x_2 & Gray\_C = f_a(Gray - 128) + 128 \\ x_2 \leq Gray < 255 & Gray\_C = \dfrac{f_a}{3 \cdot (x_2 - 255)^2} (Gray - 255)^3 + 255 \\ x_1 = \dfrac{3 \cdot 128(f_a - 1)}{2 \cdot f_a}, & \\ x_2 = \dfrac{128(f_a + 3)}{2 \cdot f_a}, & \\ f_a = \dfrac{100}{100 - C} & \end{array} \right\} \tag{9}$$

Gray: grayscale value ($0 \leq Gray \leq 255$)
C: contrast parameter ($0 \leq C \leq 50$)

FIG. 35A shows the lightness drop correction table according to Expression (8) and FIG. 35B shows the contrast correction table according to Expression (9). In both tables, the abscissa is the input gray grayscale value Gray (equivalent to the above mentioned gray grayscale value A), and the ordinate is the output gray grayscale value Gray_C after conversion. In Expression (9), for the gray grayscale value Gray, a high gray grayscale value is corrected to be higher, and a low gray grayscale value is corrected to be lower based on the contrast index fa, which is defined by the contrast parameter C ($0 \leq C \leq 50$), and the inflexion points x1 and x2. In the contrast parameter C=50, the contrast is corrected to the highest, and the contrast is corrected to be higher as the contrast parameter C is greater. In the contrast parameter C=0, input and output are in a linear relationship, and contrast is not corrected. According to Expression (9), in input gray grayscale value Gray 0 to x1, the grayscale value is converted by the cubic curve, in the gray grayscale value Gray x1 to x2, the grayscale value is converted by a straight line with inclination fa, and in the gray grayscale value Gray x2 to 255, the grayscale value is converted by the cubic curve.

In the contrast-corrected grayscale value Gray_C by Expression (9), lightness drop correction is performed by Expression (8), and the grayscale value Gray_V, in which contrast and lights are corrected, is determined. When lightness parameter V=100, the lightness drop is not corrected, and as the lightness parameter V is smaller, the lightness is corrected to be lower, and the lightness is corrected to 40% when lightness parameter V=40.

FIG. 35C shows a combined grayscale conversion table for simultaneously performing contrast correction and lightness drop correction when the contrast parameter C and the lightness parameter V are set to certain values. The conversion table in the case of C=10 and V=80, and the conversion table in the case of C=30 and V=55, are shown in FIG. 35C. No contrast correction can be set by setting C=0, and no lightness drop correction can be set by setting V=0.

FIG. 36 shows camouflage pattern data after the general contrast correction and lightness correction are performed and a tint block image using this data. In this example, the color camouflage pattern data registered in FIG. 33 is adjusted by the combined grayscale conversion table with C=30 and V=55 in FIG. 35C, so as to generate the tint block image with a camouflage pattern. In other words, the color camouflage pattern data is converted into gray grayscale value Gray, and the grayscale value Gray is converted with the combined grayscale conversion table with C=30 and V=55 (Gray_V), so that the adjusted camouflage pattern 123 is generated. In this camouflage pattern 123, lightness is corrected to generally be low, and the general contrast is enhanced.

The gray grayscale value Gray_V of this camouflage pattern 123 is inverted to grayscale value K (=255−Gray_V), and the grayscale value K is corrected with the input grayscale value In=255 of the tint block image (Ki=(K/255)×In), and the corrected grayscale value Ki is compared with the thresholds of the background portion and latent image portion dither matrices 34 and 33N in FIG. 31 and FIG. 32 to generate the tint block image 163 of the original as shown in FIG. 36.

The tint block original 163, in which the contrast of the camouflage pattern 123 is enhanced, has a high identification capability even if the general image is dark, and the concealing capability for the latent image of original is high, and design is also good. In the tint block copy 203, in which lightness of the camouflage pattern 123 is corrected to be low in general, dots larger than the small dots in the background portion are formed in the latent image portion, and the density change during copying is greatly different between the latent image portion and background portion, and the identification capability for latent image "COPIED" is high in the tint block copy 203.

However, the design of the camouflage pattern and the concealing capability for the latent image in the tint block original 163 are equivalent to those of the tint block original 162 in FIG. 34, so further improvement is desired.

Therefore the second camouflage pattern adjustment method uses the above mentioned (1) function to drop lightness and (3) function to enhance contrast in the edge portion of the camouflage pattern (or sharpening function, or unsharpening function) are used.

FIG. 37 are diagrams depicting the function to enhance contrast in the edge portion of the camouflage pattern. In other words, these are diagrams depicting the above function (3). The above mentioned contrast correction for an entire camouflage pattern is a simple processing, but the number of grayscales decreases in a light area and dark area due to correction, and an area where contrast is diminished is generated. If the lightness contrast in the edge portion, which is a characteristic portion of the image, is enhanced by function (3), the camouflage pattern can be more appropriately adjusted.

In other words, human vision has the characteristic where sensitivity is high in edge portion where the lightness of an image changes considerably, and is low in portions where the change of lightness is flat. Therefore if the contrast in the edge portion of a multi-grayscale camouflage pattern is enhanced, the contrast of the camouflage pattern of the tint block original appears high to human vision, and the concealing capability for the latent image in the tint block original can be increased. Also enhancing the edge portion of the camouflage pattern means reproducing the characteristic of the camouflage pattern with more accuracy, which leads to design improvement.

Specifically, the edge area is enhanced, that is, sharpened by detecting how different a target pixel in a gray camouflage pattern is compared with the peripheral area, and enhancing the difference. The expression to calculate this sharpening process is as follows.

$$Gray\_V'(i, j) = \{Gray\_V(i, j) - mean\} \times STRENGTH + Gray\_V(i, j) \quad (10)$$
$$Gray\_V'(i, j) < 0 \quad Gray\_V'(i, j) = 0$$
$$Gray\_V'(i, j) > 255 \quad Gray\_V'(i, j) = 255$$

$$mean = \frac{\sum_{y=i-AREA}^{i+AREA} \sum_{x=j-AREA}^{j+AREA} Gray\_V(y, x)}{(2 \times AREA + 1)^2} \quad (11)$$

$$1 \leq AREA \leq 30, 0 \leq STRENGTH \leq 10$$

Figure 37A:
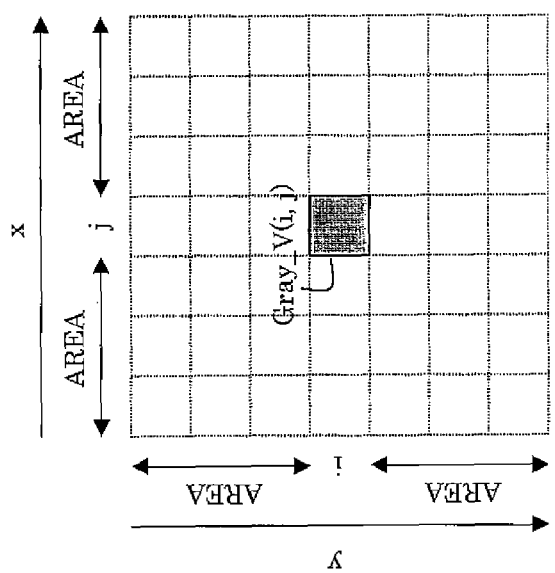
FIG. 37 are diagrams depicting the function to enhance contrast in the edge portion of the camouflage pattern.
Figure 37B:
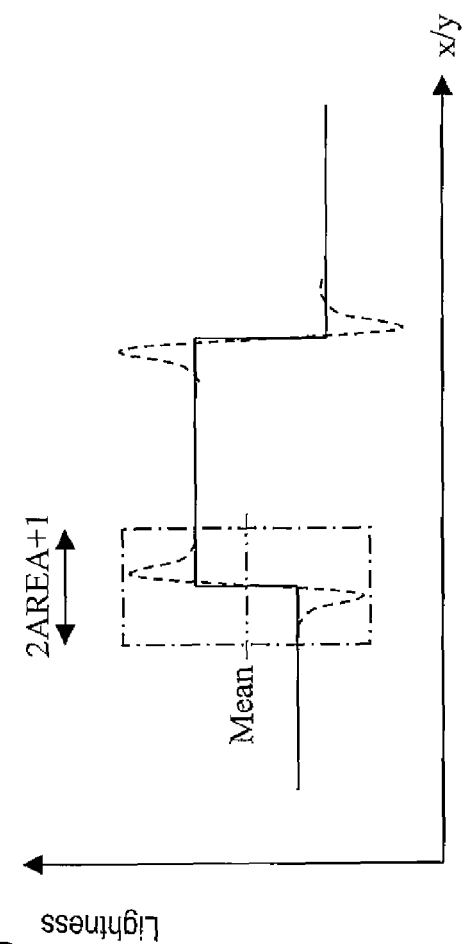

According to the above Expression (10), as FIG. 37A shows, the difference between a grayscale value of the target pixel Gray_V (i, j) and the average mean of the grayscale values of the peripheral 7×7 pixels thereof is determined for the grayscale value Gray_V for which the lightness drop correction was performed, the difference is enhanced (multiplied) according to the enhancement parameter STRENGTH, and the result is added to the original grayscale value Gray_V (i, j). The above Expression (11) is for determining the average value. By these calculations, as FIG. 37B shows, pixels with low grayscale values on both sides of the edge are converted into lower grayscale values, and pixels having high grayscale values are converted into higher grayscale values, so that the lightness contrast of the edge is enhanced in the edge portion. The abscissa of FIG. 37B indicates the x and y directions of the image, and the ordinate indicates the lightness of the image.

Using the above expression, an area around the edge can be blurred by increasing the parameter AREA which indicates the size of the peripheral area, thereby sharpness can be naturally implemented without increasing the enhancement parameter STRENGTH. The resolution is low since the screen ruling used for generating a tint block image is relatively low, so the image quality of the tint block does not drop even if the peripheral area of the edge is blurred by increasing the parameter AREA.

This sharpening processing is also called "unsharping processing". For example, unsharp masking is described in detail in the book "Story of Color Image Processing" by Hirotetsu Ko, published by CQ Publishing Co.

Figure 38:
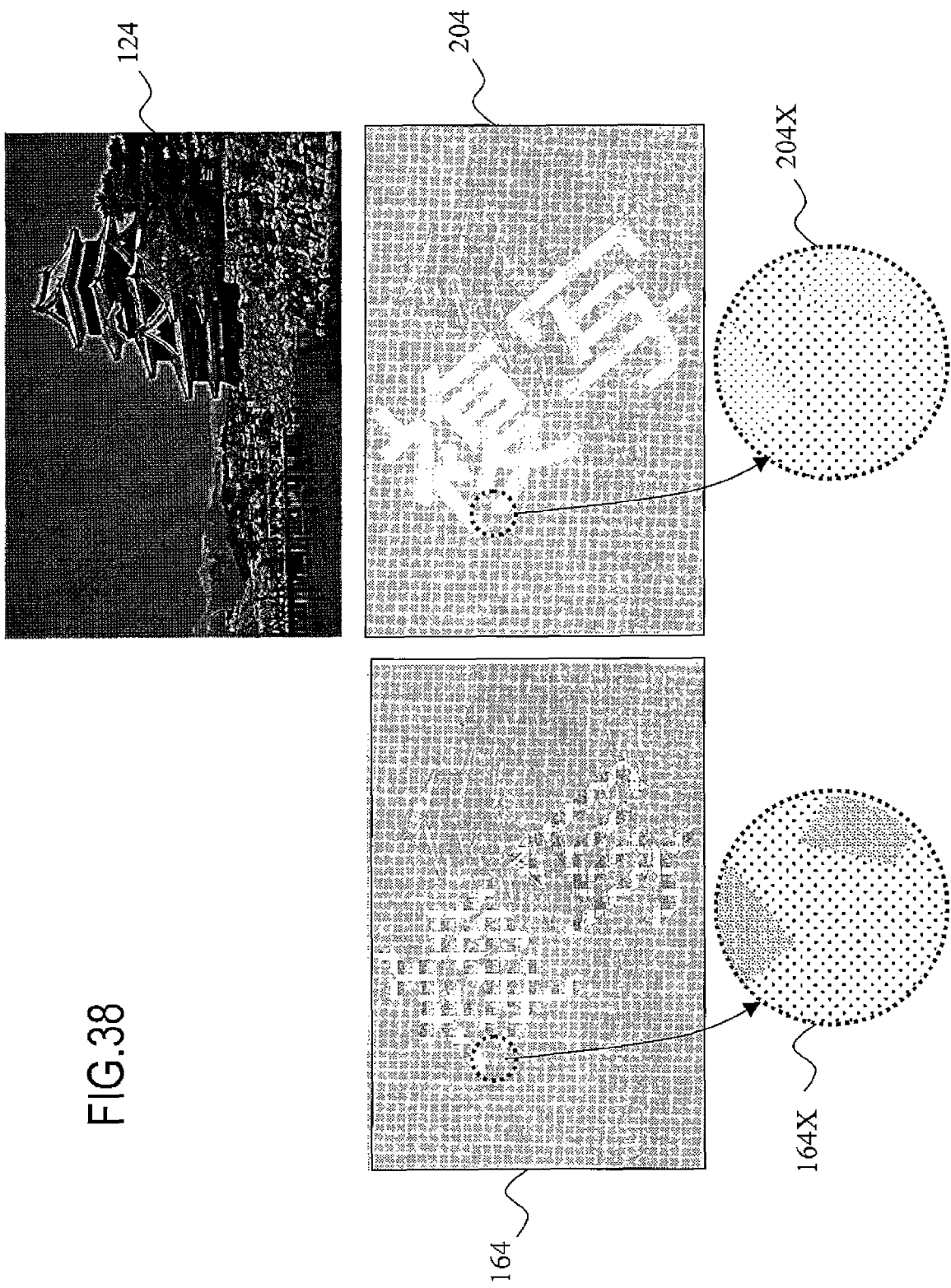
FIG. 38 shows camouflage pattern data after the contrast enhancement (sharpening) on the edge portion and lightness correction are performed, and a tint block image generated using this data.

FIG. 38 shows camouflage pattern data after the contrast enhancement (sharpening) on the edge portion and lightness correction are performed, and a tint block image generated using this data. In this example, the tint block image with a camouflage pattern is generated by adjusting the color camouflage pattern data registered in FIG. 33 using the combined grayscale conversion table with V=60 and C=0 in FIG. 35C. In other words, the color camouflage pattern data is converted into gray grayscale value Gray, then the grayscale value Gray is converted by the combined grayscale conversion table with C=0 and V=60 (Gray_V), then sharpening processing (contrast enhancement processing for edge portion) is performed with AREA=25 and STRENGTH=2, whereby the adjusted camouflage pattern 124 is generated. In this camouflage pattern 124, lightness is corrected to be lower in general, and contrast is enhanced only in the edge portion.

The gray grayscale value Gray_V of this camouflage pattern 124 is inverted to grayscale value K (=255−Gray_V), the grayscale value K is corrected with the input grayscale value In=255 (Ki=Gray_V/255)×In) of the tint block image, and the corrected grayscale value Ki is compared with the thresholds of the background portion and latent image portion dither matrices 34 and 33N in FIG. 31 and FIG. 32, to generate the original tint block image 164.

In the tint block original 164 in FIG. 38, design is better without a drop in the number of grayscales in the low grayscale area and high grayscale area, compared with FIG. 36, and the concealing capability for the latent image of the tint block original 164 is higher since the edge portion of the camouflage pattern is enhanced. Also the identification capability for the latent image in the tint block copy 204 is higher since the lightness dropped. Therefore comprehensively a tint block image quality better than FIG. 36 can be provided.

In addition to the above mentioned (1) lightness drop correction, it is preferable to select either (2) correction to enhance general contrast or (3) correction to enhance contrast of edge portion. In this case, it is better that (2) or (3) is selected according to the image type of the camouflage pattern. For example, if a human face is included in the camouflage pattern, or if an image having smooth gradation generated by computer graphics is included, the contrast enhancement in the edge portion in (3) is not desirable, so the general contrast enhancement in (2) is preferable. If a landscape image is included in the camouflage pattern, as mentioned above, on the other hand, the contrast enhancement in (3) is preferable.

[Camouflage Pattern Adjustment Step]

In the present embodiment, registering a color or multi-grayscale camouflage pattern, which the user arbitrarily acquired, and combining it with a tint block image, is allowed. Hence the registered color or multi-grayscale camouflage pattern is required to match with the tint block image, which is comprised of a latent image portion and background portion. In order to insure this match, the camouflage pattern adjustment step has an automatic adjustment function and manual adjustment function.

Figure 39:
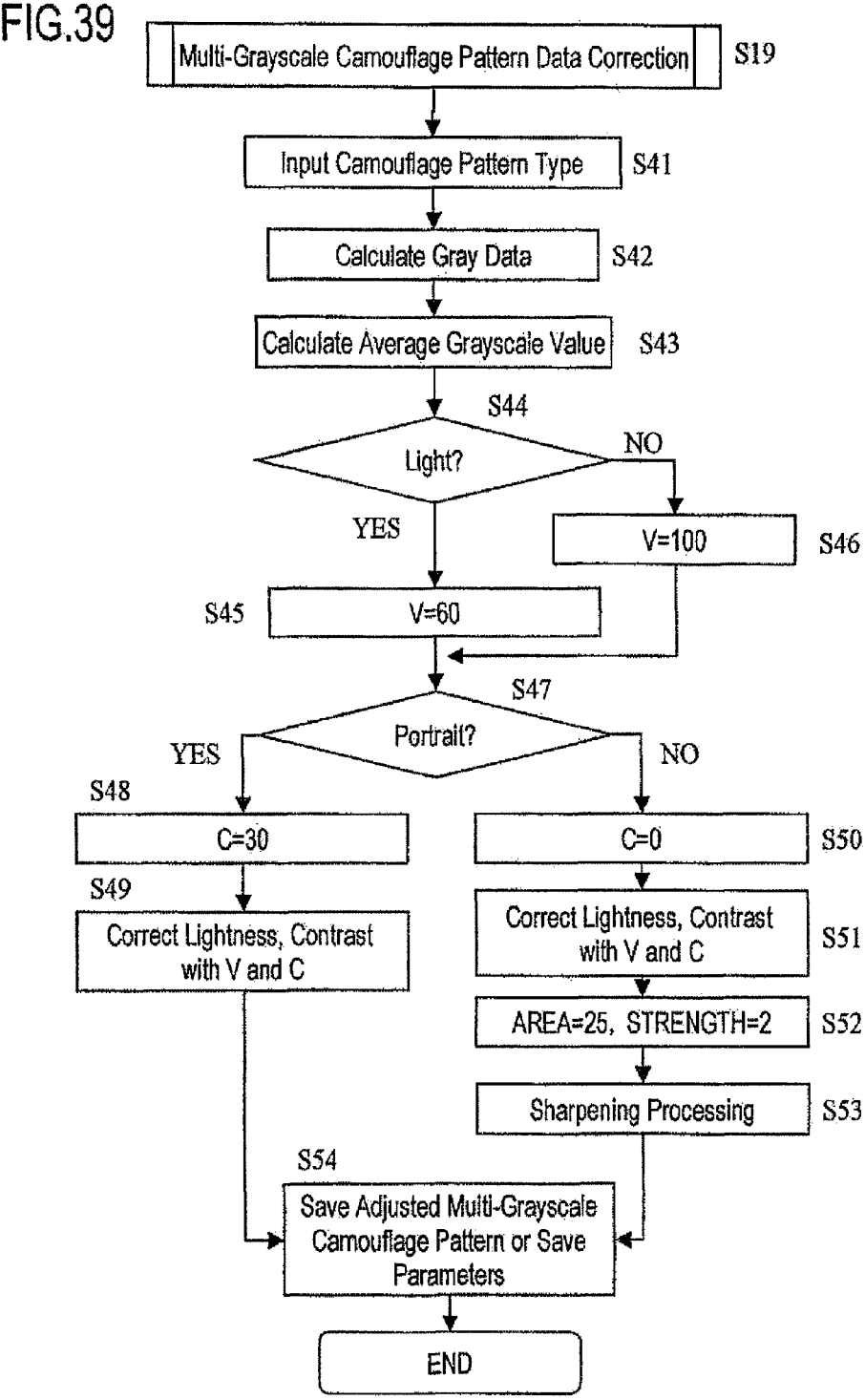
FIG. 39 is a flow chart depicting the camouflage pattern adjustment step.
Figure 40:
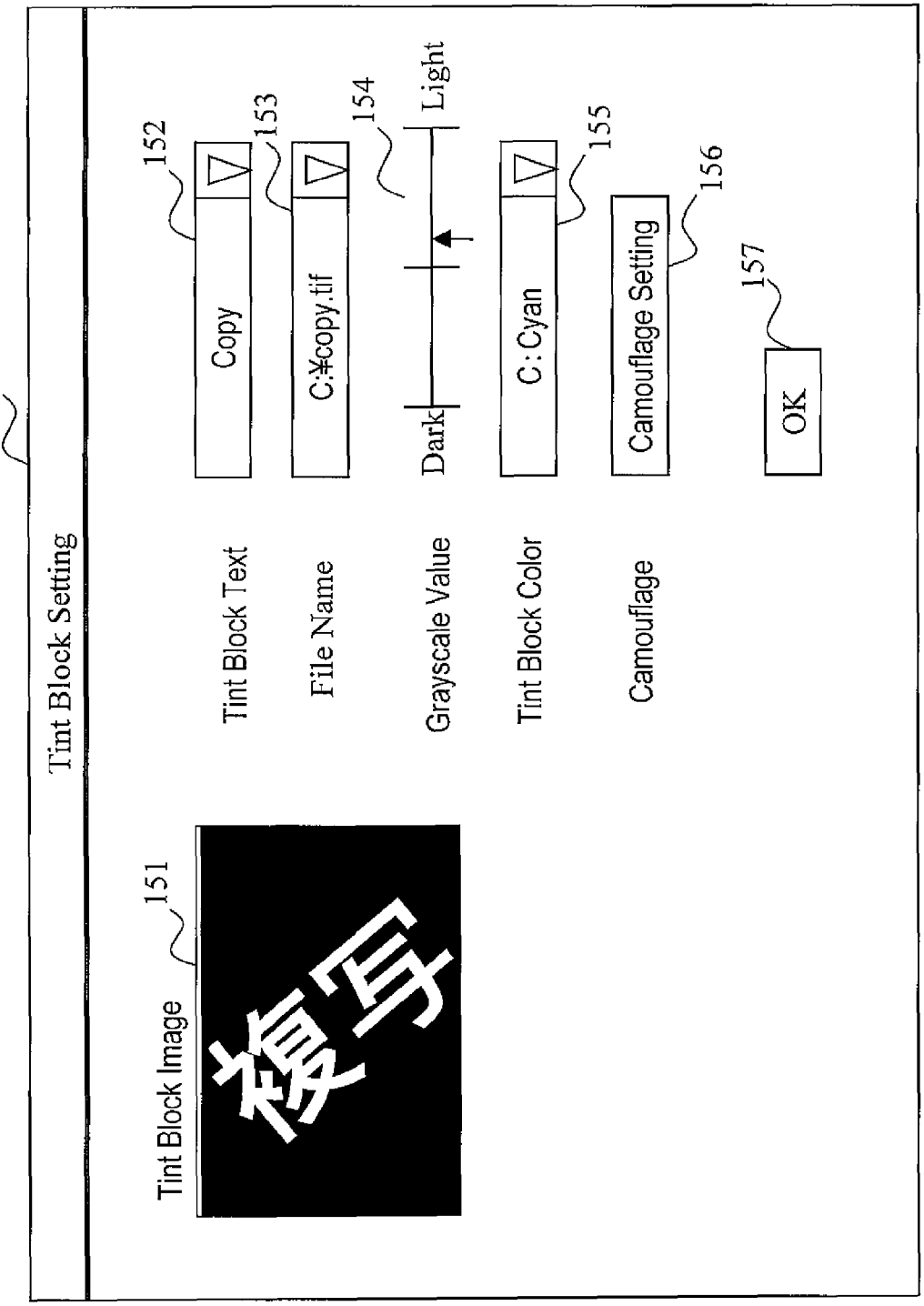
FIG. 40 shows a tint block setting screen of the printer driver.
Figure 41:
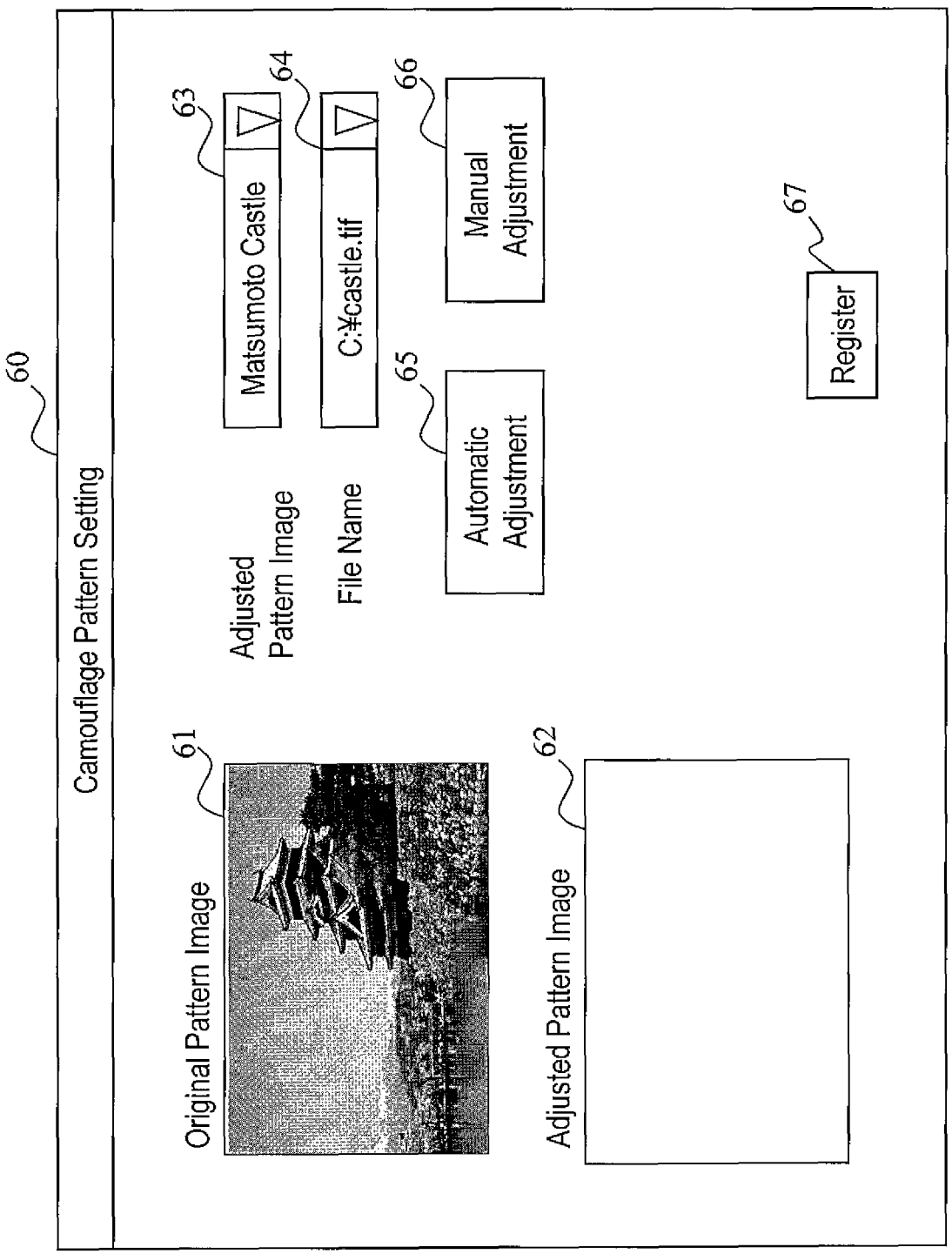
Figure 42:
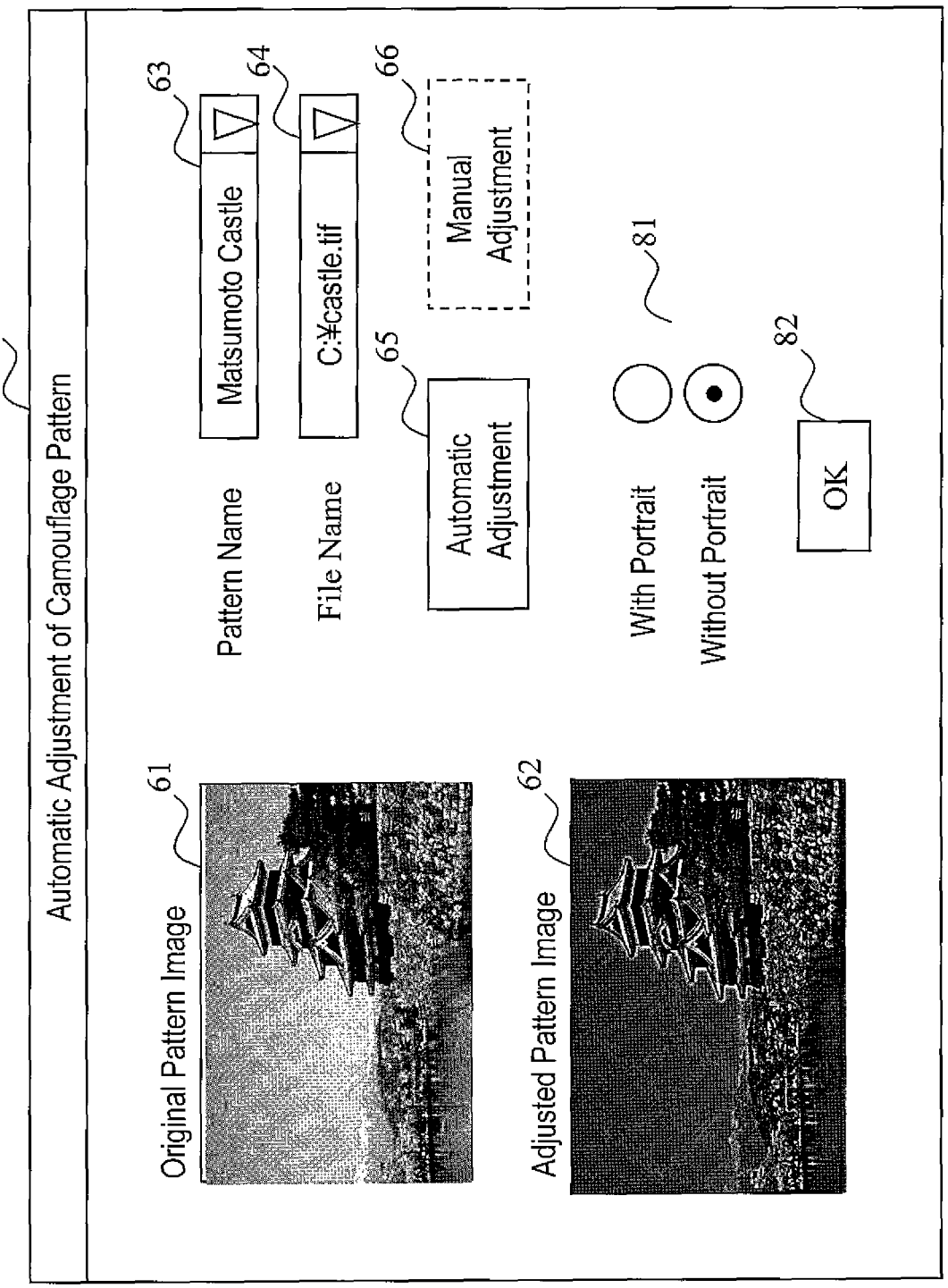

FIG. 39 is a flow chart depicting the camouflage pattern adjustment step. The automatic adjustment step is shown corresponding to step S6 in FIG. 6 and step S19 in FIG. 13. FIG. 40 shows a tint block setting screen of the printer driver, and FIG. 41 to FIG. 43 show screens of the camouflage pattern adjustment steps of the printer driver. The adjustment step in FIG. 39 will now be described with reference to these drawings.

In the tint block setting screen 150 in FIG. 40, the tint block text is selected (152 or 153 in FIG. 40), corresponding to steps S10 to S13 in FIG. 13, and tint block text size, angle, effect, layout, etc. are selected (not illustrated). The input grayscale value In of the tint block image is selected (154 in FIG. 40), and the color of the tint block is selected (155 in FIG. 40). As a result, the printer driver generates a latent image mask pattern, then generates the tint block image based on the selected input grayscale value and color of the tint block, and displays it on the tint block image display portion 151. The user visually checks the tint block image displayed on the tint block image display portion 151, and can click on the "OK" button 157 to end the setting. The user can also click on the camouflage pattern setting button 156 to add a camouflage pattern. In response to these operations, the printer driver displays the camouflage pattern setting screen 60 in FIG. 41.

In the camouflage pattern setting screen 60 in FIG. 41, a color or multi-grayscale camouflage pattern is selected (63, 64 in FIG. 41). In the pull down box 63, a list of camouflage patterns already registered in the printer driver are displayed, and the user can select a camouflage pattern from this list.

For the user to register a new camouflage pattern, the pattern data file stored in the memory in the host computer 30 shown in FIG. 5 is used. A camouflage pattern to be registered can be selected by selecting a folder where pattern data files are stored, and by selecting a file name of the selection target pattern data from the pull down box 64. After the file to be registered is selected from the pull down box, responding to the user clicking on the register button 67, the printer driver stores the selected camouflage pattern data in the memory as a pattern registered in the printer driver. In this case, the user may assign an arbitrary pattern name (name to be displayed in the pull down box 63) for the file name.

In FIG. 41, "Matsumoto Castle" is selected. In response to the selection of this pattern, the selected color or multi-grayscale camouflage pattern is displayed on the original pattern image display portion 61. And responding to the user clicking on the register button 67, the printer driver stores the selected camouflage pattern data in the memory. The stored camouflage pattern data may be the gray grayscale value data, as shown in steps S4 and S5 in FIG. 6. In this case, the printer driver calculates the gray grayscale value of the selected color camouflage pattern data based on Expression (2), and stores the multi-grayscale camouflage pattern data based on this gray grayscale value.

Also in the camouflage pattern setting screen 60 in FIG. 41, lightness and contrast of the selected camouflage pattern are adjusted by clicking on either the automatic adjustment button 65 or the manual adjustment button 66.

If the automatic adjustment button 65 is clicked on, the automatic adjustment screen 80 for the camouflage pattern is displayed as shown in FIG. 42. According to the flow chart in FIG. 39, the user replies whether a human facial image exists or not in the camouflage pattern, using the image type select button 81, and clicks on the OK button 82 (S41). In response to this, the printer driver executes the automatic adjustment processing. First the printer driver calculates the gray grayscale value of the selected camouflage pattern (S42). This calculation is unnecessary if the registered camouflage pattern data has a gray grayscale value.

Then the printer driver calculates the average grayscale value of the gray grayscale value data (S43), and judges whether the pattern is light enough to require lightness drop processing (S44). In this calculation and judgment of the average grayscale value, the average value of the gray grayscale values of all pixels of the camouflage pattern is determined, and it is judged whether the average value has more than 25% density (reference value) of solid black. Also the number of pixels of which the gray grayscale values are more than 25% of solid black and the number of pixels of which the gray grayscale values are less than 25% are determined for all the pixels, and it is judged whether the number of pixels having a 25% or higher grayscale value is greater than pixels having a grayscale value of less than 25%. If it is judged as light (YES in S44), the lightness drop processing is required, so the lightness parameter V is set to V=60. If it is not judged as light (NO in S44), the lightness drop processing is unnecessary, and the lightness parameter V is set to V=100.

If a portrait is included in the camouflage pattern (YES in S47), it is preferable to perform processing to adjust the general contrast of the pattern image, so the print driver sets the contrast parameter C to C=30 (S48), and performs grayscale value conversion referring to the grayscale conversion table with V=60 and C=30 (S49). Thereby the lightness dropping processing and the general contrast enhancement processing are performed. Performing sharpening processing to enhance the contrast in the edge portion on the portrait is not desirable, since the image quality of the portrait drops.

If a portrait is not included in the camouflage pattern (NO in S47), it is preferable to perform the sharpening processing to enhance the contrast in the edge portion, so the printer driver sets the contrast parameter C to C=0 (S50), and performs grayscale value conversion referring to the grayscale conversion table with V=60 and C=0 (S51). Thereby the lightness dropping processing is performed, and the general contrast enhancement processing is not performed. Also the printer driver sets the sharpening parameters to AREA=25 and STRENGTH=2 (S52), and executes the sharpening processing (S53). Then the adjusted camouflage pattern image is displayed on the adjusted pattern image display portion 62.

When the OK button 82 is clicked on in the camouflage pattern automatic adjustment screen 80 in FIG. 42, the camouflage pattern setting screen 60 in FIG. 41 is displayed again. On this screen 60, the adjusted camouflage pattern image is displayed in the adjusted pattern image display portion 62. If the register button 67 is clicked on in this display status, the printer driver saves the adjusted multi-grayscale camouflage pattern data or saves the adjustment parameters used in the adjustment step (S54), responding to this click.

For the input of the image type of the camouflage pattern, it may be input whether a computer graphic image having smooth gradation is included or not, instead of whether a portrait is included or not. In any case, it is necessary for the user to input whether the image is inappropriate for performing the general contrast enhancement processing for all the pixels of the camouflage pattern.

If the manual adjustment button 66 is clicked on in the camouflage pattern setting screen 60 in FIG. 41, the printer driver displays the camouflage pattern manual adjustment screen 90 in FIG. 43, in response to clicking on manual adjustment button 66. The manual adjustment screen 90 has a lightness and contrast setting portion 91 and a sharpening processing setting portion 92. The user can freely set the lightness parameter C and contrast parameter V in the lightness and contrast setting portion 91. The user can also freely set the sharpening processing parameters AREA and STRENGTH in the sharpening processing setting portion 92. Responding to these settings, the printer driver performs adjustment processing, and displays the adjusted camouflage pattern image on the display portion 62. The user checks the camouflage pattern image on the display portion 62, and clicks on the OK button 93 if appropriate. Responding to this, the printer driver displays the camouflage pattern setting screen 60 in FIG. 41 again, and displays the adjusted camouflage pattern image on the adjusted pattern image display portion 62. If the register button 67 is clicked on in this status, the printer driver saves the adjusted multi-grayscale camouflage pattern data or the adjustment parameter used in the adjustment step (S54), responding to this click.

When the above camouflage pattern adjustment step ends, the tint block image in which the camouflage pattern is reflected is displayed on the tint block image display portion 151 on the tint block setting screen 150 in FIG. 40. If the OK button 157 is clicked on in the screen 150, the tint block setting step ends. In the camouflage pattern added to the tint block which is set, lightness and contrast have been adjusted, so even if it is a color or multi-grayscale camouflage pattern which the user arbitrarily acquired, design of the tint block original using the camouflage pattern can be improved, the concealing capability in the tint block original can be increased, and the identification capability in the tint block copy can also be increased.

What is claimed is:

1. A non-transitory computer-readable storage medium for recording a tint block image generation program that causes a computer to execute a tint block image generation step of generating tint block image data including a latent image portion and a background portion which have different output densities to be reproduced by copying, the tint block image generation step comprising:

a camouflage pattern registration step of accepting an input of multi-grayscale camouflage pattern data for representing a camouflage pattern that has more than two grayscale values and storing in a memory the multi-grayscale camouflage pattern data, which has been input;

a correcting step of correcting grayscale values of the multi-grayscale camouflage pattern data based on input grayscale values of the latent image portion and background portion so as to generate corrected camouflage pattern data; and a tint block image data generation step of generating a latent image portion image data for the latent image portion based on a latent image portion screen for an area corresponding to the latent image portion within the camouflage pattern represented by the corrected camouflage pattern data, and generating a background portion image data for the background portion based on a background portion screen for an area corresponding to the background portion within the camouflage pattern represented by the corrected camouflage pattern data, from grayscale values of the corrected camouflage pattern data.

2. The non-transitory computer-readable storage medium for recording the tint block image generation program according to claim 1, further comprising:

an adjustment step of adjusting the grayscale values of the stored multi-grayscale camouflage pattern data to be a lower lightness, so as to generate adjusted multi-grayscale camouflage pattern data, wherein in the correcting step, the adjusted multi-grayscale camouflage pattern data is used as the multi-grayscale camouflage pattern data.

3. The non-transitory computer-readable storage medium for recording the tint block image generation program according to claim 2, wherein in the adjustment step, a contrast enhancement processing to enhance lightness contrast of the grayscale values is performed for the grayscale values of the stored multi-grayscale camouflage pattern data.

4. The non-transitory computer-readable storage medium for recording the tint block image generation program according to claim 2, wherein in the adjustment step, a sharpening processing to enhance light contrast of grayscale values for an edge portion of the camouflage pattern is performed for the grayscale values of the stored multi-grayscale pattern data.

5. The non-transitory computer-readable storage medium for recording the tint block image generation program according to claim 2, further comprising:

an adjusted camouflage pattern registration step of storing the adjusted multi-grayscale camouflage pattern data in a memory, after the adjustment step.

6. The non-transitory computer-readable storage medium for recording the tint block image generation program according to claim 2, further comprising:

an adjustment parameter registration step of storing in a memory an adjustment parameter used for adjustment in the adjustment step, after the adjustment step.

7. The non-transitory computer-readable storage medium for recording the tint block image generation program according to claim 1, further comprising:

a gray grayscale value generation step of converting grayscale values of a plurality of colors included in color camouflage pattern data into gray grayscale values when the multi-grayscale camouflage pattern data which has been input is color camouflage pattern data, wherein in the correcting step, the converted gray grayscale values are used as the multi-grayscale camouflage pattern data.

8. A non-transitory computer-readable storage medium for recording a tint block image generation program that causes the computer to execute a tint block image generation step of generating tint block image data including a latent image portion and a background portion which have different output densities to be reproduced during copying, the tint block image generation step comprising:

a camouflage pattern registration step of accepting an input of multi-grayscale camouflage pattern data for representing a camouflage pattern that has more than two grayscale values and storing in a memory the multi-grayscale camouflage pattern data, which has been input;

an adjustment step of adjusting grayscale values of the stored multi-grayscale camouflage pattern data to a lower lightness so as to generate adjusted multi-grayscale camouflage pattern data;

a correcting step of correcting the grayscale values of the adjusted multi-grayscale camouflage pattern data based on input grayscale values of the latent image portion and background portion so as to generate corrected camouflage pattern data; and a tint block image data generation step of generating latent image portion image data for the latent image portion based on a latent image portion screen for an area corresponding to the latent image portion within the camouflage pattern represented by the corrected camouflage pattern data, and generating a background portion image data for the background portion based on a background portion screen for an area corresponding to the background portion within the camouflage pattern represented by the corrected camouflage pattern data, from the grayscale values of the corrected camouflage pattern data.

9. A non-transitory computer-readable storage medium for recording a tint block image generation program that causes a computer to execute a tint block image generation step of generating tint block image data including a latent image portion and a background portion, which have different output densities to be reproduced by copying, the tint block image generation step comprising:

a gray grayscale value generation step of converting grayscale values of a plurality of colors included in color camouflage pattern data into gray grayscale values so as to generate gray grayscale value data having more than two grayscale values;

a correcting step of correcting gray grayscale values of the gray grayscale value data based on input grayscale values of the latent image portion and background portion so as to generate corrected gray grayscale value data; and a tint block image data generation step of generating latent image portion image data for the latent image portion based on a latent image portion screen for an area corresponding to the latent image portion within the camouflage pattern represented by the corrected gray grayscale value data, and generating background portion image data for the background portion based on a background portion screen for an area corresponding to the background portion within the camouflage pattern represented by the corrected gray grayscale value data, from gray grayscale values of the corrected gray grayscale value data.

10. The non-transitory computer-readable storage medium for recording the tint block image generation program according to claim 9, further comprising:

a step of inputting color data selected from a plurality of color materials of an image generation device as a color of the tint block image, wherein the tint block image data is output as image data on the selected color.

11. The non-transitory computer-readable storage medium for recording the tint block image generation program according to claim 9, further comprising:

a camouflage pattern registration step of storing in a memory the color camouflage pattern data or the gray grayscale value data or both.

12. A tint block image generation device for generating tint block image data including a latent image portion and a background portion having different output densities to be reproduced by copying, the tint block image generation device comprising:

a CPU comprising:

a gray grayscale value generation unit which converts grayscale values of a plurality of colors included in color camouflage pattern data into gray grayscale values so as to generate gray grayscale value data having more than two grayscale values;

a correcting unit which corrects gray grayscale values of the gray grayscale value data based on input grayscale values of the latent image portion and background portion so as to generate corrected gray grayscale value data; and a tint block image data generation unit which generates a latent image portion image data for the latent image portion based on a latent image portion screen for an area corresponding to the latent image portion within the camouflage pattern represented by the corrected gray grayscale value data, and generates background portion image data for the background portion based on a background portion screen for an area corresponding to the background portion within the camouflage pattern represented by the corrected gray grayscale value data, from gray grayscale values of the corrected gray grayscale value data.

13. The non-transitory computer-readable medium which stores the tint block image generation program according to claim 1, wherein the latent image portion image data and background portion image data which are generated in the tint block image data generation step, respectively, are image data to reproduce a multi-grayscale latent image portion image and a multi-grayscale background portion image, respectively.

14. The non-transitory computer-readable storage medium for recording the tint block image generation program according to claim 1, wherein the latent image portion image data is image data for forming a plurality of first dots in positions corresponding to the grayscale values of the corrected camouflage pattern data, the background portion image data is image data for forming a plurality of second dots in positions corresponding to the grayscale values of the corrected camouflage pattern data, and the latent image portion screen is a dot-clustered dither matrix where dots are clustered in the center of the first dots, and the background portion screen is a dot-dispersed dither matrix where the second dots are dispersed.

15. The non-transitory computer-readable storage medium for recording the tint block image generation program according to claim 1, wherein characteristics of output densities with respect to a possible range of the input grayscale values match between the latent image portion screen and background portion screen, and the input grayscale values of the latent image portion and background portion are the same.

16. The non-transitory computer-readable storage medium for recording the tint block image generation program according to claim 1, wherein the multi-grayscale camouflage pattern data has grayscale data of a plurality of colors, and in the camouflage pattern registration step, the grayscale values of the multi-grayscale camouflage pattern data has grayscale values which are determined based on the grayscale values of the plurality of colors.

17. The non-transitory computer-readable storage medium for recording the tint block image generation program according to claim 1, wherein in the camouflage pattern registration step, a multi-grayscale camouflage pattern data selected from a plurality of types of multi-grayscale camouflage pattern data stored in a memory is acquired in response to a selection request of a user.

* * * * *